United States Patent [19]

Amirghodsi et al.

[11] Patent Number: 4,974,191
[45] Date of Patent: Nov. 27, 1990

[54] ADAPTIVE NATURAL LANGUAGE COMPUTER INTERFACE SYSTEM

[75] Inventors: Siamak Amirghodsi; Farnoud Daneshbodi, both of Prairie View, Ill.

[73] Assignee: Syntellect Software Inc., Prairie View, Ill.

[21] Appl. No.: 80,456

[22] Filed: Jul. 31, 1987

[51] Int. Cl.$^5$ .................................................. G06F 3/00
[52] U.S. Cl. ............................ 364/900; 364/972.1; 364/948.22; 364/966.4
[58] Field of Search ............................... 364/200, 900

[56] References Cited

U.S. PATENT DOCUMENTS

| | | | |
|---|---|---|---|
| 3,388,381 | 6/1968 | Prywes et al. | 364/300 |
| 3,614,744 | 10/1971 | Sweeney | 364/200 |
| 4,254,476 | 3/1981 | Burrows | 365/49 |
| 4,270,182 | 5/1981 | Asija | 364/900 |
| 4,286,330 | 8/1981 | Isaacson | 364/900 |
| 4,502,128 | 2/1985 | Okajima et al. | 364/900 |
| 4,507,750 | 3/1985 | Frantz et al. | 364/900 |

OTHER PUBLICATIONS

"Knowledge Representation and Natural Language Processing", Proceedings of the IEEE, vol. 74, No. 7, July 1986, pp. 905-938.
"The Use of Speech Knowledge in Automatic Speech Recognition", Proceedings of the IEEE, vol. 73, No. 11, Nov. 1985, pp. 1602-1624.
"An Extension of the Shannon Theory Approach to Cryptography", IEEE Transactions on Information Theory, vol. IT-23, No. 3, May 1977, pp. 289-294.
"Putting Natural Language to Work", Popular Computing, Sep. 1985, pp. 64-68.
"An Intelligent Relationship with Your Data Base", Personal Computing, July 1984, pp. 32-34.
"Probabilistic Logic", Artificial Intelligence, vol. 28, 1986, pp. 71-87.
"Conceptual Clustering of Structured Objects: A Goal-Oriented Approach", Artificial Intelligence, vol. 28, 1986, pp. 43-69.
"The Development of an Experimental Discrete Dictation Recognizer", Proceedings of the IEEE, vol. 73, No. 11, Nov. 1985, pp. 1616-1624.

*Primary Examiner*—Thomas M. Heckler
*Attorney, Agent, or Firm*—Fitch, Even, Tabin & Flannery

[57] ABSTRACT

A method and apparatus for computer translation between a natural language, such as English, and a second language, such as the command language of a computer operating system, a job control language, a robot control language, a numerical control machine program language or subset of another natural language.

The system for an operating system interface performs semantic processing of natural language requests by applying cryptographic techniques and indexes to guide an Artificial Intelligence search and inference mechanism in a mapping process from the user request to the target command set. Other cryptographic characteristics such as frequency distribution of classes of words and letters are used to allocate and retrieve the information in the knowledge base. The system also utilizes a high speed cryptographic filter to reduce computational overhead. A crypto-signature is computed in this filtering process to permit fast and efficient pattern matching access and to interface the virtual memory system. Interpretation of requests having insufficient information or ambiguities is achieved by the use of information theory concepts of entropy and key equivocation in conjunction with a conversational mode.

The system also rewrites the knowledge provided by the user in a form of Extended-Microinstructions, that participate in the inductive mapping process and code generation for the desired secondary language. The Extended-Microinstructions define the structure, parameters, and order of execution of a series of general purpose procedures used in the mapping process of the natural language to the command set.

18 Claims, 69 Drawing Sheets

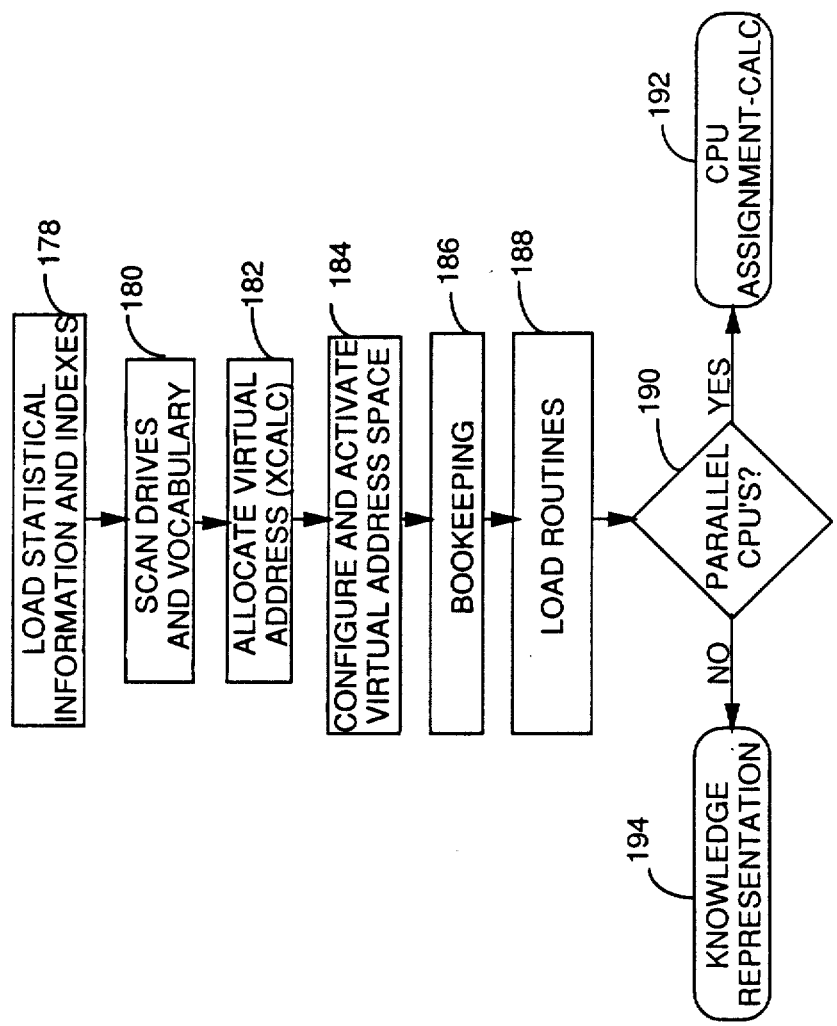

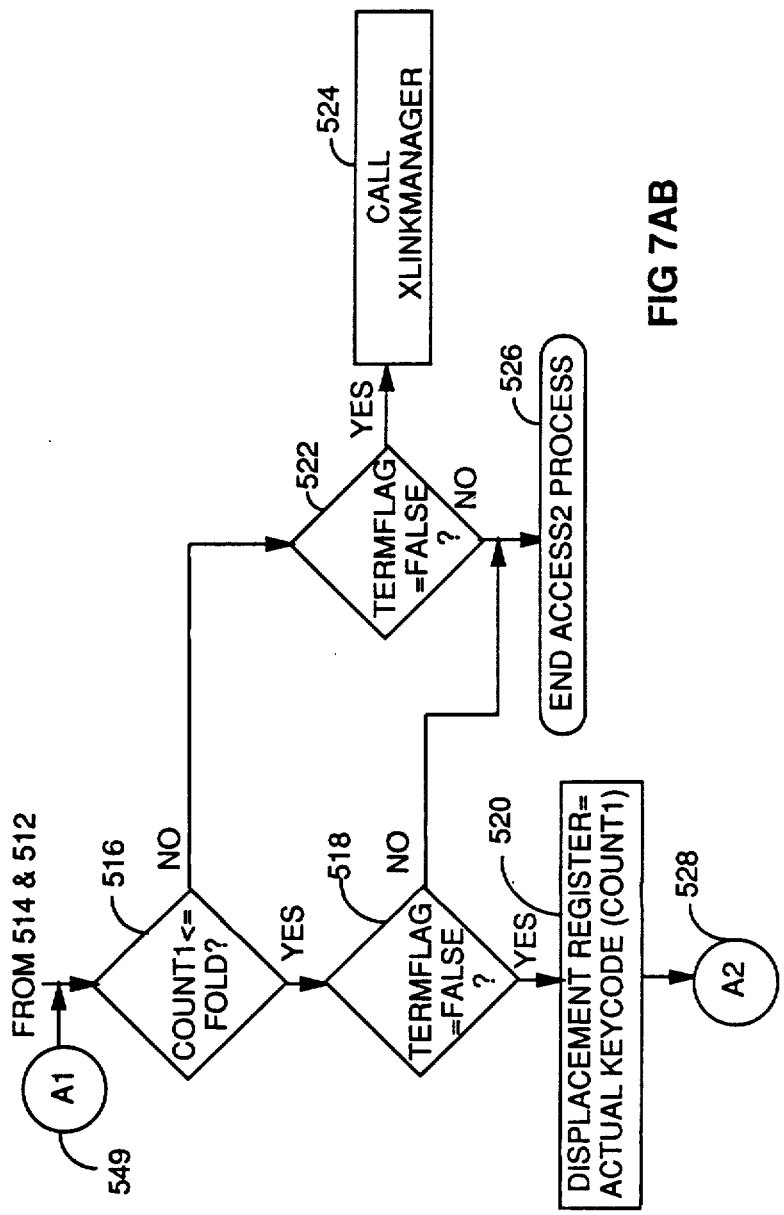

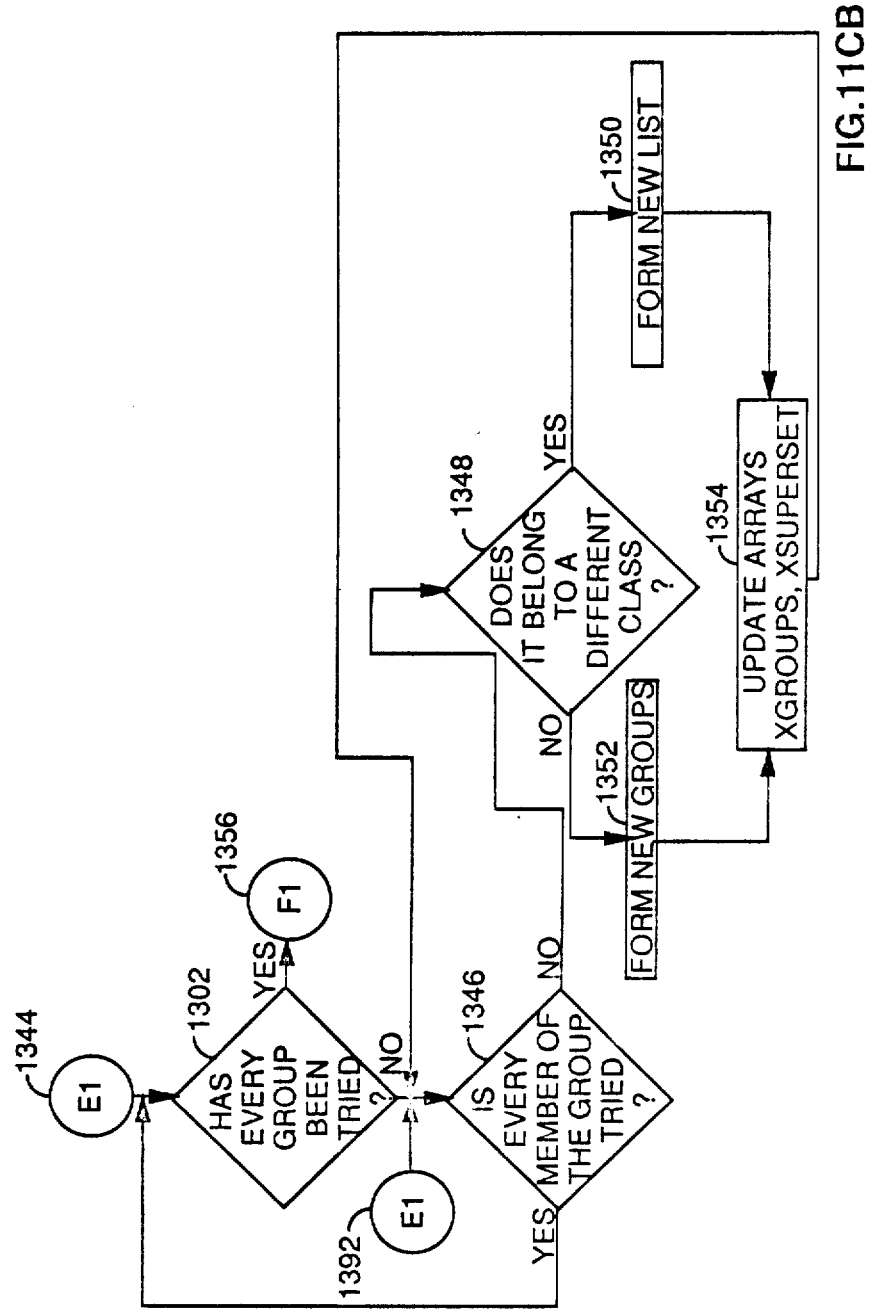

ADAPTIVE NATURAL LANGUAGE COMPUTER INTERFACE SYSTEM

BACKGROUND OF THE INVENTION

This invention relates generally to the field of machine translation of natural language expression and more particularly to a novel method and apparatus for computer translation between a natural language and a second language The generation and dissemination of information and knowledge continues to grow in importance in both social and economic terms. The vast majority of this information and knowledge is expressed in natural languages such as English, and much of the task of gathering, manipulating, and acting on and disseminating information can be greatly aided by computers. Since natural language capability can enable computers to interact with users in their ordinary language it can make computer power available to segments of the population that are unwilling or unable to learn a formal computer language In addition, a natural language interface to computers can increase knowledge productivity by providing a mechanized means for manipulating knowledge as now expressed in natural language as well as aiding in the translation from one language into another.

A number of approaches to methods for machine translation of a natural language have been proposed in the prior art. Translators used for simple lateral translation of the words of one language (e.g., English) into another language (e.g., French) have been known for some time. These translators are essentially stored dictionaries with means for word entry and processor means for dictionary-type (i.e., alphabetical order) lookup.

Other systems have been developed to translate simple sentences which are commonly used and manipulated as a whole (e.g., "How are you?", etc.) from one natural language to another. This type of translator is essentially the same as the word translator in that pairs of the frequently used sentences of one language and corresponding sentences in a second language are stored in memory and then the sentence required is displayed as selected. Translators of this type are commercially available for travelers in a foreign country using stored phrases and sentences classified into sections such as "in plane", "at restaurant", "at customs", and so forth, in accordance with situations which the traveler will encounter. In use, the traveler first selects the section which he desires to confer with by operating associated keys. Next, upon actuation of a search key, sentences which are frequently used in a situation corresponding to the selected key are sequentially displayed one after another. When a sentence of interest which the traveler wants to use is displayed, the translation key is operated, whereupon a translated sentence corresponding to the selected sentence is displayed. In order to make it possible to translate a great variety of sentences, however, not only a memory of enormously great capacity is required, but also the procedures for selecting a sentence to be translated become very complicated.

More advanced systems have been proposed using techniques such as parsing or grammatical Patterns to translate more complex sentences from one language to another but still using an alphabetical order-type lookup. In this type of translation system a natural language text, such as English, is inputed to the translator apparatus and translated into a sentence of a second language through processes of parsing and retrieval of corresponding or target word by sorting to the dictionary access. A translating apparatus of this type can not deal with ambiguities and inconsistencies due to inherent parsing strategy. These translators also require a high-speed computer of a large scale with large memory and involving great expense. In addition, none of these systems learn or change based upon knowledge obtained from use nor do they have the capability of asking the user questions relating to the context of user expressions.

Another application for natural language translation is as a human/computer interface. Computer systems or robots utilize software for system control functions and interaction with the user and their environment (e.g., operating systems such as MS-DOS sold by Microsoft Corp. for use in a microcomputer environment or a variety of control programs used in robotics) and applications software (e.g., database management systems, free formatted text retrieval systems and expert systems) which have their own command languages. These languages are frequently difficult and cumbersome to use and therefore they restrict access to the computer's power to experienced users. Thus, memory resident natural language interfaces for computer operating systems, application software, expert systems, robots and numerical machines are highly desireable.

In the prior art, such interface systems have utilized dictionary look-up approaches as described above, which use up large amounts of memory and processor time, and therefore are not suitable for use in microcomputer systems. Further they can not provide the illusion that the user is communicating through an expert assistant knowledgeable about the computing environment using an intelligent natural language based dialogue. Other prior art systems use table look-up schemes in which language patterns are stored in a transposition pattern table. Such systems are limited to the individual patterns stored and do not provide for learning or inductive capabilities. However, a natural language interface for operating systems is a complex system which must respond to user requests presented as partial concepts from which machine commands are derived (i.e., a concept driven system).

All the prior art systems fail to consider that for effective use of computer software systems and control programs advise and requests can not be interpreted or granted by the system blindly. An intelligent natural language interface must be able to deal with a variety of situations such as lexical ambiguity, intentions, ellipses, discourse structures, vagueness and figures of speech which require pragmatic knowledge of the operating environment. Thus, it is desireable for the systems to be capable of taking into consideration the previous state, present state and future state of the machine to interpret the user request by assembling a system which provides expert advice and assistance to the user. It is further desirable for the system to accept the user requests in the form of conceptual advice and then direct or activate certain heuristics to guide the translation process.

It is accordingly an object of the present invention to provide novel natural language translation apparatus which minimizes memory and processor usage thereby maximizing response speed.

It is yet another object of the present invention to provide a novel memory resident natural language interface for operating systems, job control languages, robot control languages, numerical control machine program language or other natural language suitable for use even in computers with limited resources such as microcomputers and other microprocessor based systems.

It is yet another object of the invention to provide a novel natural language translation apparatus utilizing cryptanalysis techniques, artificial intelligence, and machine learning to provide high speed translation between a natural language and a second language.

It is yet another object of the invention to provide a novel adaptive learning system that can be trained by the user to deal with pragmatic situations unique to their operating environment.

It is yet another object of the invention to provide an efficient system with a microprogrammable architecture for an adaptive natural language processor capable of modifying its parameters and control mechanism to adapt to future changes or modifications made to the command set of operating environment.

It is yet another object of the present invention to provide a user definable interactive natural language dialogue system for interfacing to command sets of application programs as an alternative to currently available menu driven interface systems.

It is yet another object of the invention to provide a novel knowledge acquisition system which converts user supplied information into internal Extended-Microinstructions, consequently resulting in modification of the learning model.

It is yet another object of the invention to provide a novel English language shell utilizing letter matching based upon frequency of use in the English language and learning based upon actual usage distribution.

It is yet another object of the invention to provide a novel natural language interface with learning and inference capabilities to assist users in utilizing complex operating system commands described incompletely in the user's natural language.

It is yet another object of the invention to provide a natural language interface capable of utilizing parallel processing with minor modifications.

It is yet another object of the invention to provide a natural language operating system interface which can interrogate the system hardware and configure itself for the specific hardware system and operating environment found.

Briefly, according to one embodiment of the invention, processing apparatus is provided for performing translation between a predetermined natural language and a second language, such as a computer operating system command language. The processing apparatus comprises input means for input of messages in said predetermined natural language, and processing means using techniques such as artificial intelligence and inference mechanisms, for mapping words of said natural language requests to corresponding words of said second language based upon cryptographic techniques including use of frequency distribution of classes or words and letters of said predetermined natural language to allocate, store and retrieve information. Means are also provided for generating a message in said second language utilizing the retrieved information.

In alternative embodiments, the invention includes a high speed cryptographic filter which determines a cryptosignature of input tokens for efficient pattern matching and access to a virtual memory system. In addition, in another embodiment, an adaptive learning interface permits user configuration and enables modification of internal structure, heuristics and knowledge base.

BRIEF DESCRIPTION OF THE DRAWINGS

The invention together with further objectives and advantages thereof may be understood by reference to the following description taken in conjunction with the accompanying drawings.

DETAILED DESCRIPTION OF THE PREFERRED EMBODIMENTS

Figure 1:
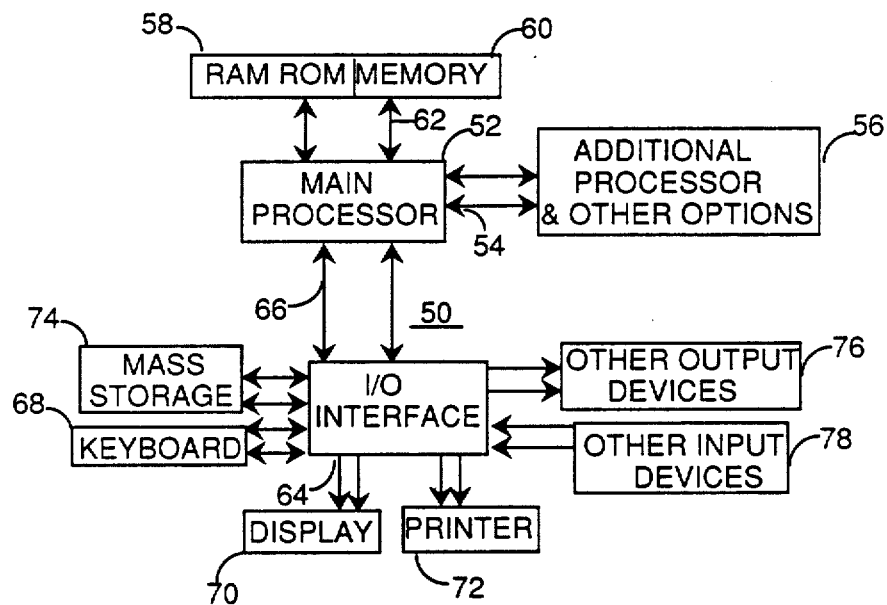
FIG. 1 is a generalized block diagram illustrating the structure of a specific embodiment of a microprocessor system with natural language operating system interface according to the invention.

FIG. 1 is a generalized block diagram illustrating a specific embodiment of a microcomputer system 50 with natural language system interface according to the invention. The natural language microcomputer system 50 may include a wide variety of optional elements in addition to the elements shown. Further, although one embodiment is shown, the invention may be implemented with many variations including a minicomputer system, main frame computer system or a dedicated discrete digital system. The natural language microcomputer system 50 comprises processing apparatus (e.g., an International Business Machine compatible personal computer such as the American Telephone and Telegraph Model 6300 personal computer), as shown, programmed to provide a natural language interface to the operating system (e.g., a disk operating system such as those marketed by Microsoft Corp.).

In the configuration illustrated in FIG. 1, the system 50 is a microcomputer system, compatible with International Business Machines' Personal computers, comprising a main processor circuit 52 including a microprocessor (e.g., an Intel 8088). The main processor 52 is coupled via a bus 54 to additional processors 56 (e.g., a math coprocessor such as an Intel 8087, or other parallel processors) and other optional devices (e.g., real-time clock, memory expansion, etc.). The processor 52 is also coupled to random access memory (RAM) 58 and read-only memory 60 via a memory bus 62, as shown. An Input/Output (IO) interface 6 is coupled to the processor 52 via the bus 66 to provide interfacing to a variety of peripherals, as shown.

Among the peripherals which may be coupled to the processor 52 are a keyboard 68, a display 70, a printer 72, and mass storage 74. The display 70 may be a conventional LCD display or CRT screen or other suitable display device for providing alphanumeric and/or graphic display capabilities. The mass storage device 74 may comprise a conventional hard disc or other mass storage device which provides large scale storage, and which may serve as virtual memory. The printer 72 may be any of a variety of conventional printers suitable for providing printed output. The keyboard 68 may include an ASCII or other suitable encoder and a separate set of letter and numeric keys and function keys to permit communication between the system 50 and an operator. In addition, other output devices 74 such as a conventional digital voice synthesizer module, or other input devices 78, such as a speech recognition module may be coupled through the I/0 Interface 64 to enhance communication capability between system and user.

The system 50 provides translation to a second language of communications in a first language (such as English). Input into the system 50 via such means as the keyboard 68 or a speech recognition type of input device 78. In the illustrated embodiment, the system 50 permits users to communicate with the computer operating system (i.e., in the illustrated embodiment, a disk-operated system such as that marketed by Microsoft Corp. under the trade name MS-DOS) or various control programs for robots in natural English. Thus the system 50 translates the natural language request of a user to the command language of the operating system or the control program. The system 50 is a natural language processor which makes use of an expert system with knowledge of the operating system and of the English language which interprets the user's natural language requests, and maps them to equivalent subsets of commands in the operating environment.

The illustrated system 50 essentially performs semantic processing of natural language requests by applying cryptographic techniques and indexes to guide an Artificial Intelligence search and inference mechanism in a mapping process from the user request to the target operating system command set. Other cryptographic characteristics such as frequency distribution of classes of words and letters are used to allocate and retrieve the information in the knowledge base. The system also utilizes a high speed cryptographic filter to reduce computational overhead. A cryptosignature is computed in this filtering process and is used for a fast and efficient pattern matching as well as access to interface the virtual memory system. Interpretation of requests having insufficient information or ambiguities is achieved by the use of information theory concepts of entropy and key equivocation in conjunction with a conversational node.

The illustrated system 50 is implemented as an adaptive learning user interface model that can be configured by the novice user for any secondary language or command set desired. The system also rewrites the knowledge provided by the user in a form of Extended-Microinstructions, that participate in the inductive mapping process and code generation for the desired secondary language. The Extended-Microinstructions define the structure, parameters, and order of execution of a series of general purpose procedures used in the mapping process of the natural language to the command set. Concepts of Artificial Intelligence, Cryptography, Microprogramming, and Applied Machine Learning are applied to the machine translation process to provide an adaptive natural language interface. This Synthetic Access Language Interface for Operating Systems (SALI/OS) is an adaptive interface unit that can learn and modify its internal structure and plans by modifying its heuristics and existing knowledge, enabling it to act, learn and expand in its own real world (i.e., the command set of operating environment) without a need for further internal programming. The system utilizes limited memory and cpu resources, and is thereby suitable for use in microcomputer systems.

The system 50 in its most general form comprises a collection of tables and graphs which represent the actual knowledge associated with the operating environment and with interpretation of user requests. In addition, the system is capable of automated learning which utilizes the well known information theory concepts of key equivocation and entropy to direct the learning process. Thus the system utilizes a goal achieving process in which command entropy minus user request entropy is driven towards zero in order to direct the learning and translation processes. This approach allows the system to have the capability of interpreting requests only partially described by the user so as to determine as close as possible what is meant, and then to assist the user in the construction or in the collection of enough additional information to determine the user's desired goal. To accomplish this goal, the system utilizes an information sufficiency test to determine whether the user has supplied sufficient information to determine desired commands. The software can draw inferences from the background information stored within the system and by considering future states of the machine that will result from the stated request of the user.

If the user request does not pass the information sufficiency test (i.e., if marginal entropy is not equal to zero), then the missing information is coupled to a conversation unit which selects a proper question from a table of suitable questions in order to retrieve the necessary missing information. A key equivocation index is used to pick the question which will result in the greatest amount of disclosure. These indexes are coded or latter defined by the users as a series of Extended-Microinstructions. After the system has uniquely mapped the natural language request to the command subset, it displays the request along with the natural language equivalent of what the machine has interpreted as the user's request.

The software when it is initialized contains extensive knowledge about the operating system environment as well as the hardware environment in the form of graphs, tables, maps, equations, and binary codes. In addition, a series of experiments are performed to obtain additional knowledge to increase the overall knowledge of the system stored within the software. Thus when the machine is initially loaded, it performs a set of experiments on the hardware testing memory locations and drives, which produce a series of zero or one results. This information is coded into a bit map which describes the machine environment The learning process functions in an automatic fashion, and the results of the automated learning are periodically sampled and used to replace old knowledge contained in maps, tables and graphs, which were provided in the initial programming or collected in previous usage. The system dynamically acquires additional information about the operating system and additional constraints by monitoring system variables and locations.

The system employs cryptographic logic to interpret the user requests thereby viewing the request interpretation process as a code-breaking problem when the stored knowledge is used as guidelines for breaking the code. In this process, the system exploits cryptographic techniques to provide the decision-making capability to deal with uncertainty and to apply cryptography to the indexing of the knowledge maintained in the system. Thus the system uses code-breaking techniques and frequency characteristics of classes of words and their behavior within these classes to create and utilize the most optimal path for access to the knowledge. Thus cryptographic techniques are used both to allocate information to the various maps and tables as well as to locate the information in the tables in order to interpret the knowledge in such a way to minimize the amount of computation necessary to locate and interpret a user request.

In operation, generally, a request by a user in its natural language is sectioned into a number of tokens (strings) that are formed by selecting and combining certain combinations of tokens as disclosed by the embodiment of the parser. These tokens are passed through a very fast filtering mechanism which either accepts or rejects each token as recognizable by the system. This provides a high-speed mechanism for eliminating unrecognizable patterns. The remaining tokens are passed to an inductive processor which determines based on the stored knowledge and cryptographic techniques the semantic content of the request. Codes are generated based upon the token interpretations which are then collected into a single code. This code is used to map the natural language request to the operating system command set after the information sufficiency test determines that no ambiguity or inconsistency exists and that sufficient information is present for complete interpretation of the request and formation of a complete operating system command.

Figure 2:
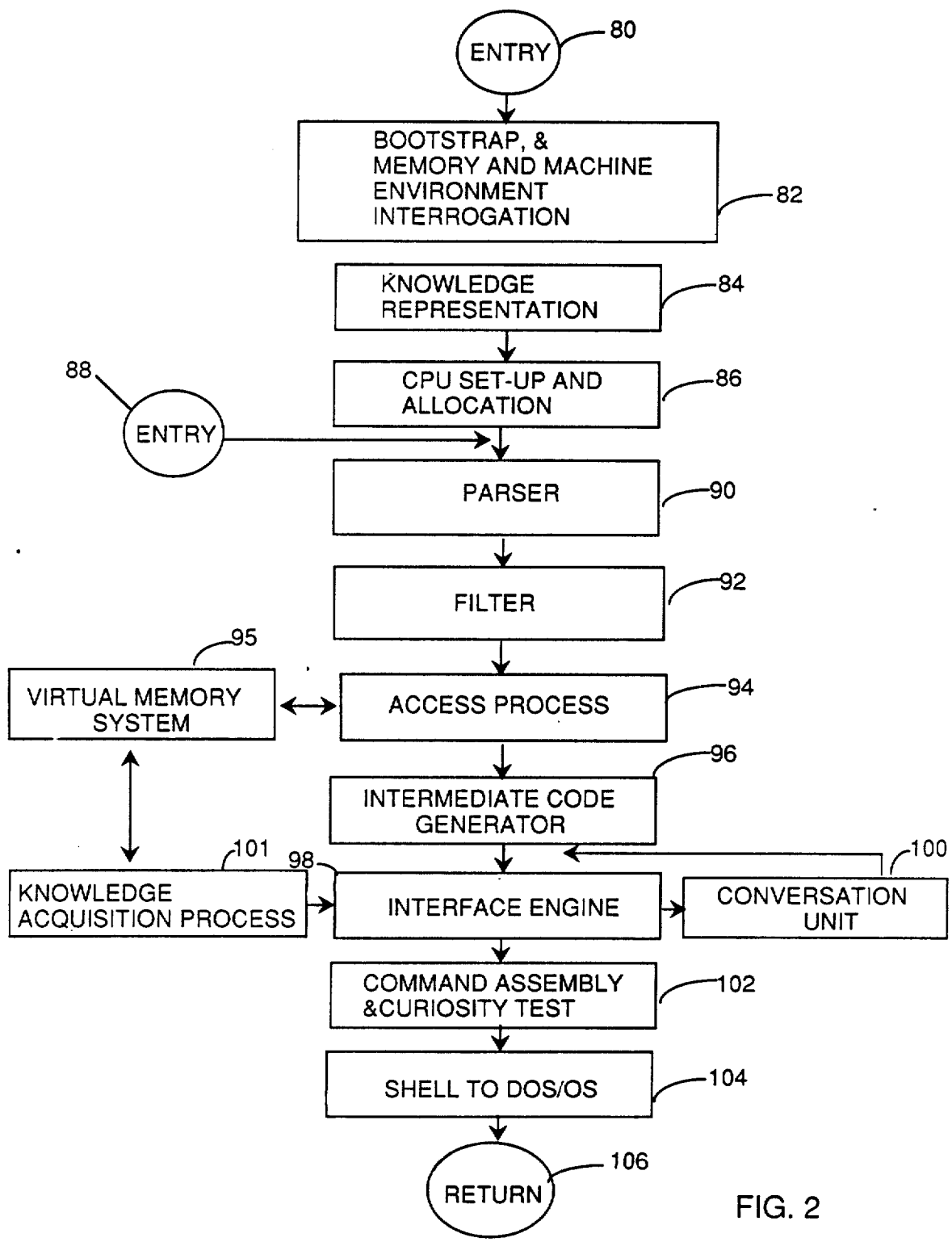
FIG. 2 is a generalized flow diagram illustrating the methodology and structural flow of a specific embodiment of a microcomputer program routine for the natural language operating system interface according to the invention.

Referring now to FIG. 2, there is shown a generalized flow diagram illustrating the methodology and structural flow for a specific embodiment of the system 50 natural language operating system interface according to the invention. The software is entered at entry point 80, with the bootstrap loading and environment interrogation process 82, as shown which provides self-installing features. This includes initialization procedures such as set up of tables, maps, etc., of preprogrammed knowledge about the system hardware and operating system environment, and set-up of variables such as setting entropy equal to 0 (zero). In addition, determination of the machine environment is conducted to permit bootstrap loading in which primitive interrogation routines are loaded to cause the system to collect knowledge about the system environment. This knowledge is then used to set flags, descriptors, etc., and to direct loading of procedures and routines based upon the results of the interrogation. The interrogation makes use of interrupts issued to interrogate memory locations or activate devices (e.g., disk drives) to determine the state of the memory location, the existence of a drive, etc. In each case, a 1 or a 0 is generated and stored as a code made up of these bits, thereby storing information about the system, such as what model of computer the software is loaded into (e.g., IBM-PC, ATT-6300, etc.), the number of drives, amount of random access memory (RAM), etc. This stored code constitutes background knowledge which is subsequently used by the software to direct loading of routines and setting the proper decision tables to adjust to the hardware, thus providing a self-adjusting software capable of automatically modifying itself to accommodate a variety of hardware systems. In addition, the type of display and graphic capability is determined during the machine environment interrogation. Thus, for example, the detection of an IBM monochrome display will cause the system to load a different graphics display routine than if a color graphics card were detected.

Once the machine environment is determined, a knowledge representation phase 84 is entered. In this phase, a scan of the disk drives is performed to read the drives and store the names, and structure of directories, sub-routines and files stored on the disks. This information is indexed and added to a sophisticated dynamic data structure that is well connected and indexed. After indexing, the information is placed in a virtual storage system. The virtual address and the cryptosignature produced by a filter are also placed in the data structure to be used by the access method (to be explained in detail hereinafter). This is followed by reading the vocabulary into RAM memory.

The results of this knowledge acquisition are then passed through a filter process (to be described in detail hereinafter) to mark the existence of each name and word within the filter Thus a bit-map is created with a one (1) stored to mark the existence of each word within the system so that the filter can later determine when a word in a user request is recognizable by the system. After passing each word through the filter marking procedure, each is passed through an access procedure which utilizes cryptographic techniques to allocate an address to each word based upon frequency characteristics of classes of words and their behavior within these classes. This provides a framework of organization for the vocabulary knowledge (i.e., knowledge representation) which is based upon cryptographic techniques. Once this address allocation is completed, each word is stored using the paging system to write knowledge or vocabulary into the virtual memory. Following the knowledge representation phase 84, a cpu allocation and set-up procedure 86 is performed, as shown. At the end of this process, the system may report (e.g., via the display) any detected system irregularities, such as malfunctioning disk drive, etc.

After the knowledge representation and the allocation process is completed, the user may enter a request in natural English as indicated at 88. At this point, the user is prompted for a user input and then the system waits for an input. Once a request is entered, the system processes the request to attempt to translate it into proper operating system commands. The system continues to attempt to complete the translation until it is successful by utilizing a system information entropy value and striving to approach an entropy value of unity. The translation process begins with a parser function 90 which parses the request into a number of new tokens (new combinations). This results in generating a series of alternative combinations of tokens that can be used to form other tokens. These newly formed combinations are used to determine a variety of levels of semantic (shallow and deep) understanding of the natural language request. Parser function 90 is further subdivided into two phases. The first phase separates the tokens in the user's request and stores them in TOKENPT array. The second phase combines the adjacent tokens to generate and test the existence of new combinations. The parser process assigns higher priority to tokens that are the result of the second phase. These tokens are passed through a unique cryptographic filter process 92 to provide high speed elimination of those tokens which cannot be recognized by the system (i.e., which are not in the stored vocabulary or name tables). In the illustrated embodiment, the filter provides a high degree of accuracy, eliminating most tokens which are not part of the system knowledge base with minimal computational overhead.

The system 50 utilizes the filter system to provide a high speed, computationally efficient preprocessing means to filter out (i.e., eliminate) words or tokens which are contained within the user request, but which are not contained within the system 50 knowledge base (i.e., data structures made of concepts, vocabulary and names). This saves the more complex and computationally intense access system from wasting time on words and other tokens not contained within the system. The filter system utilizes a partial pattern matching technique using a hashing function to provide a bit mapping transformation of each token which results in a one-to-one mapping with extreme accuracy. Thus, most of the tokens which get through the filter will be translatable within the system knowledge base.

The filter system makes use of two arrays of information: (1) an array (labeled XASCII) which contains a key code value for each ASCII character weighted according to the frequency of use. This table may also have values based upon frequency of use of multiple character combinations (i.e., n-grams), as are know in the cryptography art. Each location of this array is addressed based upon the numerical machine equivalent of the ASCII character; and (2) an array (Membership Array labelled Mapp) which is an array of 2000 bytes (2k of 8 bit bytes providing 16000 bits) arranged so that a unique bit can be marked for each token in the system knowledge base. The bits to be marked are chosen based on probability characteristics of the natural language. These cryptographic characteristics are dynamically adjusted by the automated learning process.

A bit is marked by storing one (1) during a marking process at a unique location representing the token. A five letter key selected based on cryptographic techniques is mapped to a location in the membership bit array. Each individual letter of the selected key is converted to the numerical equivalent (ordinality) of the character set (e.g., ASCII, EBCDIC, . . . .) to generate a value of each letter in the set (e.g., ordinality of D is 68 using ASCII codes). These values are then used to address a secondary array holding a different set of numerical values describing their probability distribution function. These values are periodically sampled and updated to achieve an optimal performance.

The filter assists the access method on pattern matching by producing a numerical signature of the token in question. This signature is an integer value formed by applying cryptography to a hashing function producing a virtually unique pattern which is referred to as a "crypto-signature" hereinafter. This value is then broken down to a byte position (labeled Bytepos) and a bit number (labelled Bitnum).

During the marking phase (i.e., during the knowledge representation phase), each token of the user request is passed through the filter, and tokens which are part of the knowledge base of the system are marked by the filter. Marking is accomplished by calculating the cryptosignature position and then by storing a one (1) at that bit position in the membership array. Subsequently, when a user request is entered and tokens identified, each token is passed through the filter and the calculated crypto-signature is used to check to determine if that position has been previously marked. If the position has not been marked, the token is rejected, and if it has been marked, the token is accepted and passed to the access system 94 along with the integer value called crypto-signature.

The access system 94 provides a means for accessing the knowledge stored on the system such as vocabularies, names and concepts. In general access method only provides searching and retrieval strategies for the knowledge stored in the virtual memory. The access method operates on a series of continuous storage locations that are dynamically partitioned to regions of different sizes.

The general purpose capability of this particular natural language interface results in an access method which possess adaptive (statistical) techniques for determining the sizes of these regions based on samplings done during bootstrap and environmental interrogation process 82. That is, the access method dynamically modifies the structure based upon previous runs of the system to assign the amount of storage needed for each region.

The access method is constructed based on self learning when the number of regions is predefined. In case of the access process 94, the system is supplied with the knowledge that the token's length should be used to select a region number (i.e., if the token is of length 5 then the fifth region is selected). Since the tokens or words of 10 characters length or more are all treated the same everywhere in the system, therefore the tenth region is used for holding all tokens greater than or equal to the length 10.

Figure 4A:
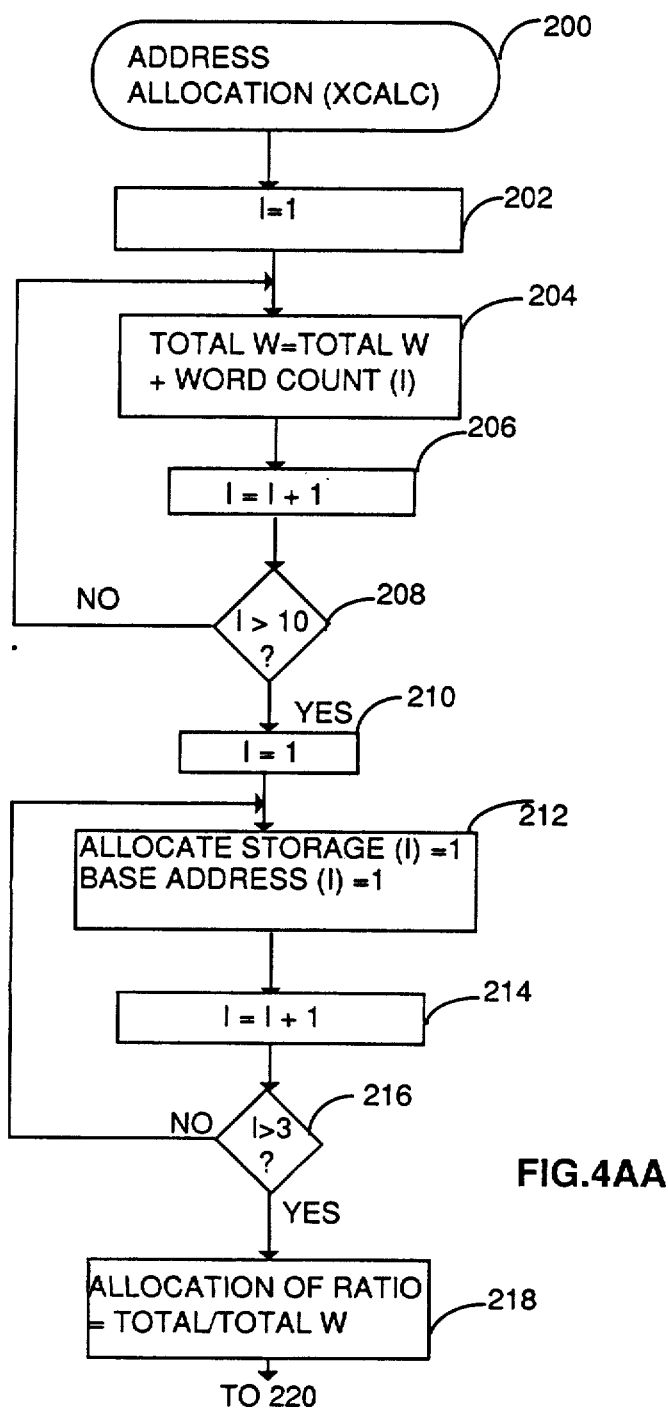
FIG. 4A (4AA and 4AB), FIG. 4B and FIG. 4C (4CA and 4CB) are flow diagrams illustrating the methodology and structural flow of a specific embodiment of the allocation function for a specific embodiment of the natural language operating system interface program illustrated in FIG. 2.
Figure 4A:
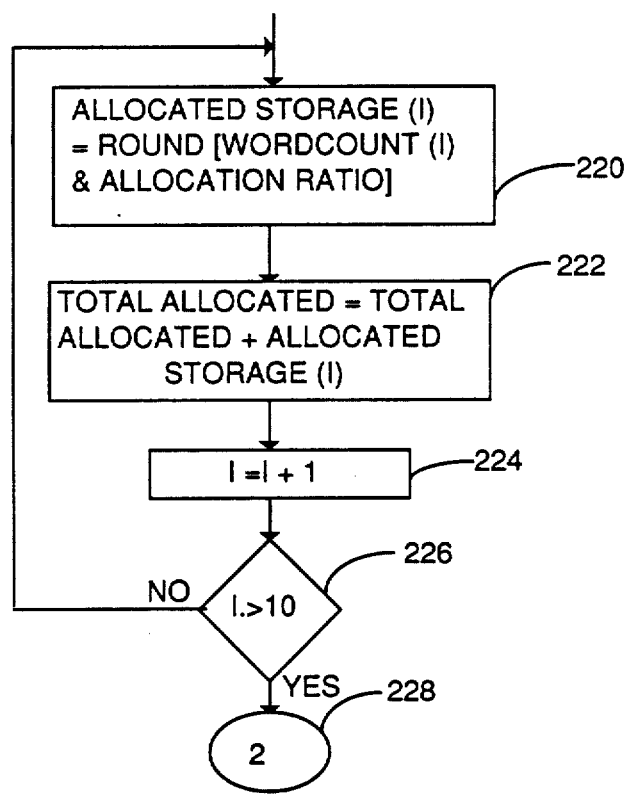

During process 82 a routine called XCALC, as shown in block 200 of FIG. 4A, is called for calculating the configuration of the system by computing and assigning a numerical value to each of the 10 members in 4 separate arrays (each member corresponds to a word length category). The first array ALOC is used to hold the amount of storage proportional to the number of the words found in each region. The second array contains the amount of overflow storage allocated to that region and calculated based on a process explained in detail in procedure XCALC. The third array JBASEADD holds the computed machine addresses of starting base address of each region. The forth array jOVFBASE contains the calculated machine addresses of the overflow base area. The third and fourth array mentioned above are computed using the information stored in the first and second arrays. The information in JBASEADD and JOVFBASE arrays are used to configure the access method when bootstrap and environmental interrogation process 82 is entered.

The access method tries to look at the key, selected from the token (as mentioned in filter process 92) as a means for providing a unique position in the index area (primary, secondary, link) based on the cryptographic algorithm that models this probalistic mapping as a ciphering process. The access process is viewed as a randomized ciphering process in the retrieval/allocation mode. The same key used in the ciphering process (token) can be used to decipher the access path which leads to the information in question. The access method operates on a series of continuous memory locations that are viewed by the access process as N large buckets (e.g., N is 75 for disc operating system). Each bucket contains M locations (e.g., M is 40 for the current prototype). Each of the M locations contains a crypto-signature to be used by the access system in pattern matching during the retrieve mode. Other information such as virtual address (page, offset) would allow us to retrieve or allocate the information related to the token in question in the virtual memory. The continuous memory locations are assigned to tokens of various lengths. The tokens are assigned to different areas of these regions (clusters) based on their length and cryptographic characteristics. The sizes of these regions are dynamically calculated and assigned when the system enters the bootstrap and environment integration 82. The XCALC process called by the bootstrap and environment integration 82 divides each of the regions into two sections of different sizes, hereinafter called primary and secondary index areas. The system dynamically balances and updates the length and sizes of the two areas so the system can balance its operation by deriving an estimated optimal balanced search strategy. The access method maintains an array of address pointers called OVHEAD that holds the beginning address of link area for each of the 10 regions.

The access method in short is made of 3 processes operating in their own space to allocate or retrieve an index in an array called INDEXMAPPSYS1. For each particular situation (numbers in JBASEADD, JOVFBASE, and OVHEAD) the access method configures itself to deal with that particular situation in the most optimal condition (minimal average risk). This balancing is done by mixing the three processes (ACCESS 1, ACCESS 2 and ACCESS 3) via a coded decision rule (IF...ELSE...) that use the numbers in JBASEADD, JOVFBASE, OVFHEAD and the length of the token for input. The result is a self-maintained optimize search that forms new strategies that were not explicitly thought by the system designer. The access paths (i.e., the number and order of possible empty index locations taken before reaching the token and terminating the search) are minimized by mixing the three processes (ACCESS 1, ACCESS 2 and ACCESS 3) in a dynamic and adaptive fashion to derive a single but balanced (cost of computing vs. speed of computing) strategy to deal with unknown command sets and industrial environment.

Access method 1 is a simple get and put routine used in table lookup procedures. Access method 1 is called by the other two access methods (i.e., when an empty index location is found) in order to allocate or retrieve an index in the SYSINDEXMAPP1 array. Access method 1 is made up of two routines called XGETADD and XPUTADD that load or store information in the proper registers or variables. Procedure XPUTADD places the virtual address and crypto-signature in the index structure array (i.e., SYSINDEX-MAPP1). Procedure XGETADD is more sophisticated because of pattern matching implemented in its process. Procedure XGETADD searches on the requested location for a similar cryptosignature, if a match is detected the virtual memory is called and the actual names are compared. The information is entered in the proper list or table to be processed by a knowledge acquisition process 101 or inference engine process 98 at a later time.

Access method 2 uses ACTUALBASEREG, JMAREG, DISPREG, and BUSREG which are memory locations participating in computing the offset value from the beginning position of INDEXMAPPSYS1 array (i.e., holding the virtual address and crypto-signature of information in virtual memory).

The access 2 sorts the keys and then sets the ACTUALBASEREG and UPPERBOUND locations to the numerical value found in JBASEADD array or JOVFBASE array based on the status of the OVFFLAG flag. JMAREG is set to the value of the ACTUALBASEREG. One of the most important functions of the access 2 is to ensure that the search does not exceed the boundaries (i.e., JMAREG and UPPERBOUND values) of the region in question While the search is within the boundaries, it transfers the subkeys computed in filter process 92 to DISPREG. At this point the contents of DISPREG is added to JMAREG location and then transferred to BUSREG. The contents of ACCESSDIRREG is checked to determine whether access 1 should perform a PUT or a GET operation. The unsuccessful termination of access 2 (i.e., TERMFLAG location set to zero) causes the XLINKMANAGER procedure to find or allocate an index in the link area of the region in use. If the access 2 is called upon by itself then the search would be performed in the primary area of the region. However if access 2 is called upon by access 3 then the boundaries of search are within the secondary index area of that region.

Access 3 uses ACTUALBASEREG, JMAREG, DISPREG, BUSREG and MDREG memory locations that participate in computing the offset value from the beginning position of the INDEXMAPPSYS1 array. Access 3 differs from access 2 by having a more accurate and complex (i.e., fast but expensive) process.

This process involves sorting two arrays called ACTUALKEYPOS and LEXAKEY that are used in computing the address of locations to be examined. The ACTUALBASEREG is set according to the numerical value found in JBASEADD array. The JMAREG is set to the value of the ACTUALBASEREG. The contents of NOOVFLOW memory location is compared with zero. Depending on the result, the UPPERBOUND value is set to the numerical valve of the JOVFBASE or JBASEADD array. While the search is within the boundaries, transfer the subkeys computed in the filter process 92 to DISPREG memory location. The contents of ACTUALKEYPOS array are then transferred to MDREG location. Memory locations JMAREG, ACTUALBASEREG and DISPREG are added and then transferred to BUSREG. Access 1 is entered based on the value of ACCESSDIRREG to perform a PUT or a GET operation. If access 3 did not successfully find or allocate the index in question in the primary area of that region, then access 2 process is entered. If there is no secondary index area allocated to that region then the XLINKMANAGER is called upon to terminate the search.

The access methods described above use the XLINKMANAGER process to successfully terminate an access request. The XLINKMANAGER uses dynamic memory allocation schemes to provide for storage of indexes which can not be placed in the primary or secondary index areas using access 3 and access 2. The OVFHEAD array maintains the beginning address of link (added) memory locations. These dynamic storage locations contain the virtual address and cryptosignature of information stored in the virtual memory. The contents of ACCESSDIRREG location is examined to either insert or retrieve from this dynamic link list area. The insertion/deletion is always made at the end of the list. If the contents of ACCESSDIRREG is found to be zero then the index is inserted at the end of the list and also contents of OVFHEAD array is updated. A one (1) in ACCESSDIRREG indicates a need for a GET operation to be performed. The starting address of this dynamic link list area is obtained from OVFHEAD array. Based on this starting address obtained, the list is traversed (searched) for a matching cryptosignature of the index. If the matching crypto-signature is found then process 95 is entered to fetch the corresponding piece of information from the virtual memory. A location called CALLREG is used to indicate whether knowledge acquisition or parser or inference engine have initiated a call to XLINKMANAGER procedure. The numerical value of CALLREG is used to decide whether to insert the received information from a virtual memory process 95 into the PATTERNTABLE (i.e., a table holding the patterns) or VOCABLIST (i.e., a list holding the vocabularies).

The access method classifies each token (word) into a category according to the length (number of characters) of the token. If the token cannot be allocated an address in the primary or secondary level, then it is allocated into a link area. Three access techniques are used by the access system including a first method (access 1) which is a simple direct look-up table approach used for the link area. An access 2 method uses the alphabetic characters of the token as a key to calculate an access address and is used for the secondary level of access and when the access 3 becomes cumbersome (expensive) to use. An access 3 method uses the selected key derived in process filter 90, sorts the keys by frequency of use and calculates an access address using each alphabetic character and its position relative to the others as keys to determine the address. The access system operates in a retrieval mode when a user request is being serviced. In the allocation mode, words are allocated to unique virtual addresses, while in the retrieval mode they are retrieved using the virtual addresses by searching for the crypto-signature.

Thus the storage structure is a multilevel feedback queue system made up of three levels, a primary level, a secondary level and an overflow level. The primary and secondary levels are preemptive queue structures where the amount of space assigned to each queue can be dynamically determined by observation (learning by experience or observation). That is, the access method dynamically modifies the structure based upon previous runs of the system to assign the amount of primary storage (base address and length) for each category of word length, and the amount of secondary storage (base address and length) for each category. This dynamic multilevel feedback queue structure is ideal for exploitation of parallel processor structure permitting separation of processes into categories based upon the need for processing capacity.

As future computers adapt parallel architectures (i.e., breaking Von Neumann bottleneck) the operating systems and control programs for those machine will eventually take advantage of their parallel environment. In order for an adaptive natural language interface to benefit and survive in the new environment they must have inherent parallel design built into their internal subprocesses. This adaptive natural language interface with few simple modifications is suitable for future multi-cpu environments.

Multiple cpu assignments (block 326 FIG. 5A) can be made of the many functions and processes of the system 50 such as bootstrap and environment interrogation 82, knowledge representation 84, parser 90, filter 92, access process 94, intermediate code generator 96, inference engine 98 conversation unit 100, knowledge acquisition 101 and command assembly and curiosity test 102. The following detailed descriptions show how parallelism (e.g., up to 41 cpu's) can be applied to parser function 90 and access process 94.

The output of the parser is made up of tokens or words (wl) of different lengths for L=1, ..., n. (ex: w5 refers to all the words of length 5). The access method after receiving the tokens places all the tokens of the same length on their corresponding queue type data structure in block 326. Since all the words of length 10 or greater are treated the same throughout the system, therefore only 10 queue structures (q1, ..., q10) are required to capture all possible cases. So q5 for example will contain all the words of length 5 from the users input and q10 contains all the words of length 10 or greater from the users input generated by the embodiment of function 90.

In order to exploit parallelism, as indicated by block 324 in the embodiment of knowledge representation process 84, multiple cpu assignment block 326 can be applied to these queues (q1, ..., q10). A unique processor (p1, ..., p10) can be attached to each queue to search for the crypto-signature of the tokens in question from their corresponding regions (r1,...,r10) (e.g., word of length 5 would be operated on the fifth region named r5. The regions are further divided into three separate areas called primary, overflow, and link areas and each of these areas have their own unique search strategies. This makes it possible to increase the degree of parallelism by assigning 3 processors to each of these regions so making it possible to perform the search in each area of these regions simultaneously. One master processor at level 1, 10 slave processor at level 2 (assigned to each region), and 30 other slave processors at level 3 (i.e., 3 processors for each region) describe the connectivity as indicated by block 328. The master processor acts as the supervisor to the processors of level 2 and processors of level 2 supervise the processors at level 3.

After the crypto-signature of the first word in a queue (qi) is detected then the processor is dispatched (released) from that process (first word in the queue) and then the next process (second word in the queue) is attached to that processor. Before this process is dispatched the state of the process (address of crypto-signature in the system) is saved on a memory location and then the next word in the queue is assigned to that processor. The same process is repeated for the cpu's at the third level (Pi1,Pi2,Pi3, where i=1, ... 10) again until the queue becomes empty meaning that all the addresses of the crypto-signature in the queue are processed.

Figure 18:
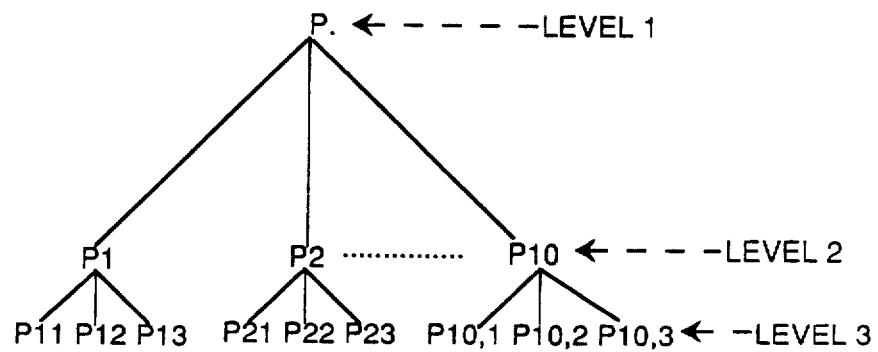
FIG. 18 is a flow chart illustrating the interconnection of three levels of processors in a parallel architecture implementation of the present invention that utilizes a matrix of 41 independent processors.

FIG. 18 shows a matrix of 41 processors ($P_0$ to $P_{10}$) needed for detecting all crypto-signatures simultaneously. The processors in each row that are assigned to primary, secondary and link area, are required to occasionally communicate with each other. However the interprocessor communication is only required during allocation mode.

In a multiprocessing environment it must be guaranteed that 2 or more processors do not access a memory location simultaneously so exclusive access to a memory location must be ensured. This exclusiveness of access is called mutual exclusion between processors. So in designing the parallel access method a mechanism provide for enforcing mutual exclusion when 2 or more processors tend to access the same address in the virtual storage. Enforcing mutual exclusion can be done by placing a semaphore at the record level in the virtual system. If 2 or more processes want to access the same memory location, these processors are placed in a queue and then are allowed to access the memory location one at a time, so simultaneous access to those locations are prevented.

The above is one specific embodiment of a parallel architecture for the parser function 90 and access process 94 to perform simultaneous search on various parts of the user requested inputs. The access process 94 operates on INDEXMAPPSYS1 array which holds the virtual address (page, offset) as one of its parameters. This parameter is made of two sub-parameters P (page no) and Q (offset). The page number and offset are used by virtual system routines to place or retrieve information from virtual memory. Page replacement policies such as least frequently used (LFU) and least recently used (LRU) are combined together to form a more accurate paging policy (called efficiency of survival policy).

A virtual memory system is used by the access system as well as for their function for system knowledge allocation and retrieval. The knowledge in the system can sometimes grow so large that it cannot practically be stored in the main memory. The virtual memory system enables the mass storage devices (e.g., floppy or hard discs) to be used to make more memory available thereby reducing total main memory requirements. The system accesses the knowledge through a virtual memory routine such that the system references only the virtual address space with all operations performed in main memory. Thus, only a few blocks of knowledge (data) of the virtual memory are resident in the main memory at any one time. Whenever an address is referenced, the virtual memory system maps it into a main memory address. Each type of knowledge has a separate virtual address space which is divided into pages and records, and the system references the knowledge by passing values for the type, page number and record number of the knowledge and the types of operations to be performed on the knowledge. The system then performs the required operation after mapping the knowledge into main memory.

The virtual system 95, is used by access process 94 in order to reduce the amount of memory required for mapping the user request to a valid operating system command. The access process 94 is used by parser process 90 to search for all the virtual addresses of different possible interpretations of the token in question. These virtual addresses are used by the inference engine process 98 and intermediate code generator process 96 to consider the existence of various interpretations of a single token in different situations.

After the meaning of each token within the operating environment is determined by the access process 94 at the request of parser process 90, then the resulting table called PATTERNTABLE is passed to an intermediate code generating process 96, as shown. This PATTERNTABLE contains a variety of information such as operation code, position of the token within the sentence, page number, offset number and the token name. The page number and the offset number are used by the inference engine process 98 to obtain more information from the knowledge base maintained in the virtual system 95. This knowledge can be used to draw additional inferences required to deal with ambiguous and ill-formed user requests that are inputed by novice users.

The intermediate code generator process 96 sorts the pattern table prepared by the access process 94. The position of the token within a sentence is used to perform this sorting process. The next four steps are performed on PATTERNTABLE to generate a code which we call LARIC (linear ambiguous redundant inconsistent code). The first step is to search for all the NULL words. These null tokens created by the users during the knowledge acquisition process 101 are used to explicitly ignore certain unwanted occurrences of tokens in the user input. The second step is to obtain an opcode and virtual addresses of any token that can be interpreted as a command anywhere in the knowledge base. This step allows lexical ambiguities to exist between a command name and other similar names maintained in the knowledge base. The output of this phase is a list of lexically ambiguous commands. During the third step all prepositions and connective tokens are identified and inserted into an array called PSMARK. The last step is to detect any explicit referencing to a class or groups of objects. These explicit references can remove lexical ambiguities due to overlapping (one object belonging to two different classes, e.g., a file and a subdirectory may share the same name as in UNIX and DOS operating system environments) of different classes. The main function of the intermediate code generator process 96 is to rearrange the pattern table in a form suitable to be used by the inference engine.

The inference engine process 98 is coupled with the knowledge acquisition process 101 and the conversation unit process 100 to provide a means for adding or modifying existing inferences that are used for mapping the user's request into operating system commands. The PSMARK array created during the intermediate code generator process 96 is further subdivided into 4 smaller arrays called ANDPS1, ORPS1, TOPS1 and OWPS1. These arrays are used to mark the original boundaries of objects divided into groups and supersets (objects belonging to the same hierarchial structures). The boundaries of groups and supersets are used as the original hypothesis rules to be inputed into the inference mechanisms.

The inference engine mechanism must be able to deal with a non-formatted, fragmented and ill-formed natural language request. Such a mechanism should be able to form or refine new hypothesis based upon the original inputs. The inference engine uses the 4 arrays mentioned earlier to change the contents of the arrays ANDPS2, ORPS2, TOPS2 and OWPS2 to mark the formation of a new hypothesis after applying the following rules. These rules serve as heuristics for forming a valid interpretation of an ambiguous request. The first rule is that objects of the same class bind together much more tighter than objects from different classes. The second heuristic suggests that elements of the natural language corresponds to various classes or structural regularities which are inherent to the operating environment (e.g., in DOS and UNIX a hierarchial structure is used to partition the objects and resources in the operating system). These regularities hereinafter are referred to as supersets. The formation of supersets should take priority over formation of groups. This rule sometimes conflicts with the rule that objects of the same class be given the highest priority.

In order to resolve such conflicts (semantic deadlock), a deadlock removing algorithm called GOOD-NEIGHBOR PROCESS is applied. This deadlock resolution process ensures that every superset which might be in the neighborhood (immediate left or right) of groups formed by other objects, to be given a chance to temporarily borrow a member of these groups to complete its required structure. After borrowing a member the superset is tested for its validity within the operating environment. If the superset is found to be valid then the arrays are updated to reflect the formation of the newly formed hypothesis. If the superset is found to be invalid then the algorithm proceeds from the left of the sentence to its right forming and refining sets, groups and supersets. These sets, groups and supersets are inputs to a MIX-AND-MATCH algorithm which maps the groups of various hierarchies into supersets by enforcing a hierarchial order on those groups.

The MIX-AND-MATCH algorithm performs two different matching techniques. The first technique uses a one to one mapping (implied ordering) strategy where each member of a set is mapped to one member of another set only. The second matching technique uses a one-to-many mapping strategy where a member of one set is mapped into every member of the other set. The sets used by both techniques are rearranged (sorted) according to their level in the operating environment hierarchy (e.g., files, subdirectories and drive names reflect a hierarchial structure of objects in DOS environment). The one-to-one mapping strategy is used if the total number of the objects in one group is equal to the total number of the objects in the other group whereas the one-to-many mapping strategy is used when the total number of the objects in one group is not equal to the total number of the objects in the other group.

The purpose of the mapping techniques mentioned above are to create alternative existing supersets interpreted from the user request. These supersets which are outputs of the MIX-AND-MATCH algorithm are then checked for their validity within the knowledge base via filter process 92 and access process 94. This MIX-AND-MATCH algorithm is controlled by MIXLIM memory location. The MIXLIM is used to implement a fast learning by experience mechanism that is either increased or decreased based on positive or negative experiences encountered during the ONE-TO-ONE and ONE-TO-MANY mapping process selection of the MIX-AND-MATCH algorithm. The user is prompted to select the more suitable interpretation of his request based on the ONE-TO-ONE and ONE-TO-MANY mapping strategies. The users choice is recorded on MIXLIM memory location. The same situation may occur sometime in the future. Once a user selects one of the strategies more than n number of times, then that strategy is selected by the system as the primary alternative for generating the supersets. Thus, the MIXLIM is used to reflect the past n number of experience of the same situation. The MIXLIM and many other memory locations are used to create an inference mechanism which learns from past experiences to modify its control structure.

The virtual addresses of tokens that are possible candidates for commands which were created by intermediate code generator process 96 are used in the next step of the inference engine process 98 to automatically resolve the existing lexical ambiguity as indicated by the intermediate code generator process. The next part of the inference engine deals with ambiguities and inconsistencies that may exist due to missing or additional parameters needed to activate an equivalent operating system command. The knowledge associated with the page number and offset of the candidate command is fetched by the virtual system. This knowledge is made up of various data structures and memory locations created and filled by the knowledge acquisition process 101. This acquired information and entropy concept is used to measure a degree of similarity and dissimilarity of the command candidate with the parameters generated in the first part of the inference engine The second half of the inference engine 98 determines from the output of the first half whether sufficient information exists to complete the requested operating system commands, (i.e., sufficiency test) utilizing the known information theory concepts of entropy and key equivocation. An ambiguity test and an inconsistency test is also performed by the inference engine to determine when there is ambiguous or inconsistent (i.e., redundant) information contained in the request. The ambiguity test detects missing parts of a user request by performing an exclusive-or operation on the pattern of the user request and a stored bit pattern of the requested operating system bit command. The result is then AND'ed with the user request bit pattern to produce a bit representing the missing information. The inconsistency test detects extra information by first AND'ing the bit pattern of the user request with the stored bit pattern of the requested command, and then performing an Exclusive-OR of the result and the user request bit pattern. Thus the second half of the inference engine determines, based upon the user request and upon the stored knowledge base, the interpretation of the request which is most likely intended. Then the inference engine determines what information is still needed and activates a conversation engine 100 to present the appropriate question to the user in order to obtain the missing information which was not contained in the user request. After the user responds, the inference engine again processes the request and this process continues until sufficient information exists and ambiguities and inconsistencies are eliminated.

The second part of the inference engine is repeated for every command candidate. The candidates are rearranged (sorted) by their degree of similarity. The top most command candidate is picked up for participating in forming operating system commands in the next command assembly and curiosity test process 102. If there is more than one candidate available after the sorting process then all interpretations are displayed for the user to select his/her proper choice.

There are two basic ways in which the present invention uses learning theory to improve its speed and quality of performance. The first type of learning, hereinafter referred to as skill refinement learning, enables the system to improve the quality of its inductive reasoning (cognitive process) by experiences acquired through usage. This type of learning is a dominant factor in filter process 90, access process 94, and inference engine 98. This skill refinement learning is an automatic process (hidden from the user) which is improved by repeated use of the system. The second type of learning method hereinafter referred to as knowledge acquisition is quite different in such a way that it is explicitly called upon to add new and non-existing concepts, parameters, descriptions and physical models of the secondary language to the present knowledge base of the system. While skill refinement is more concerned with improving and modifying the existing knowledge in the system, the knowledge acquisition process 101 is designed to acquire new information from the user through preprogrammed dialogue routines.

The knowledge acquisition process 101 is available to the user at any point during the human-computer interface. The user can add new facts and concepts to the predefined types of domains that reflect the underlying conceptual model of the operating environment. The present implementation of this invention uses the following 28 domains (expandable up to 128 domains) RESERVED, DEVICES, MACHINES, DRIVES, PATHS, FILENAMES, EXTENSIONS, DATE REFERENCES, TIME REFERENCES, SIZE REFERENCES, ATTRIBUTE REFERENCES, RELATIONAL OPERATOR, LOGICAL OPERATORS, COMMAND, OPTIONS, NAME HINTS, PREPOSITIONS, NUMERIC REFERENCES, NULL-WORDS, VOCABULARY REFERENCES, CONVERSATIONS, NOTES, HELPS, WH-phrases (e.g., where, when, what, etc. . . . ), ANAPHORA HINTS, CLASS REFERENCES, FUNCTIONS, and EMOTIONS to draw a conceptual model of the modern operating system environments. By predefining the domains the system acquires a genetic (empty) conceptual framework which can be filled via knowledge acquisition process 101 to accommodate the user's native operating environment. The system is aware of the fact that there are such things as commands, drives, device, etc. by programming techniques. Further, different instances of these domains can be acquired from the user through knowledge acquisition procedures using dialogues to ease and control the learning of new facts and concepts. The system must know that there is a domain called COMMAND with some general properties and restrictions before it can learn from the user about a concept called "COPY inputfile, outputfile", as seen in the VAX/VMS operating system. The adaptive nature of the system 50 allows the system to be able to modify its existing structure and knowledge to deal with a wide range of operating system environments. Using the latter approach combined with a general purpose microprogrammable inference engine we can create a general purpose natural language processor that can keep up with various updates made to the operating system, without any need for further conventional programming.

The knowledge acquisition process 101 is made of n distinct subroutines (e.g., n=28 in the illustrated embodiment), each of which is a series of questions prompted to the user in a user friendly dialogue to acquire new concepts and facts. The SUBOPVECT array of structures is used to maintain an internal indexing system that is used to reflect additions or changes needed to be made to other concepts (e.g., a change in the command structure implies a change in options associated with that command structure). The SUBOPVECT consists of a numerical value called TOP and an array of numbers called PQHOLD that will help the system to locate the virtual address for a bit map position. There are separate data structures that are initialized and saved in the knowledge base when new concepts are created. The information to be saved in each data structure, is obtained from the user through a user friendly dialogue. A series of questions such as the name of the command, its parameter, default values, its direction of flow between parameters and its syntax are answered by the user and converted into the following fields or zones such as an array called SKELLETON, a 16 byte microcode, 12 byte microcode, integers corresponding to default values, types of parameters and types of responses needed to be activated by the conversation engine in the presence or absence of some values in the fields of micro instructions. These series of questions are asked from the user only if they are not previously encountered by the system. This information identifies control activities for a functional resource (general purpose procedure) which exists in the inference engine process 98 and command assembly and curiosity test 102.

The information mentioned above is constructed and used in the system to model an extended-microinstruction which contains a variety of fields or zones such as bit-maps, names, pointers, counters, arrays, etc.. The user can change the contents of control and mapping mechanisms found in the inference engine and command assembly process, by changing the contents of a field or zone of an extended-microinstruction through the knowledge acquisition process 101. This micro programming process is done internally by each of the 28 subroutines corresponding to domain types as the information is received from the dialogue routines. The fields or zones of extended-microinstructions are used by various subprocesses through the inference engine process 98, conversation unit 100 and command assembly and curiosity test process 102 as they are needed. These fields or zones are used to direct the decision making process regarding program flow as the mapping of primary language to secondary language proceeds. These zones or fields such as bitmaps and numerical values and etc., are marked during the internal micro programming process. The extended-micro instruction concept used in knowledge acquisition process 101 allow us to construct the inference engine as a priority branch control unit which uses various zones of a concept to perform the branching in the control mechanism.

The ability to change the programs control mechanism and program flow through extended-microcoding results in an efficient adaptive natural language processor that can further be redefined and extended without any need to change its internal structure. The inference engine interacts with the conversation unit 100 in order to map the missing information or ambiguous situations to a series of predefined (user definable) questions or conversational phrases that are easily understandable by the user.

The conversation unit 100 provides a series of general purpose functions which are used to maintain or create new conversational phrases, sentences, or questions to deal with a new particular situation. These situations arise due to learning capabilities that are provided by the knowledge acquisition process 101. The conversation unit is called upon by the inference engine to display the proper sentence corresponding to the similar situation taught to the system during the knowledge acquisition process 101.

The conversation unit makes use of a CONVREC memory location. The CONVREC consists of a numeric value to be used to make efficient use of a string character location that is also maintained in CONVREC. These strings of character locations represent different random responses used by the system to convey the exact same meaning. Thus when a similar situation occurs the user is responded with a different sentence referring to a similar situation. The conversation unit can be extended or modified during the knowledge acquisition process 101 as the system learns new situations and concepts such as commands, options and parameters. These newly learned concepts eventually create a need for a proper response to be associated with them. Therefore this need can be serviced by the user or the knowledge engineer during the knowledge acquisition process. In summary, the conversation unit 100 generates random responses to the same situations by displaying one sentence selected from a series of semantically equivalent sentences with different syntax maintained in CONVREC.

The conversation unit 100 assists the inference engine 98 in removing all existing ambiguities or inconsistencies that might be present in user's request. At this point, the parameters (objects, groups and supersets) plus the PATTERNTABLE which have been modified during the inference process 98 are inputed into the command assembly and curiosity test process 102. This operation code further reflects the actual interpretation (function) needed to process that token.

The command assembly and curiosity test process 102 is further divided into seven phases. All the data structures and parameters inputed in the first phase are examined for their operation code. The value of the operation code is used to insert the token into a stack memory organization. The retrieved operation code determines the stack number to be selected for insertion (i.e., opcode of number 3 means selection of stack number 3). This results in a more suitable data structure for generating equivalent operating system commands. These stack organizations separate the tokens based on their functionality characteristic in the system.

The second phase deals with situations where no token corresponding to a command can be detected from the user's input. Therefore the parameters that are currently available are combined to produce a bit map to be checked against a bit map pattern of every single command that exists in the knowledge base to detect the most suitable candidates. As the matching process continues, two values are calculated to measure the degree of similarity or dissimilarity between the candidate command and the available parameters. The top most candidate commands are displayed back to the user and he/she is asked to make a selection. After this selection process the command solicited from the user is inserted into its proper stack organization and the command assembly process 102 proceeds to the next phase.

The third phase replaces all the user defined vocabularies and name references (i.e., terms defined by the user for naming objects, names, time, date, events, etc.) by their equivalent internal interpretation (value) within the system. This process results in mapping from human terms to their actual values as defined by the user during knowledge acquisition process 101 (i.e., the word February is replaced by 2/01<MONTH<2/29). The name references and vocabularies that are substituted by their real value during the third phase are used in the next phase to search and separate those objects that match with such values.

The forth phase maps from the object descriptions (files, subdirectories, drives, etc.) to actual objects meeting the required criteria. The fifth phase tries to deal with the situation where a single user request may require a command to be executed for a number of times. This is an extended service provided by the system 50 to facilitate the user's interface with the operating system in a more sophisticated fashion. The need for multiple execution of commands is serviced by mapping the available parameters to the commands found in the stack. The result of this phase is a set of commands with their corresponding parameters maintained in a sequential list which are pointed to by ICLPT memory location.

During the sixth step the system performs a curiosity test to determine the consequences of performing the request (i.e., how long will it take, what will it do to the system). The system then displays to the user the constructed operating system command and the result of the curiosity test so that the operator is informed if his request will produce unwanted or drastic results (e.g., unintended deletion of many files, etc.). The user may then modify the request or authorize performance of the request. If authorized, the operating system command is passed to the last phase. The seventh phase receives the parameters and data structures from previous phases and rearranges them according to the syntax of the existing command set as defined by the user during knowledge acquisition process 101. This phase makes use of an array called SKELETON which is created and saved as commands are taught to the system by the user. The SKELETON array guides the system in mapping from the internal representation of requests to their externally defined secondary command language.

The last phase of the command assembly and curiosity test 102 reflect the adaptive characteristics of the system 50. This phase in an abstract sense can be viewed as a mapping mechanism to facilitate translation from internal representation of commands to any externally defined user format (inputed during knowledge acquisition phase 101). This totally eliminates any need for existence of internal dependencies (i.e., hard coding or explicit programming) of the program to the specific command set of the operating environment. After constructing the proper operating system command in the last step, the operating system command is passed for execution to the operating system as shown at 104.

Figure 3A:
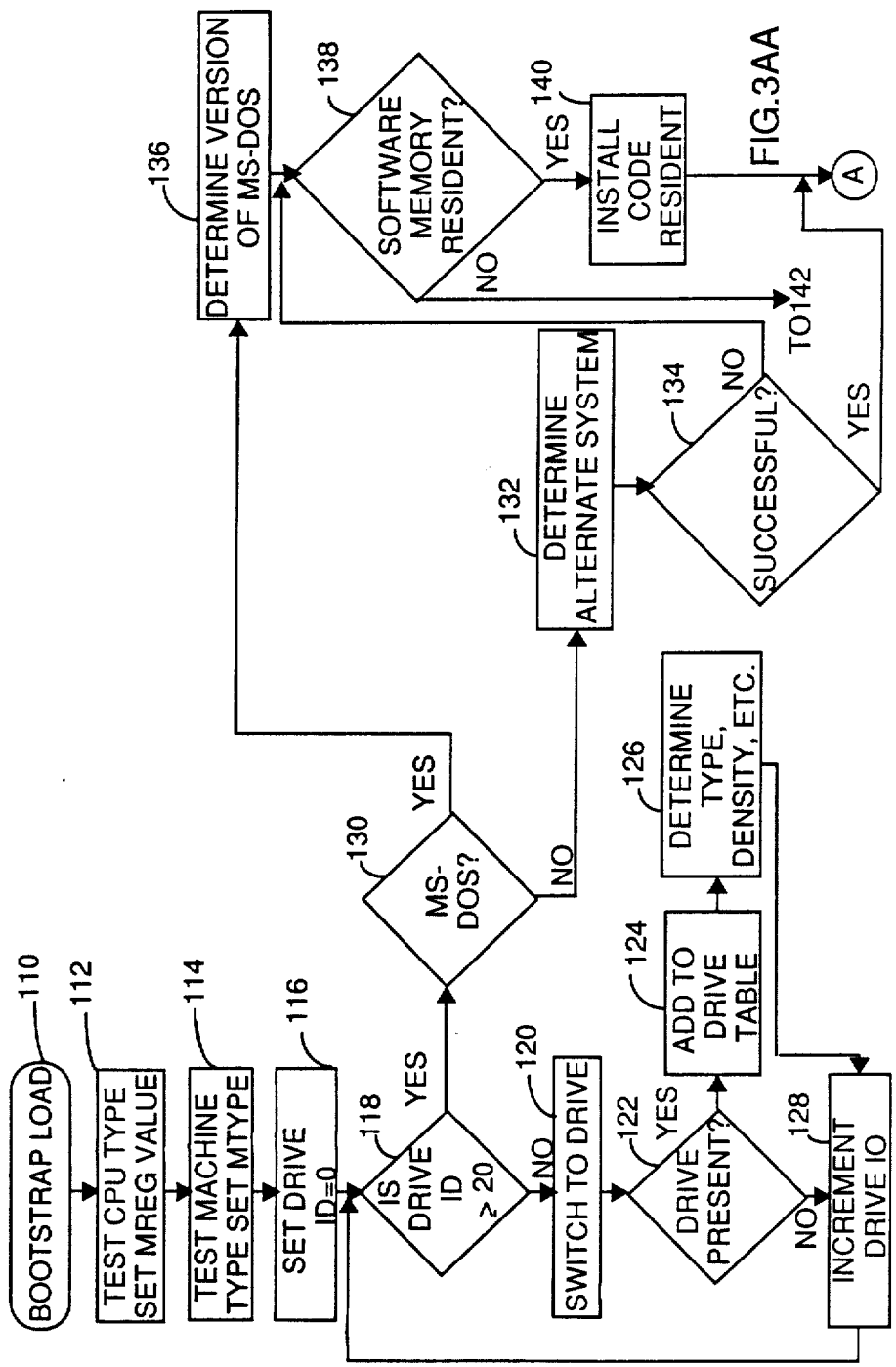
FIG. 3A (3AA and 3AB) and FIG. 3B (3BA and 3BB) are flow diagrams illustrating the methodology and structural flow of a specific embodiment of the bootstrap and machine environment functions for a specific embodiment of the natural language operating system interface program illustrated in FIG. 2.
Figure 3A:
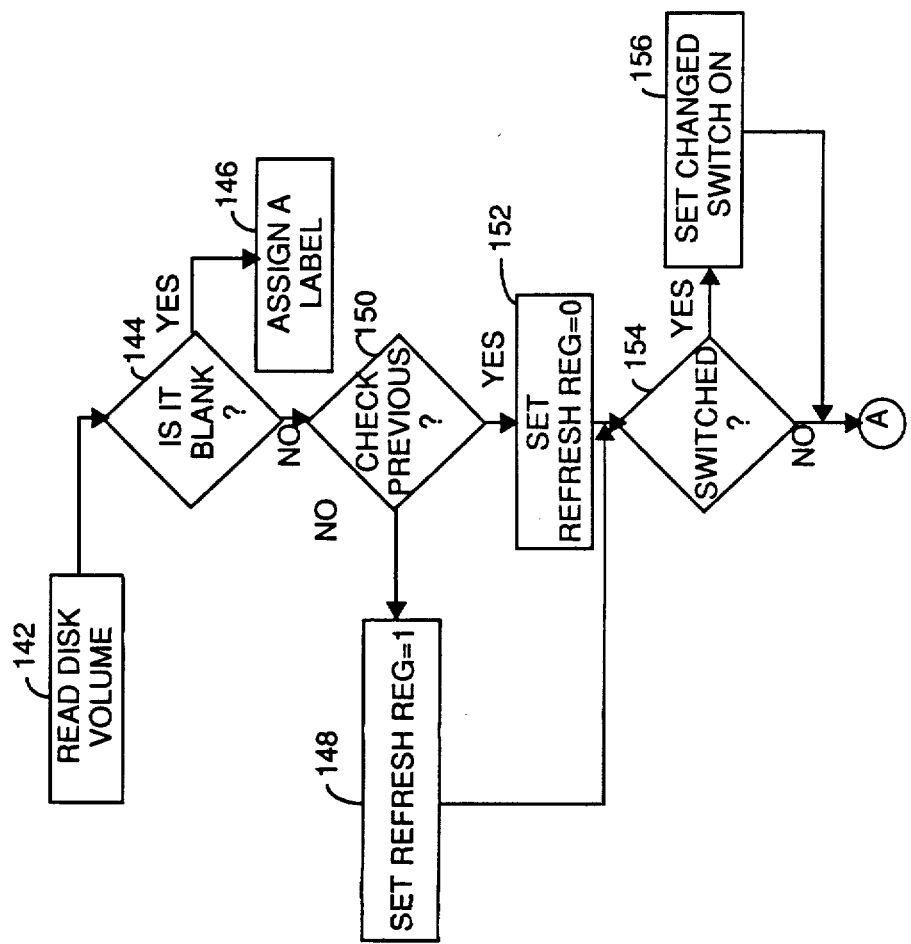

Referring now to FIG. 3A, there is shown a generalized flow diagram illustrating the methodology and structural flow for a self-installing bootstrap and environment interrogation process for a specific embodiment of the natural language operating system interface system 50 according to the invention. This process begins with the loading 110 of basic routines which initialize variables and send interrupts to various devices and read memory location to determine such perimeters as amount of memory available and sets various variables and flags. These test routines are followed by further interrogation of the environment including a test 112 to determine what type of processor is used (e.g., Intel 8088, 8086, 80286, etc.) and set a Machine Register (MReg) variable accordingly. The processing flow then continues to block 114 where an attempt is made to determine what type of machine (e.g., IBM PC, XT, AT, Compaq Portable etc.) the program is running on and a variable MType Reg to set accordingly. If not enough information is available, the system will determine machine type after more information is available. A disk drive variable (Drive ID) is then set to zero, as shown at 116. Processing flow then proceeds to block 118 where the drive ID is tested to determine if it is less than 20.

If the drive ID is less than 20, a series of tests on drives will be done to determine which drives are available and what types of drives are available, to provide knowledge which will be used in the virtual memory system and in the manipulation of the vocabulary system. Thus if the result at block 118 is that the drive ID is less than 20, program flow proceeds to block 120 where an attempt is made to switch to the drive of the ID test number. Processing flow then continues to block 122 where the drive is tested to determine if it is present, and if so, program flow proceeds to block 124 and 126 to add to the drive table and to determine its type, density, and other characteristics. This information is stored and processing flow then proceeds to block 128 where the drive ID number is incremented, after which processing flow branches back to block 118 where the process is repeated.

If, however, the result at block 118 is that the drive ID is greater than 20, processing flow branches to block 130 to begin a series of tests to determine the type of operating system in use by examining such things as memory locations or the use of certain function calls or shell calls. This information will then be stored as descriptors for use in decision making during operation of the program and for controlling configuration of the software routines. Thus block 130, a test is performed to determine whether the operating system is MS-DOS or not, and if the result is affirmative, program flow is branched to block 132, as shown, where a series of tests are performed to determine whether the operating system is an alternate operating system (e.g., an operating system marketed by AT&T under the trademark of UNIX). Processing control then proceeds to block 134 where a test is performed to determine whether an alternative operating system was identified or not. If so, the result of the test is stored and processing flow branches to node 158, while if the result is negative, processing control branches to block 138, as shown.

If the result of the tests at block 130 is affirmative, processing flow branches to block 136 where the version of MS-DOS is determined, and the result is stored by setting a version register to the appropriate value and storing it. Processing flow then continues to block 138 where a test is performed to determine whether the software is to be memory resident. If the result of the test at block 138 is affirmative, the code of the natural language interface software is installed as resident in RAM memory, as illustrated at block 140, and processing then proceeds to node 158, as shown.

If the result of the rest at block 138 is negative, processing control branches to block 142 where the primary mass storage hard disk volume label is read. If it is blank, as indicated at 144, the processing control branches to block 146 to assign a label, and then branches back to block 150 wherein a check of previous transactions is done. If the result at block 150 is negative, processing flow branches to block 148, where a reset register variable is set equal to one (1), and if the result is affirmative, the reset register variable is set equal to zero (0) at block 152, and processing flow then continues to block 154, as shown. At block 154, a test is performed to determine whether the volume label has been switched, and if the result is affirmative, a changed switch variable is set on, as shown at 156, and if the result is negative at block 154, processing flow continues to node 158, as shown.

Figure 3B:
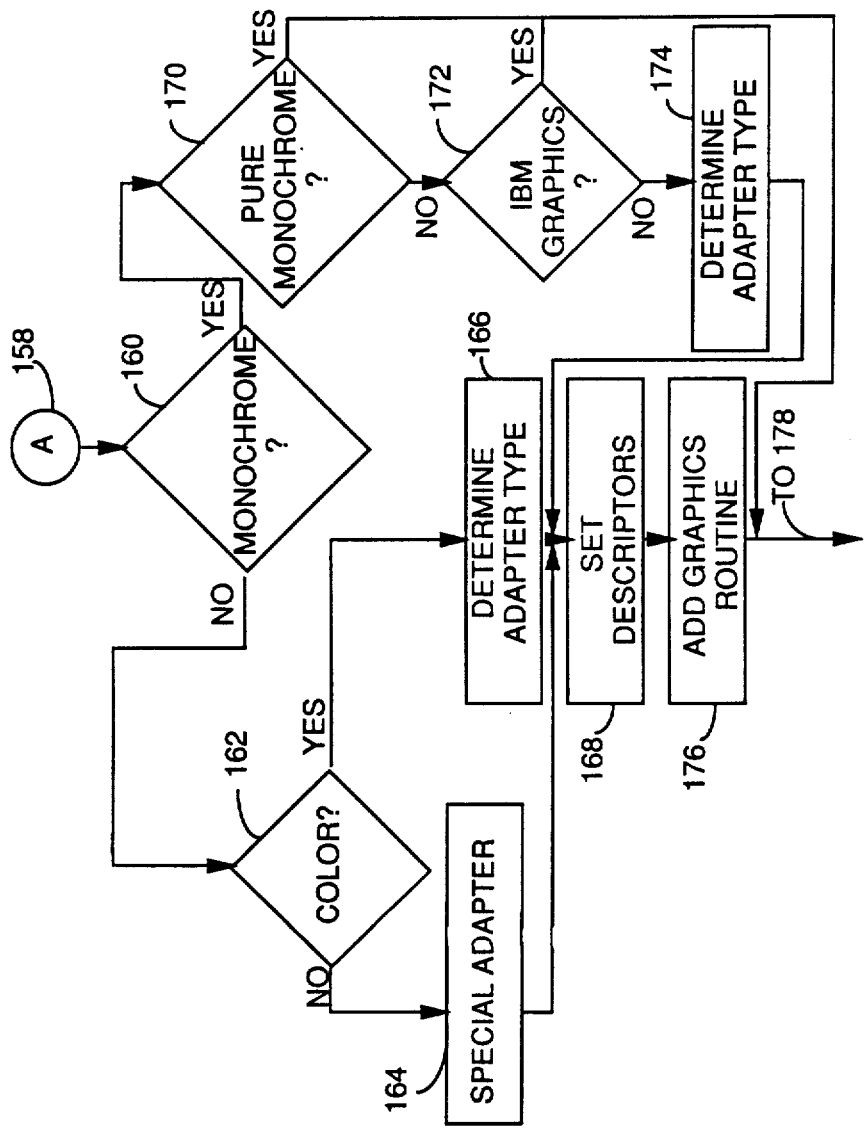

The continuation of the specific embodiment of the natural language operating system interface routine for the bootstrap and environment interrogation process is illustrated in FIG. 3B with the continuation from node 158, as shown. The processing flow continues to block 160 which begins a set of tests to determine the type of monitor and monitor adaptor hardware available within the system. This information is used to select the proper graphics routines for the system hardware configuration, and to appropriately set any necessary descriptors to cause the proper operations of those routines. Thus, at block 160, a test is performed to determine whether the display is monochrome or not, and if the result is negative, program flow continues to block to 162 where test is performed to determine whether the monitor is a color monitor. If the result of block 162 is negative, program flow branches to block 164 which determines the presence of a special adapter after which program flow proceeds to block 168, as shown. If the result of the test at block 162 is affirmative, processing flow branches to block 166 where the type of color adapter is determined, as shown.

Returning to block 160, if the result of the test is affirmative, indicating a monochrome monitor is being used, processing flow branches to block 170 to determine whether the system is using pure monochrome or uses a graphics adapter in addition. If the result at block 170 is negative, processing flow proceeds to block 172, as shown, where a test is performed to determine whether an IBM graphics card is present. If the result at block 172 is negative, a set of tests is performed to determine whether another type of adapter is present and identify that type of adapter, as shown at block 174. Processing flow then continues to block 168, as shown. If the result of the tests at blocks 170 and 172 are affirmative, processing flow proceeds to block 178, as shown. At block 168, the appropriate descriptors are set for the type of system as determined by the test up to that point, and processing flow then continues to block 176 where the appropriate graphics routines are added as required by the system configuration.

Processing flow then continues to block 178 where statistical information involving cryptographic pattern indexes are set. The disk drives are then scanned to read the file names, labels, etc., into a table, and the vocabulary is read in, as indicated in block 180. The virtual addresses are then allocated, configured, and activated, as indicated at blocks 182 and 184. After the virtual memory is activated, basic bookkeeping involving initializing values and allocation is performed, as shown at block 186, and then the remaining routines, as required by the system configuration, as determined by the previous environment interrogation, are loaded for operation of the natural language operating system interface. After loading of the routines, processing flow proceeds to a test 190 to determine whether parallel cpu's are being used. If the result of this test is affirmative, the processing flow proceeds to block 192 where cpu assignment is determined and then processing flow branches to the knowledge representation phase illustrated by block 194. IF the result at block 190 is negative, processing flow branches directly to the knowledge representation phase 194, as shown.

Figure 4B:
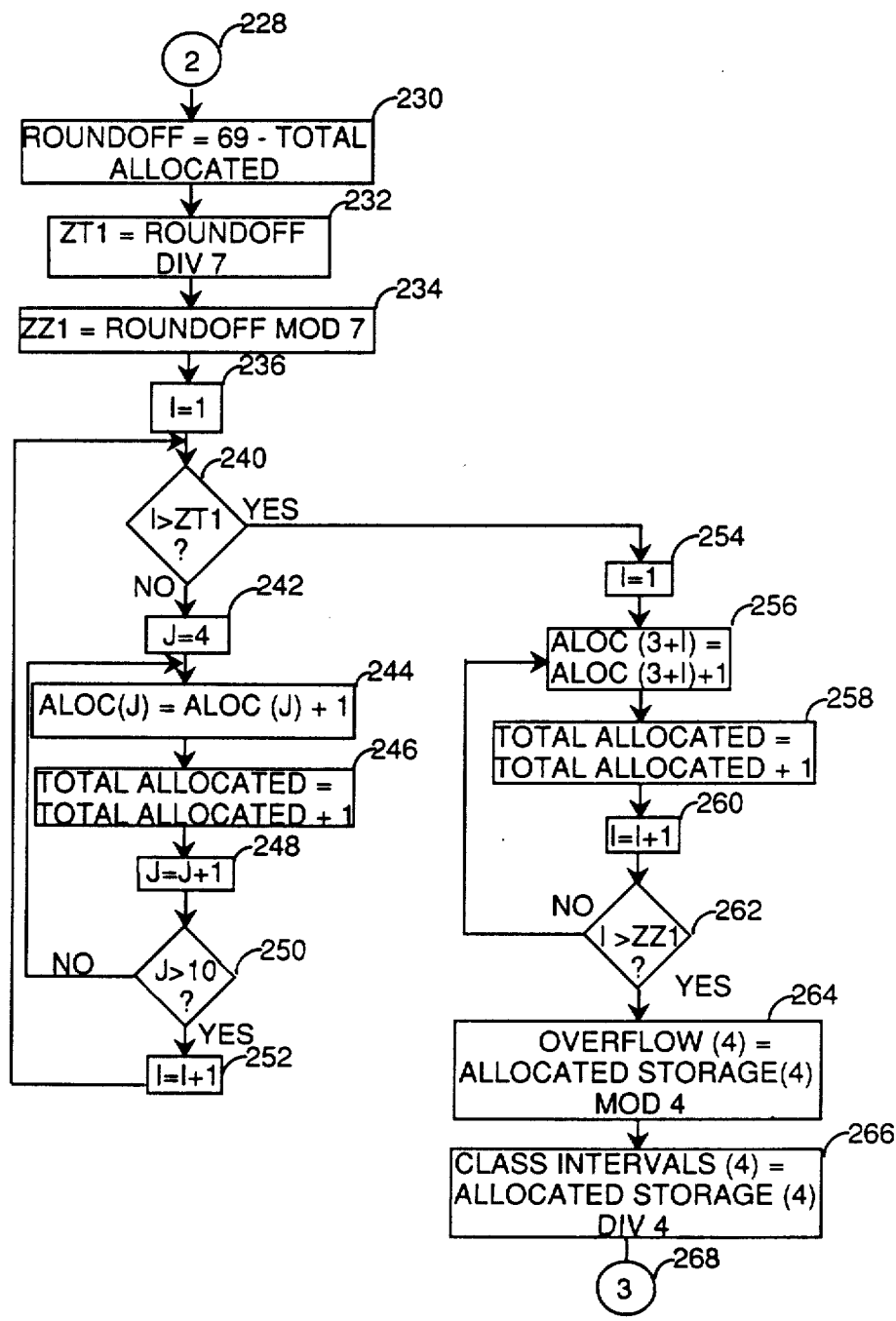
Figure 4C:
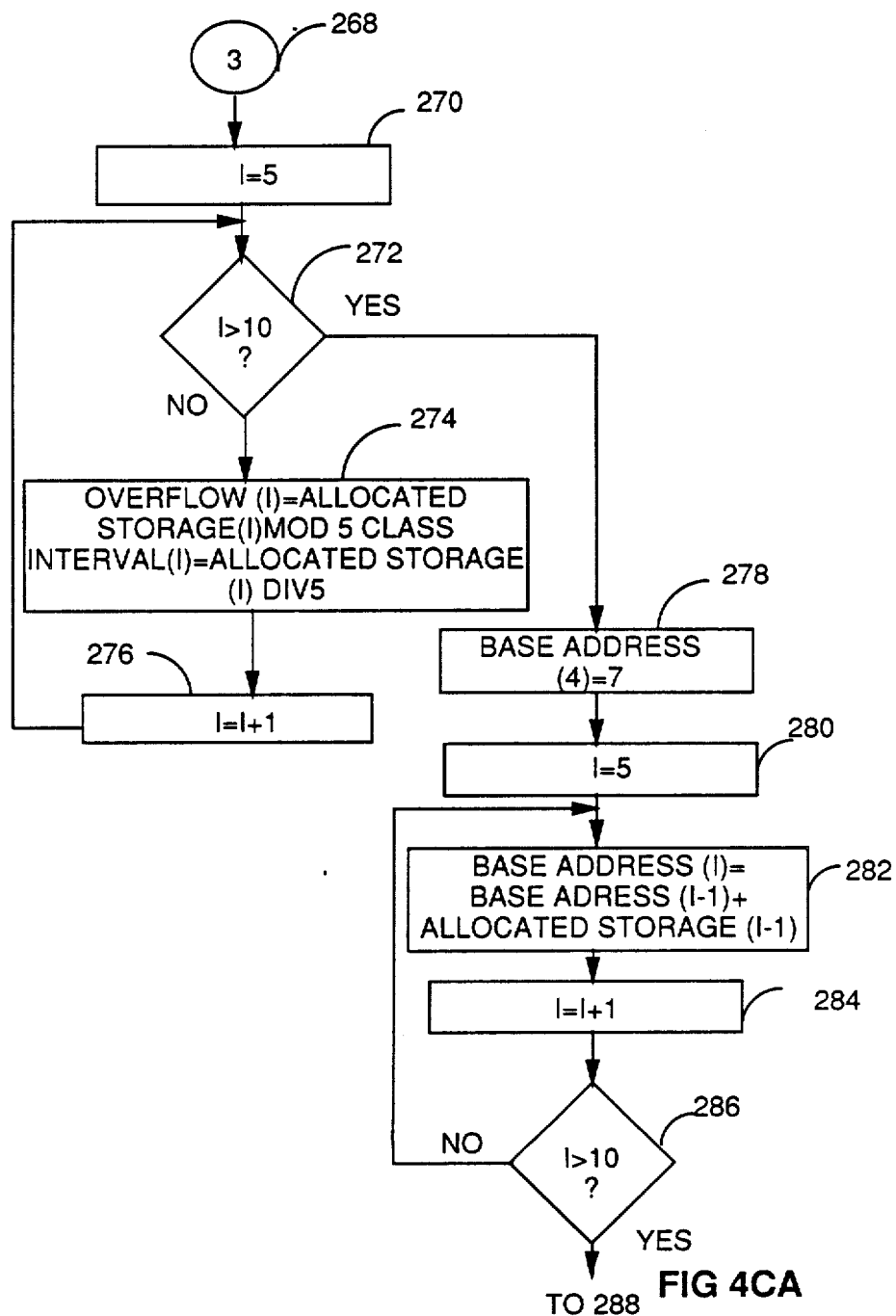
Figure 4C:
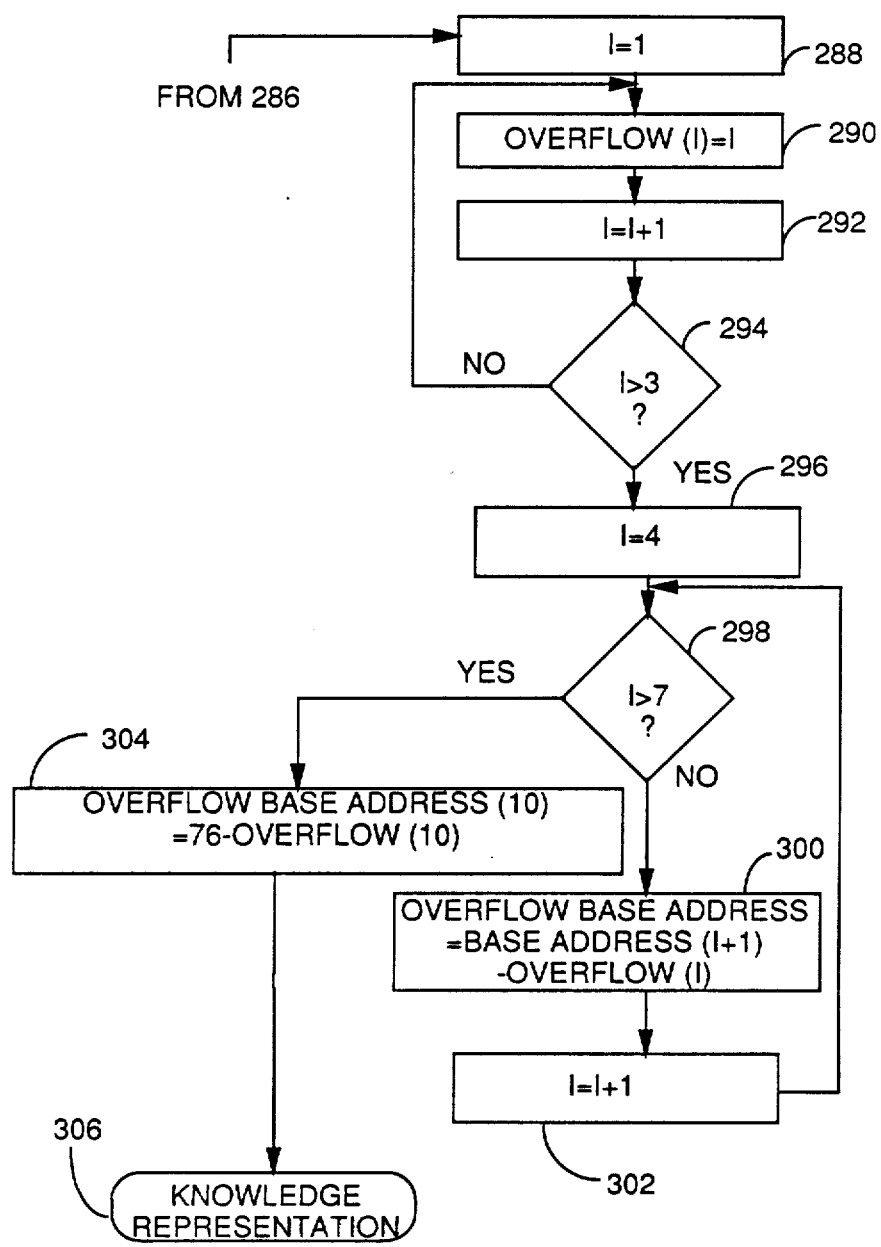

The methodology and structural flow for a specific embodiment of the allocation of virtual memory function shown as block 182 in the flow diagram of FIG. 3B is illustrated in detail in the flow diagram in FIGS. 4A, 4B, & 4C. The allocation function begins at block 200, as shown in FIG. 4A, and determines the total words in the knowledge vocabulary and name base, and allocates storage by category using virtual addresses based on the frequency of use of the words in each category. There is a total of ten (10) categories based on word lengths from 1 to 10 characters, with those with greater than ten characters falling in the tenth category. A base address to be used in the access method for each category is determined, and an overflow base address for use by the access system is calculated. Thus, the system constructs an allocation tree to allocate the optimum amount of virtual addresses for each word category out of the total number of virtual addresses.

After entering at block 200, processing flow proceeds to block 202 to set a counting variable i equal to one (1), and then calculates a total number of (totalw) as illustrated by blocks 202, 204, 206 & 208 Processing flow then continues to block 210 where counting variable i is again initialized and values for allocating storage and base address arrays are deterained for values of i equal 1 to 3 (i.e., word lengths of 1 to 3) at blocks 210, 212, 214, & 216, as shown. An allocation ratio is then determined by dividing the total available space by the total word value, as shown at block 218. Processing flow then proceeds to blocks 220, 222, 224 & 226, where allocated storage array value and a total allocation value are calculated, as shown for i equals 4 to 10, thereby setting up the allocation for categories of word lengths 4 through 10.

As indicated at the node 228, the allocation routine is continued in FIG. 4B where a round off value is calculated, as shown in block 230. Processing flow then proceeds to calculate on overflow value (ZT1), based on the round off value and DIV7 function, as shown at block 232, and to calculate a second overflow value (ZZ1), based on the round off value and a MOD7 function, as shown at block 234. Processing flow then proceeds to block 236 where a counting variable i is initialized. Processing flow then continues to block 240 where a test is performed to determine whether i is greater than ZT1, and if the result is negative, processing flow proceeds to block 242 where a counting variable j is set equal to 4. Processing flow continues to blocks 244, 246, 248 & 250 where allocations are made for the values of i equals 4 to 10. At block 250, if j is greater than 10, processing flow branches to block 252, where i is incremented and processing flow is returned to block 240 where i is again tested to determine if it is greater than ZT1. If the result is affirmative, processing flow branches to block 254 where the counting variable i is again initialized.

Processing flow then proceeds to blocks 256, 258, 260 & 262 where allocations are made for values of i equal to one (1) through ZZ1. If at block 262, the value of i has been incremented to greater than the value of ZZ1, processing flow branches to block 264 where an overflow base address for category 4 is calculated, as shown, using the MOD4 function. Processing flow then proceeds to block 266, wherein class intervals of value 4 is calculated based on allocated storage value and the DIV4 function. The continuation of the allocation function is shown in FIG. 4C is illustrated by the continuation of mode 268 in FIG. 4C.

Referring now to FIG. 4C, a counting variable i is set equal to 5, as shown at block 270, and processing flow proceeds to blocks 272, 274 & 276, wherein overflow and class interval array values are calculated for the categories of word length 5 through 10. When i is greater than 10 at block 272, processing flow branches from the overflow and class internal calculations to block 278, as shown. At block 278, the base address array value for category of word length 4 is set equal to 7 and, subsequently, the counting variable i is set equal to 5, as shown at block 280. Processing flow then proceeds to blocks 282, 284, and 286 where the base address array value for each of the word length categories from 5 through 10 is determined, as shown.

When the value of i is greater than 10, as shown at block 286, processing flow then branches to block 288, where the counting variable i is initialized. processing flow then proceeds to blocks 290, 292 & 294, where the overflow values for the word lengths of 1 through 3 are determined, as shown. When the value of i is greater than 3 at block 294, processing flow branches to block 296, where i is set equal to 4. Processing flow then continues to blocks 298, 300 & 302 to calculate the value of the overflow addresses for the categories of word lengths 4 through 7, as shown. When the value of i is greater than 7 at block 298, processing flow branches to block 304, where the overflow base address for the category of word lengths 10 and greater is determined, as shown, and processing flow then is transferred to the knowledge representation phase, as illustrated by block 306.

Figure 5A:
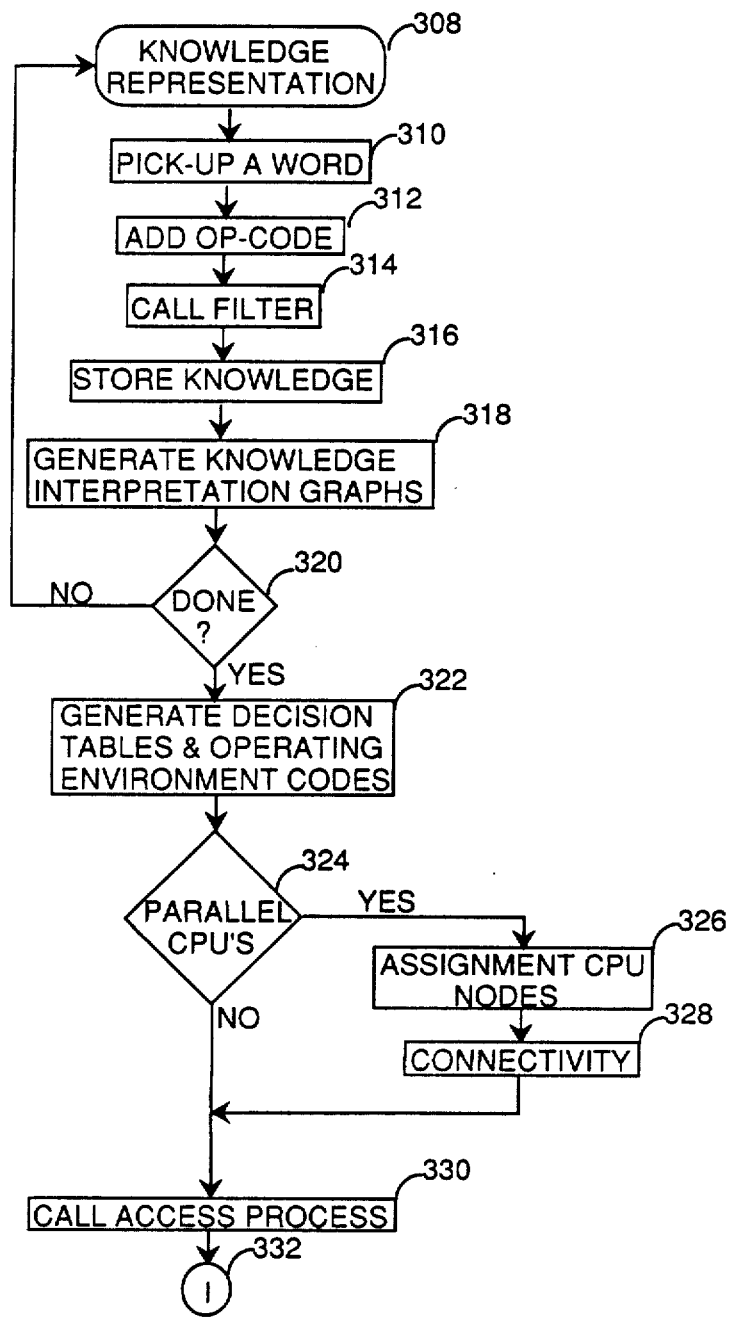
FIG. 5A and FIG. 5B are flow diagrams illustrating the methodology and structural flow of a specific embodiment of the knowledge representation phase of a specific embodiment of the natural language operating system interface program illustrated in FIG. 2.
Figure 5B:
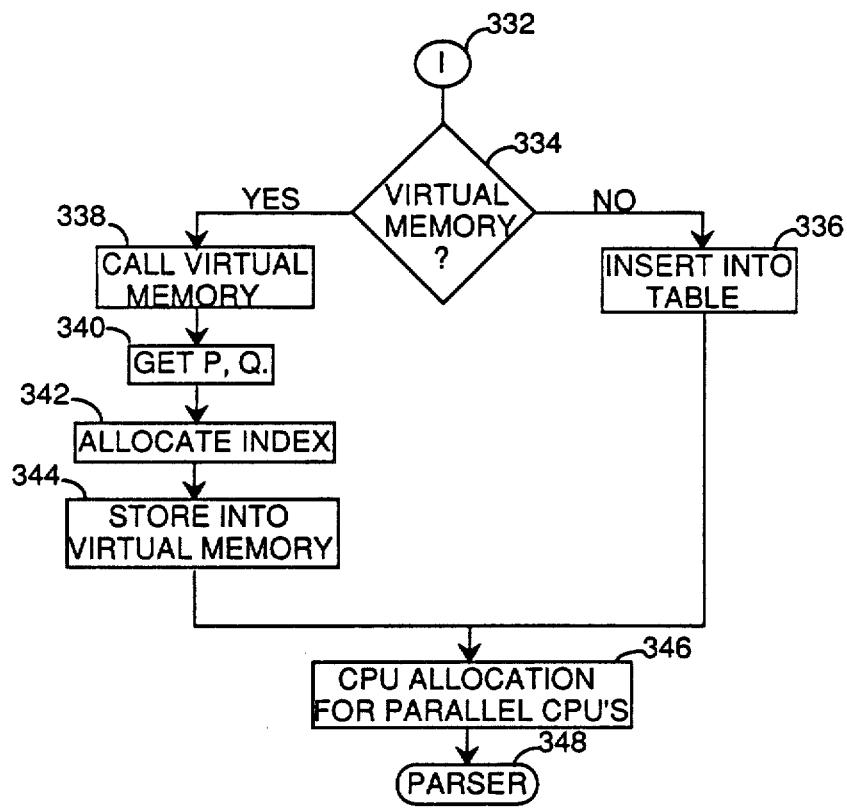

Referring to FIGS. 5A & 5B, there is shown a generalized flow diagram illustrating the methodology and structural flow for a knowledge representation function for a specific embodiment of the natural language interface system 50, according to the invention. This function is entered at 308, as shown, and begins a phase, in which primarily vocabulary and name knowledge is absorbed, and the details of the knowledge in the filter and access process are set up in various files and tables. The processing flow begins with pickup of a word, as illustrated in block 310, after which a code is added to the word at block 312, and the filter routine is called as shown at block 314. The filter routine of block 314 is described in detail in conjunction with FIGS. 6A, 6B, & 6C, and provides a high-speed, cryptologically based method for excluding terms not within the knowledge base of the system. At block 314, the filter routine creates a bit vector which indicates the presence of each word or name contained within the system knowledge base. This bit map permitting the filter to identify later whether a word in a user request is contained within the knowledge base or not.

The information determined as the word is passed through the filter at 314 is then stored in bit map created to hold the knowledge, as shown at block 316. Program flow then proceeds to block 318, where knowledge interpretation graphs are generated based on the result of the word filtering after which a test is done, as shown at block 320 to determine whether all the words have been passed through the filter. If the result is negative, program flow branches back to block 310, where the next word is picked up and the procedure is repeated. If at block 320, the result is affirmative, indicating that all the words have been passed through the filter, processing flow proceeds to block 322, where decision tables and operating environment codes are generated. Processing flow then continues to block 324, where a test is performed to determine whether a parallel cpu system is being used. If the result at block 324 is affirmative, an assignment of cpu modes is made, as shown at block 326, and a connectivity function is performed, as shown at block 328, after which processing flow continues block 330, as shown. If the result at 324 is negative, processing flow proceeds directly to block 330 where the access process routine is called.

At this stage, the access process routine allocates to each word or name an address based upon its cryptographic characteristics, particularly word length and frequency of use characteristics. Once an address allocation has been determined at block 330, the processing flow proceeds to block 334, as shown in FIG. 5B, where a test is performed to determine whether virtual memory is being used or not. If the result of block 334 is negative, the word is inserted into the proper table, as shown at block 336, and processing flow continues to block 346, as shown. If the result of the test at block 334 is affirmative, a virtual memory subroutine (to be described in greater detail hereinafter) is called, as shown at block 338, after which the P & q value is obtained, as shown at block 340. Subsequently, the index for the word is allocated, as shown at block 342, and the word is then stored into virtual memory, as shown at block 344. After storage of the word into virtual memory, processing flow proceeds to block 346 where additional cpu assignments are performed if a parallel cpu system is utilized, after which processing flow transfers to the parser function, as illustrated at block 348.

Figure 15:
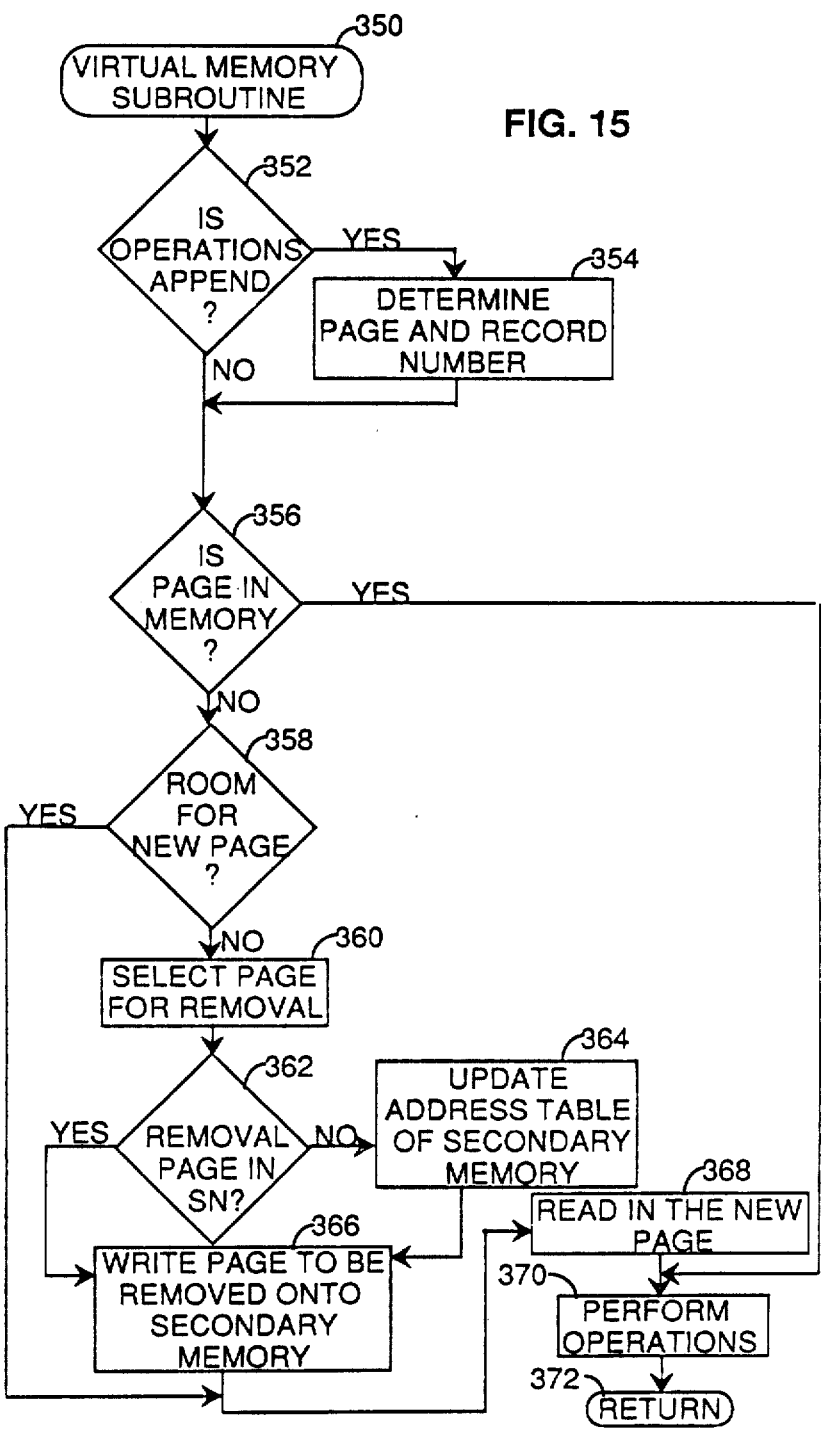
FIG. 15 is a flow diagram illustrating the methodology and structural flow of a specific embodiment of the Virtual Memory Subroutine for the specific embodiment of the natural language operating system interface program illustrated in FIG. 2.

A specific embodiment of the virtual memory subroutine shown in FIG. 5B is illustrated in FIG. 15. The virtual memory subroutine begins at block 350, after which a test 352 is performed, to determine if the operation is an append (write) operation. If the result is affirmative, program flow branches to block 354 to determine the page and record number, after which flow branches to block 356, as shown. If the result at block 352 is negative, program flow proceeds to block 356, where a test is performed to determine whether the page required is presently in main memory or not. This is done by checking a page map table which has information on each page in memory including a frame number, age-frequency (efficiency of existence) number, and a flag (dirty bit) which indicated whether a page in memory has been modified. If the result is affirmative at block 356 indicating that the requested page is in memory, program flow branches to block 368 to perform the requested operation, as shown. If the result at block 356 is negative, processing flow continues to block 358 where a test is performed to determine whether there is room in memory for a new page. If there is room for a new page and the page is in secondary memory then the page is read into main memory from secondary memory as shown by the branch to block 368.

To locate the page, a table (labelled "support table") is issued. This table records where each page in secondary memory is and the last page and record number. If the result is negative at block 358, indicating there is not enough room, processing flow continues to block 360, where a page is selected for removal to make room for a new page. It is desirable to remove a page which is not likely to be referenced in the near future. Thus a combination of two well known algorithms, "least recently used" (LRU) and "least frequently used" (LFU) is used to make the selection.

After a removal page is selected, a test is performed as shown at block 362 to determine whether the removal page is in secondary memory. If the result is affirmative, processing flow branches to block 366 where the page to be removed is written over the old copy in secondary memory, as shown. If the result at block 362 is negative, processing flow branches to block 364, where the support table of the secondary memory is updated with the address of the page, and then to block 366 where the page is written into secondary memory. Processing flow then proceeds to block 368, where the new page is read into main memory. After the new page is read into memory, the operation desired is performed, as shown at block 370, and processing control is returned from the subroutine, as shown at block 372. The virtual memory system can slow down the system, it therefore is only used only when the knowledge base becomes so large that secondary memory is needed.

Figure 9A:
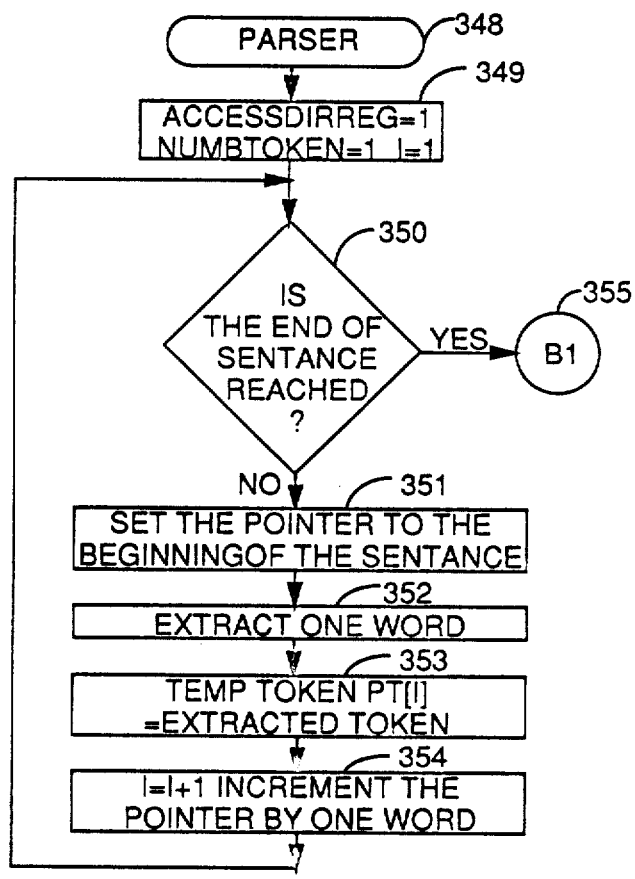
FIG. 9A, FIG. 9B and FIG. 9C are flow diagrams illustrating the methodology and structural flow of a specific embodiment of the parser function for the specific embodiment of the natural language operating system interface illustrated in FIG. 2.
Figure 9B:
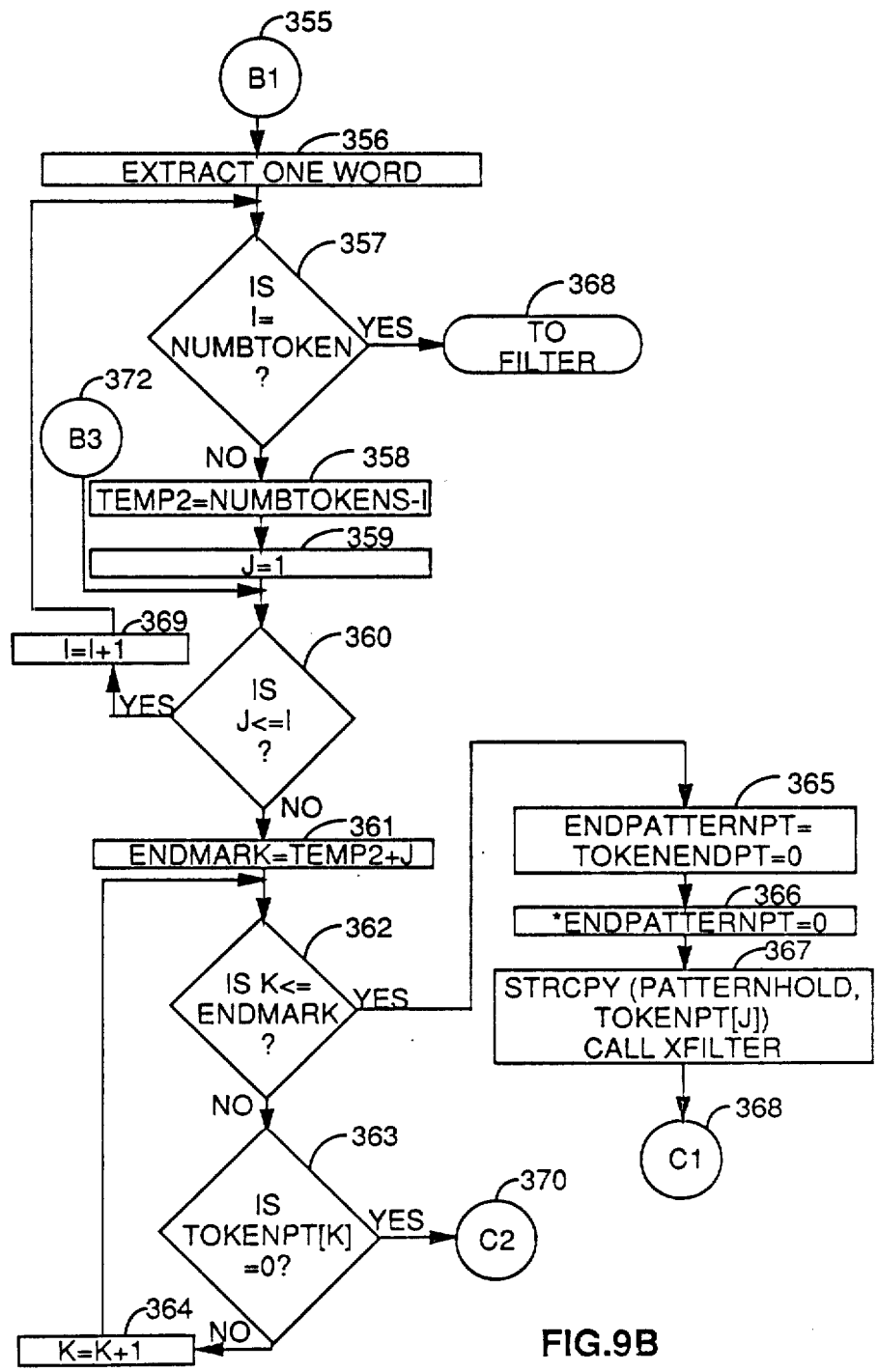
Figure 9C:
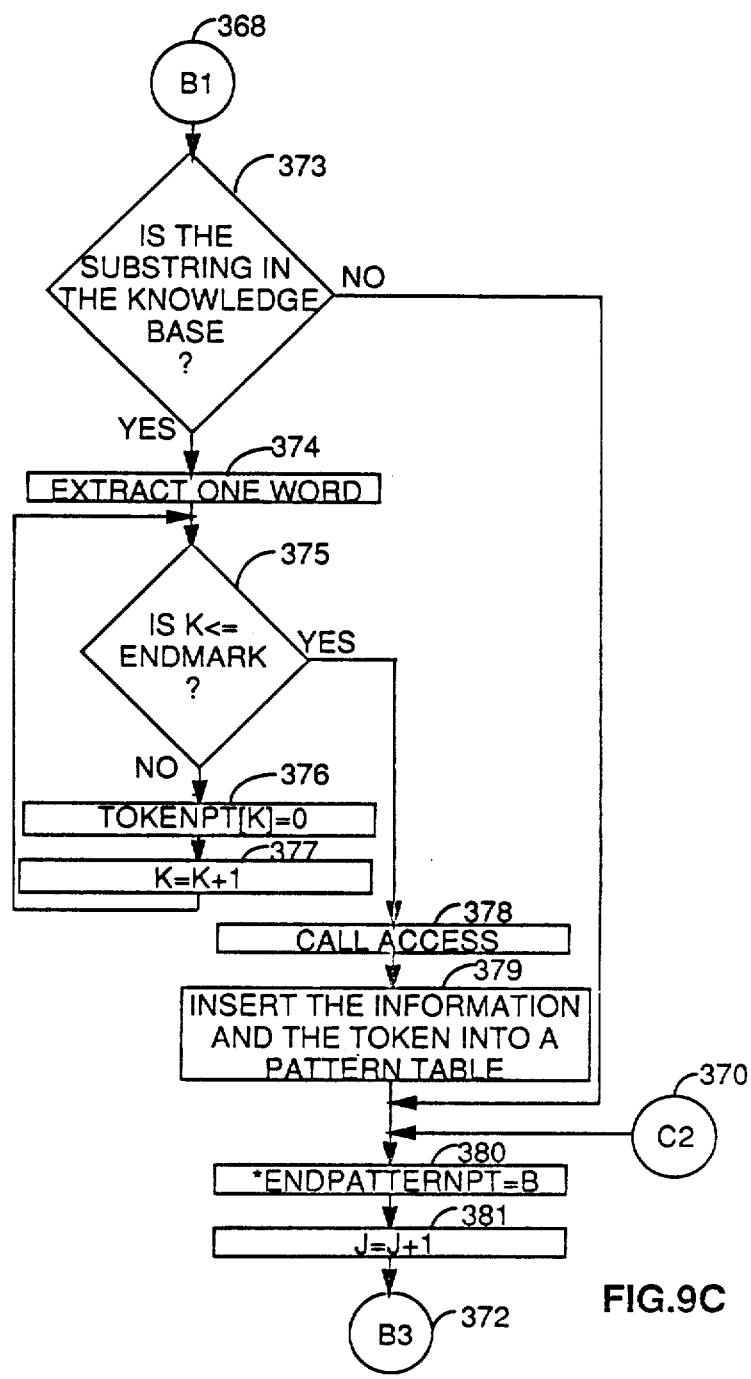

Referring to FIG. 9A, 9B & 9C there is shown flow diagrams illustrating the process methodology and structural flow for a specific embodiment of the parser process 90 of FIG. 2 beginning at block 348 in FIG. 9A. Processing flow immediately proceeds to setting up the access direction register and number of tokens, and a variable i to 1, as shown in block 349. Processing flow then proceeds to block 350 where a test is made to determine whether the end of the sentence has been reached, and if the result is negative, processing flow continues to block 351 where a pointer is set to the beginning of the sentence. Processing flow then continues to block 352 where one word is extracted from the sentence. Processing flow then continues to block 353 where a temporary token array is set to the extracted token after which processing flow proceeds to block 354 where the variable i is increased by 1 and also the pointer is incremented by 1 word. Then processing flow returns back to block 350. If the result at block 350 is affirmative, processing flow proceeds to node 355 which illustrates continuation of the parser process in FIG. 9B.

Referring to FIG. 9B, processing flow continues to block 356 where the variable i is set to 1 after which processing flow proceeds to block 357, as shown. At block 357, a test is made to check whether the number of tokens is equal to the value of i, and if the result is negative, processing flow continues to block 358 where the value of i is subtracted from the number of tokens and is set to variable TEMP2. Processing flow then continues to block 359 where variable j is set to one (1). If the result at block 357 is affirmative, processing flow branches to the filter process, as illustrated by mode 368.

Processing flow otherwise continues from block 359 to block 360 where the j value is tested to determine if it is less then the value of i, and if the result is negative, processing flow continues to block 361, and the j value is added to the TEMP2 value and is stored in END-MARK variable which points to the end of the substring formed as a result of the above operation. If the result at block 360 is affirmative, processing flow branches to block 369, as shown, where the variable i is incremented by 1. The processing flow then branches back to block 357, as shown.

Processing flow continues from block 361 to block 362 where the k value is tested to determine if it is less than or equal to the value of ENDMARK, and if the result is affirmative, processing flow branches to block 365, and the ENDPATTERNPT pointer which is set to the end of the substring which is contained in TOKENENDPT pointer. The processing flow continues to block 366 where ENDPATTERNPT variable is set back to a null value which indicates the end of a new substring to be considered Processing flow then continues to block 367 where the string pointed to by TOKENPT is copied to a string variable called PATTERNHOLD and then the process filter is called. If the result at block 362 is negative, processing flow continues to block 363 where the TOKENPT [K] array is tested to determine if it is equal to zero (0), and if the result is negative the processing flow continues to block 364 and the value of k is incremented by 1, and the processing flow branches back to block 362. If the result at block 363 is affirmative, processing flow branches to block 380 of FIG. 9C as illustrated by the node 370 where the contents of the location pointed to by END-PATTERNPT is set back to a blank value, and the processing flow continues to block 381 to increment the value of j by one. The processing flow then branches back to block 360 as illustrated by node 372.

Referring to FIG. 9C, processing flow continues from mode 368 to block 373 where a test is made to determine if the substring exists in the knowledge base. If the result is negative, processing flow branches to block 380 where the contents of the location pointed to by ENDPATTERNPT is set back to a blank value, and the flow continues to block 381. If the result at block 373 is affirmative the processing flow continues to block 374 where variable k is set equal to the variable j, and the processing flow continues to block 375. At block 375, the k value is tested to determine whether it is less than or equal to the ENDMARK value, and if the result is negative, the processing flow continues to block 376 and 377 where the TOKENPT [K] is set to zero (0) and the k value is incremented by one (1) and the processing flow branches back to block 375. If the result of the test at block 375 is affirmative then processing flow continues to block 378 where the access process is called. The processing flow subsequently continues to block 379 where the token and information about that token which are returned from the access method are inserted into a pattern table. Processing flow then continues to block 380. At block 380, the contents of the location pointed to by ENDPATTERNPT is set back to a blank value, and the processing flow continues to block 381 to increment the j value by one. The processing flow then branches back to block 360 as illustrated by node 372.

Figure 6A:
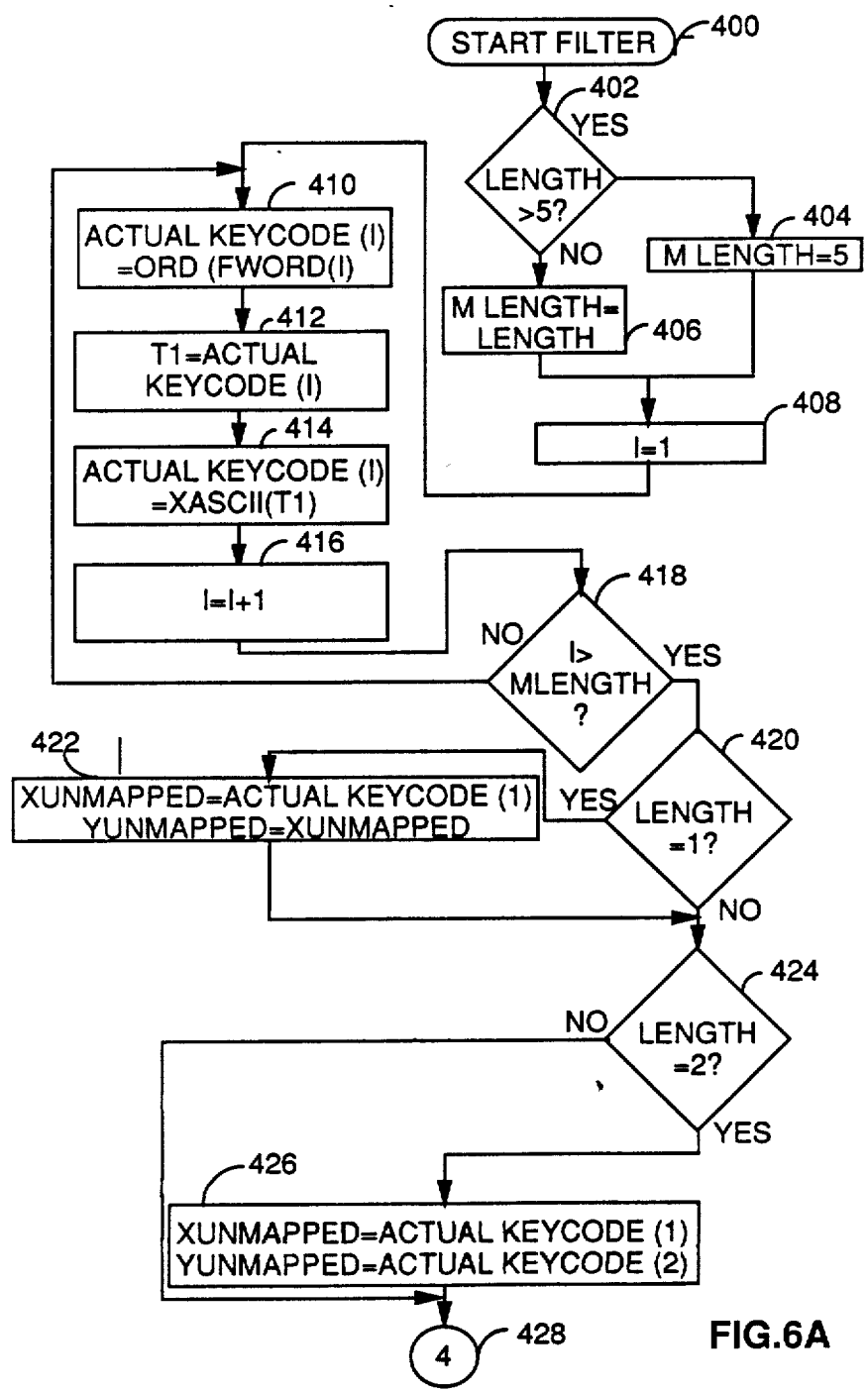
FIG. 6A, FIG. 6B (6AB and 6BB), and FIG. 6C are flow diagrams illustrating the methodology and structural flow of a specific embodiment of the filter function for the specific embodiment of the natural language operating system interface program illustrated in FIG. 2.
Figure 6B:
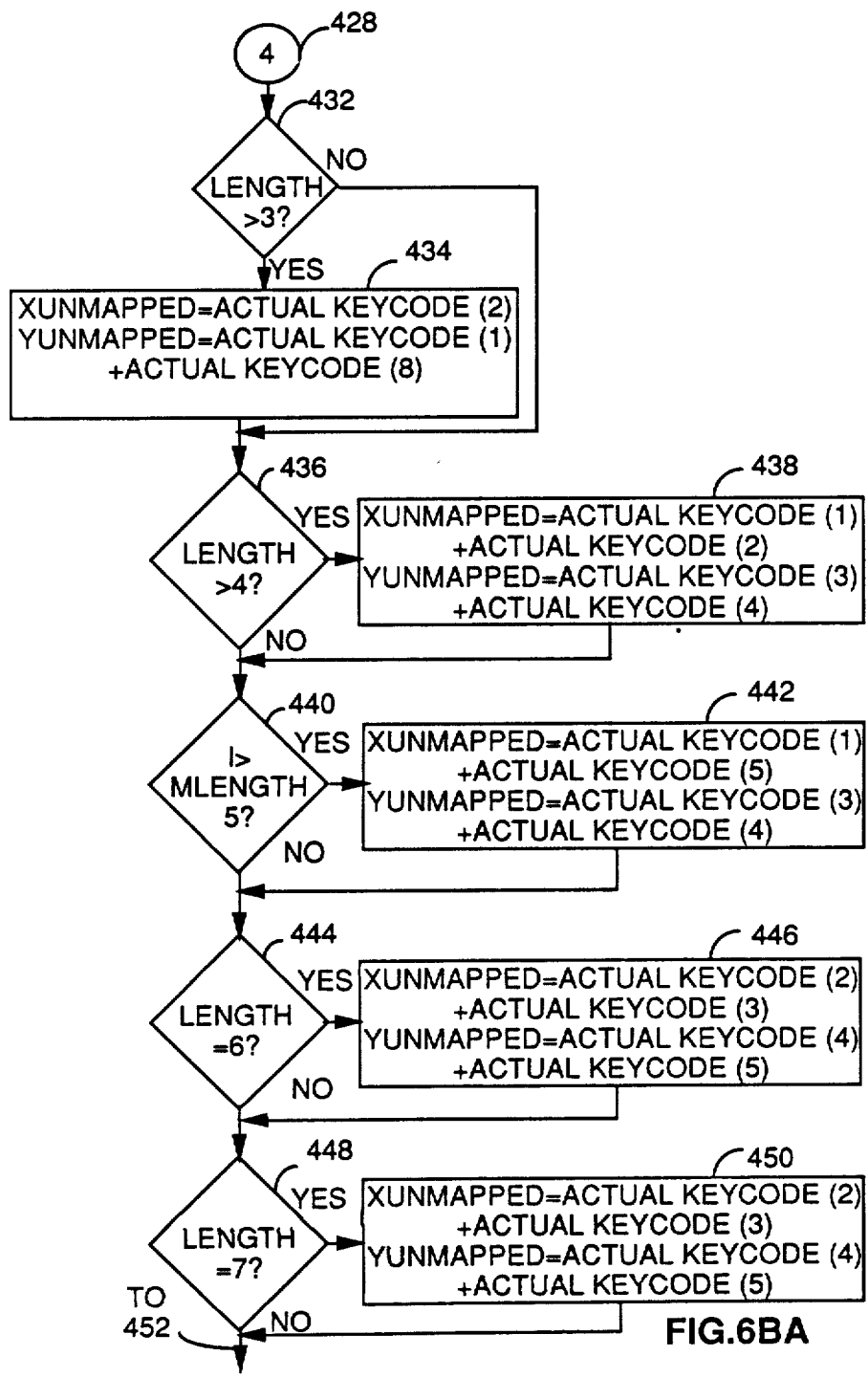
Figure 6B:
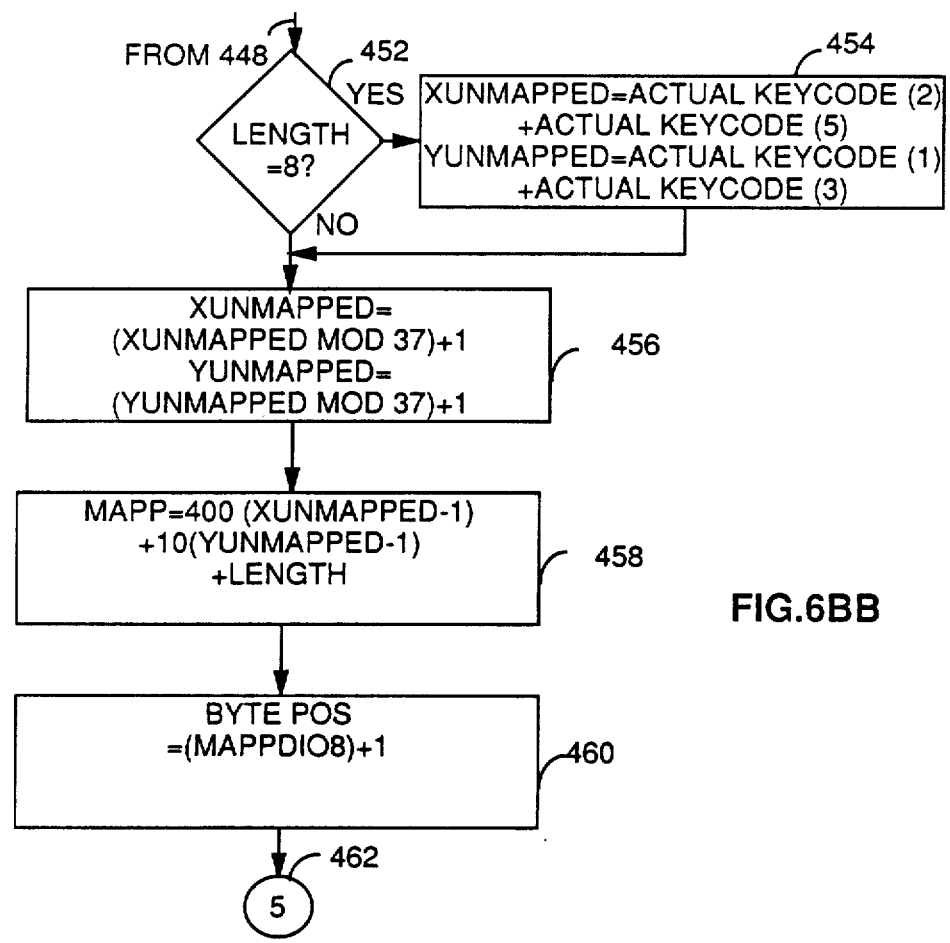
Figure 6C:
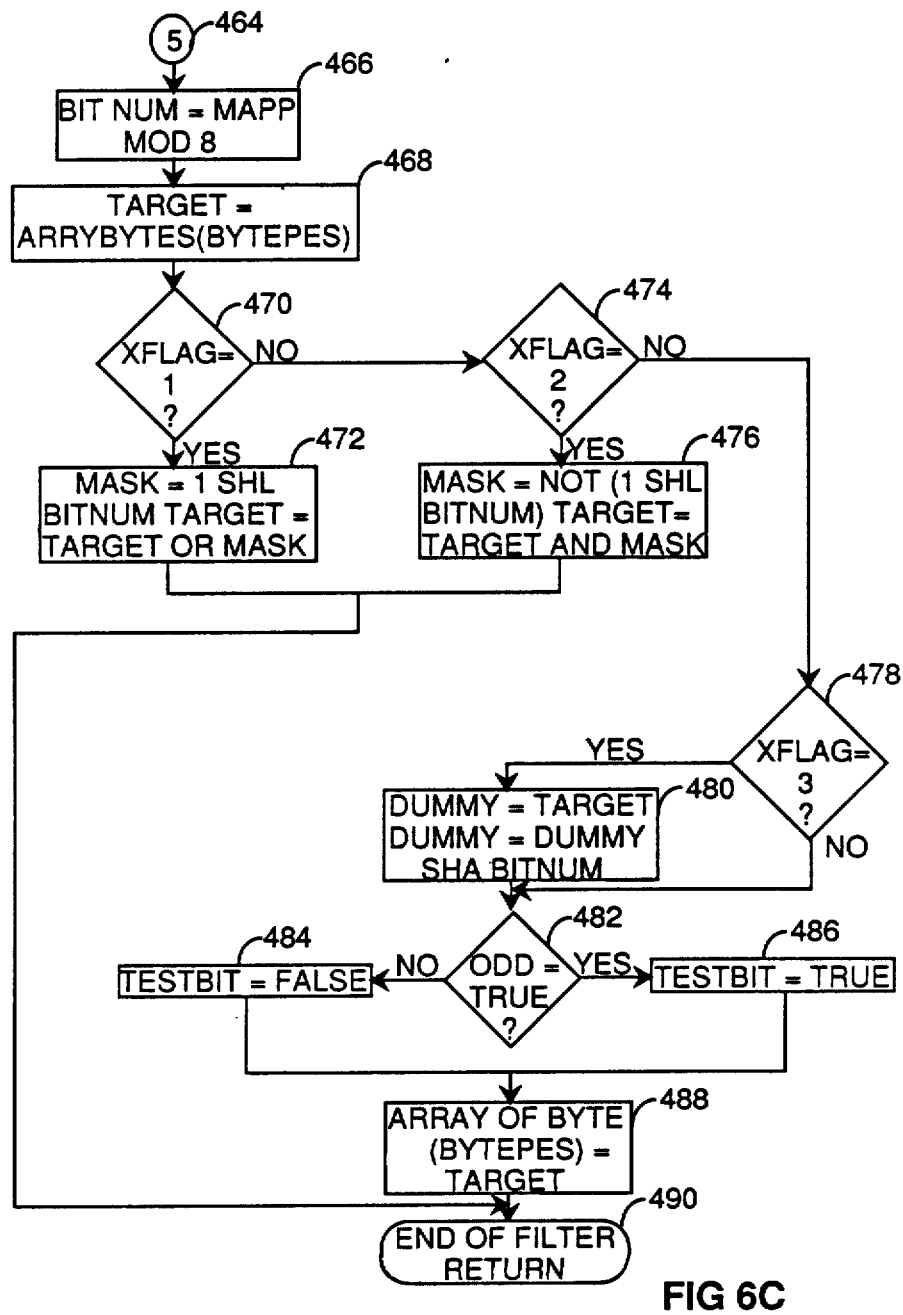

FIGS. 6A, 6B, & 6C are flow diagrams illustrating the processing methodology and structural flow for a specific embodiment of the filter process 92, as shown in FIG. 2. The filter is a process which provides high speed filtering of the tokens (words, names, etc.) within a user request by partial pattern matching using a closed hashing system incorporating cryptographic characteristics of the tokens. The filter utilizes the cryptographic concept measure of roughness to determine the most unique characteristic for a given word length based on letter frequency of use and position within the word to map the word to a unique bit location within a 2K bite array (i.e., a 16K bit vector).

The filter is entered at block 400, as shown in FIG. 6A, and proceeds to test the word to determine whether its length is greater than 5 characters, as shown at block 402. If the length is greater than 5, a length variable (Mlength) is set equal to 5, as shown at block 404, and if it is not greater than 5, then the variable "Mlength" is set equal to the actual number of characters (i.e., the variable "length"), as illustrated at block 406. Processing flow then proceeds to block 408 where a counting variable i is set equal to 1. Processing flow then continues to block 410 where the numerical equivalent of the ASCII code of each character (i.e., the ordinality) of the word is determined using the ORD function. Processing flow then proceeds to block 412 where the value determined is set equal to T1 and then to block 414 where the value T1 is used as an index to obtain a key code value from an array called XASCII which is then placed in the proper position of an array called actual key code. Processing flow continues to 416 where the counting variable i is incremented, as shown, and then to block 418 where a test is performed to determine whether i is greater than the variable m length. If the result at 418 is negative, processing flow branches back to block 410; thereby resulting in the conversion of up to the first 5 letters of each word to numerical key code values.

If the result at block 418 is affirmative, processing flow proceeds to block 420 where a test is performed to determine whether the word length (i.e., the variable "length") is equal to 1. If the result is affirmative, processing flow proceeds to block 422 where the variable x unmapped is set equal to the value of actual key code array value of position 1, and the value of yunmapped is set equal to xunmapped after which processing flow continues to block 424. If the result at 420 is negative, processing flow proceeds directly to block 424 where the word length is tested to see if it is equal to 2. If the result is negative, processing flow branches to node 428, as shown. If the result at block 422 is affirmative, processing flow proceeds to block 426 where the variable xunmapped is set equal to the actual key code array value of position 1, and the variable yunmapped is set equal to the actual key code array value of position 2, and processing flow then proceeds to node 428, as shown.

The flow chart of the filter continues in FIG. 6B at node 428 and proceeds to block 432 where the word length is tested to determine if it is equal to 3, as shown. If the result of the test at 432 is negative, processing flow branches to block 436, and if it is affirmative, processing flow branches to block 434 where xunmapped and yunmapped are calculated, as shown, and processing flow then continues to block 436. At block 436, the word length is tested to determine if it is equal to 4, and if the result is negative, processing flow proceeds directly to block 440, and if it is affirmative, processing flow branches to block 438 where xunmapped and yunmapped are calculated after which processing flow continues to block 440. Similarly, tests are performed, as shown, at blocks 440, 444, 448 & 452 to select values for xunmapped and yunmapped for words of lengths 5 through 8, as shown in blocks 438, 442, 446, 450 & 454. During the test and calculations of blocks 420 through 454, the values xunmapped and yunmapped are calculated, as shown, based upon certain character positions associated with the words of the respective lengths.

Processing flow continues from block 454 to block 456 where modular arithmetic is used to fold the xunmapped, and yunmapped coordinates, as shown, at block 456. Processing flow then proceeds to block 458 where a crypto-signature is calculated called "Mapp", and then to block 460 where a byte position (bytepos) in the 2 kilobyte vector array is calculated. The filter flow diagram continues in FIG. 6C from node 462, as shown, and proceeds to block 466 where the bit number (bitnum) within the byte position of the vector array is calculated, as shown. Processing flow then continues to block 468 where the value "Target" is set equal to the value of arraybytes, as shown. Processing flow then proceeds to block 470 where the variable xflag is tested to determine if it is equal to !, and if the result is affirmative, processing flow branches to block 472 where a variable "Mask" is calculated based on the bit number, and a Target is calculated by setting it equal to Target OR'ed with Mask, after which processing flow branches to block 488, as shown.

If the result at block 470 is negative, processing flow branches to block 474, where the value of xflag is tested to determine if it is equal to 2, and if the result is negative, processing flow branches to block 478, as shown. If the result at block 474 is affirmative, processing flow continues to block 476 where the value of Mask is calculated and the value of Target is calculated, as shown, and processing flow continues to block 488. At block 478, the value of xflag is tested to determine if it is equal to 3, and if the result is affirmative the processing flow branches to block 480 where the value of the Dummy variable is calculated, as shown. Processing flow then proceeds to block 482 where a test is performed to determine whether the logical variable ODD is equal to true. If the result at block 482 is negative, processing flow branches to 484, and if the result is affirmative, processing flow branches to block 486, where the value of Testbit is set, as shown. Processing flow then proceeds to block 488 where the value of array-of-bytes is calculated, as shown, and processing control continues to the end of filter return, as shown at block 490.

Figure 7A:
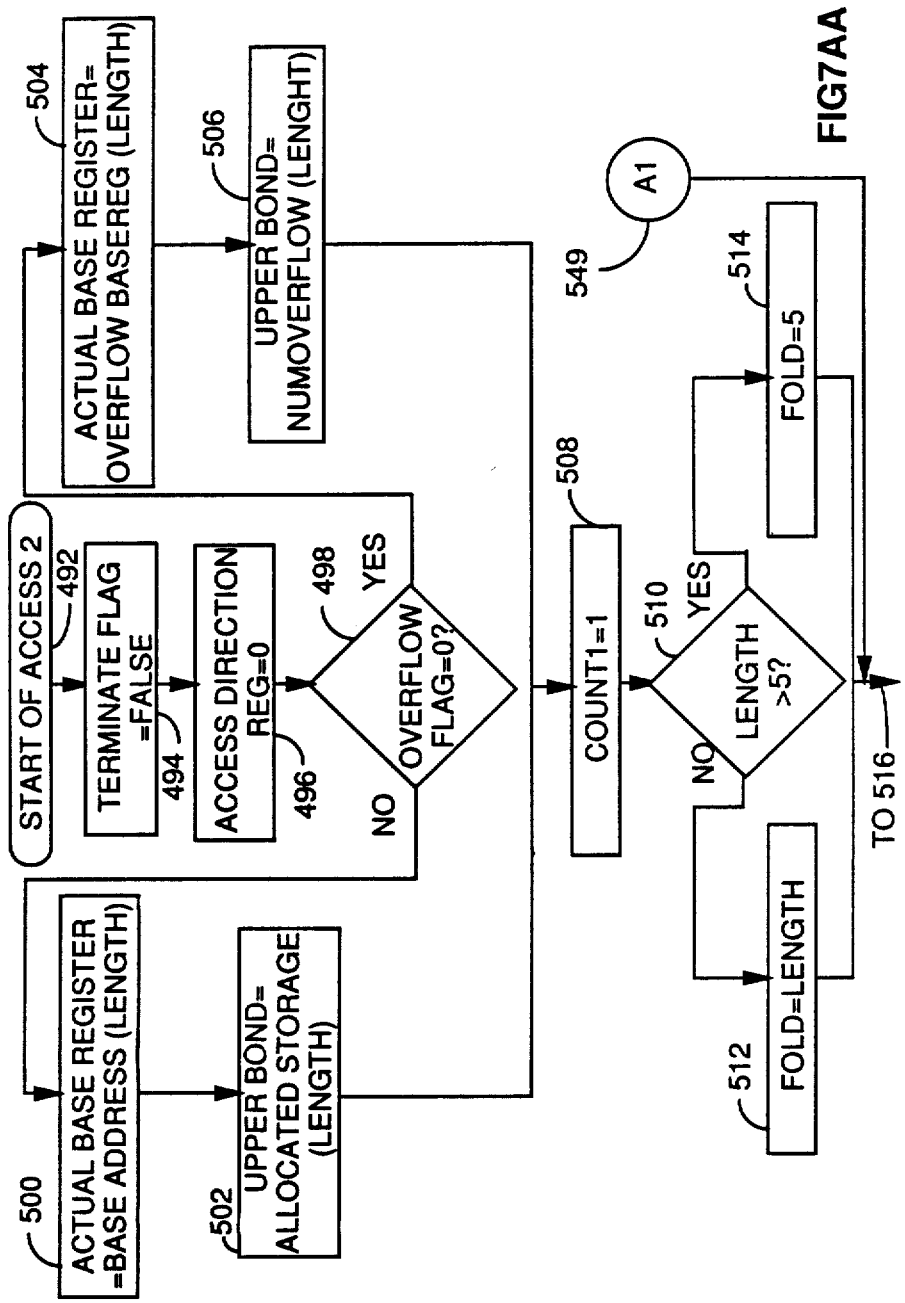
FIG. 7A (7AA and 7AB) and FIG. 7B are flow diagrams illustrating the methodology and structural flow of a specific embodiment of an Access 2 function for the specific embodiment of the natural language operating system interface program illustrated in FIG. 2.
Figure 7B:
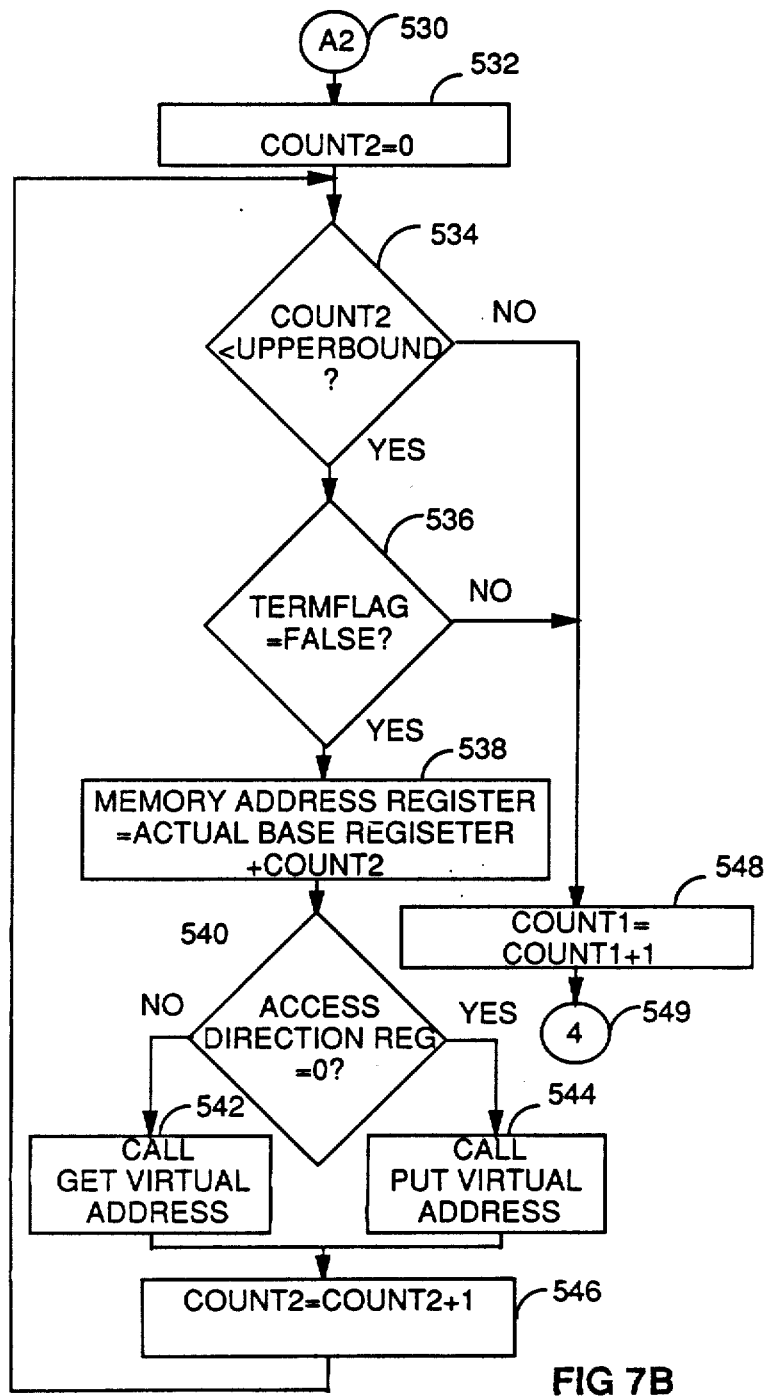

As shown in FIG. 2 after a word has been processed through the filter 92, and is determined with relatively high accuracy to be recognizable by the system, it is passed to the access process 94. The simple access process of FIG. 2 is made up of 3 access routines (i.e., Access 1, Access 2 and Access 3). Access 1 is a direct look-up used for overflow. Referring to FIG. 7A & 7B there is shown a flow diagram illustrating the process methodology and structural flow for a specific embodiment of the Access 2 process beginning at block 492 in FIG. 7A. Process flow immediately proceeds to setting up the termination flag (Termflag) to false, as illustrated in block 494, and then to setting up the access direction register equal to 0, as shown in block 496 (the access direction register determines whether the access system is in an accessing or allocating mode).

Processing flow then proceeds to block 498 where the overflow flag (which if true indicates that the Access 2 routine has been called due to an overflow from the Access 3 routine) is tested to determine whether it is equal to 0, and if the result is negative, processing flow branches to block 500 where an actual base register value is calculated based on a Base Address array and word length. Processing flow then continues to block 502 where an upper bound value is calculated based on an allocated storage array and word length after which processing flow proceeds to block 508, as shown. If the result of the test at block 498 is positive, processing flow proceeds to block 504 where the actual Base Register value is calculated based on an overflow Base Register array and word length. Processing flow then continues to block 506 where an upper bound is determined based on a number overflow array and word length after which processing flow proceeds to block 508 where the value of a variable Count is set equal to 1.

As illustrated in block 510, if word length is greater than 5, processing flow branches to block 512 where the value of a variable Fold is set equal to the word length, and if the word length is greater than 5, then the variable fold is set equal to 5, as illustrated at block 514. Processing flow then continues to block 516 where the value of the variable Count is tested to determine if it is less than or equal to the value of fold. If the result is negative, processing flow branches to block 522 where a test is performed to determine whether the logical variable Termflag is set to false. If the result at block 522 is affirmative, a link manager routine is called, as illustrated in block 524, and if the result is negative, the access process is ended, as indicated at block 526. If the result of the test at block 516 is affirmative, processing flow branches to block 518, where the value of logical variable Termflag is tested to determine if it is set to false, and if the result is negative, the access process routine is ended, as illustrated at block 526, and if affirmative, processing flow branches to block 520, as shown. At block 520, displacement register value is calculated based upon the actual key code array and the value of Count, as shown. Processing flow then continues to the node 528 which illustrates continuation of the Access 2 process in FIG. 7B.

Referring to FIG. 7B, processing flow continues to block 532 where the value of a Count2 variable is set equal to zero (0) after which processing flow proceeds to block 534, as shown. At block 534, the Count2 value is tested to determine if it is less than the value of upperbound, and if the result is negative, processing flow branches to block 548, as shown. If the result at block 534 is affirmative, processing flow branches to block 536 where the Termflag is tested to determine if it is set to false. If the result is negative, processing flow branches to block 548 where the variable Count is incremented, and processing flow then branches back to block 516 in FIG. 7A, as illustrated by the node 549. If the result of the test at block 536 is affirmative, processing flow branches to block 538 where the memory address register value is calculated, as shown. Processing flow then proceeds to block 540 where the access direction register is tested to determine if it is equal to 0, and if the result is negative, a Get Virtual Address routine is called, as illustrated at block 542 after which processing flow proceeds to block 546. If the result at block 540 is affirmative, a Put Virtual Address routine is called, as shown at block 544. Processing flow then proceeds to block 546 where the Count2 variable is incremented, and processing control branches back to block 534, as shown.

Figure 8A:
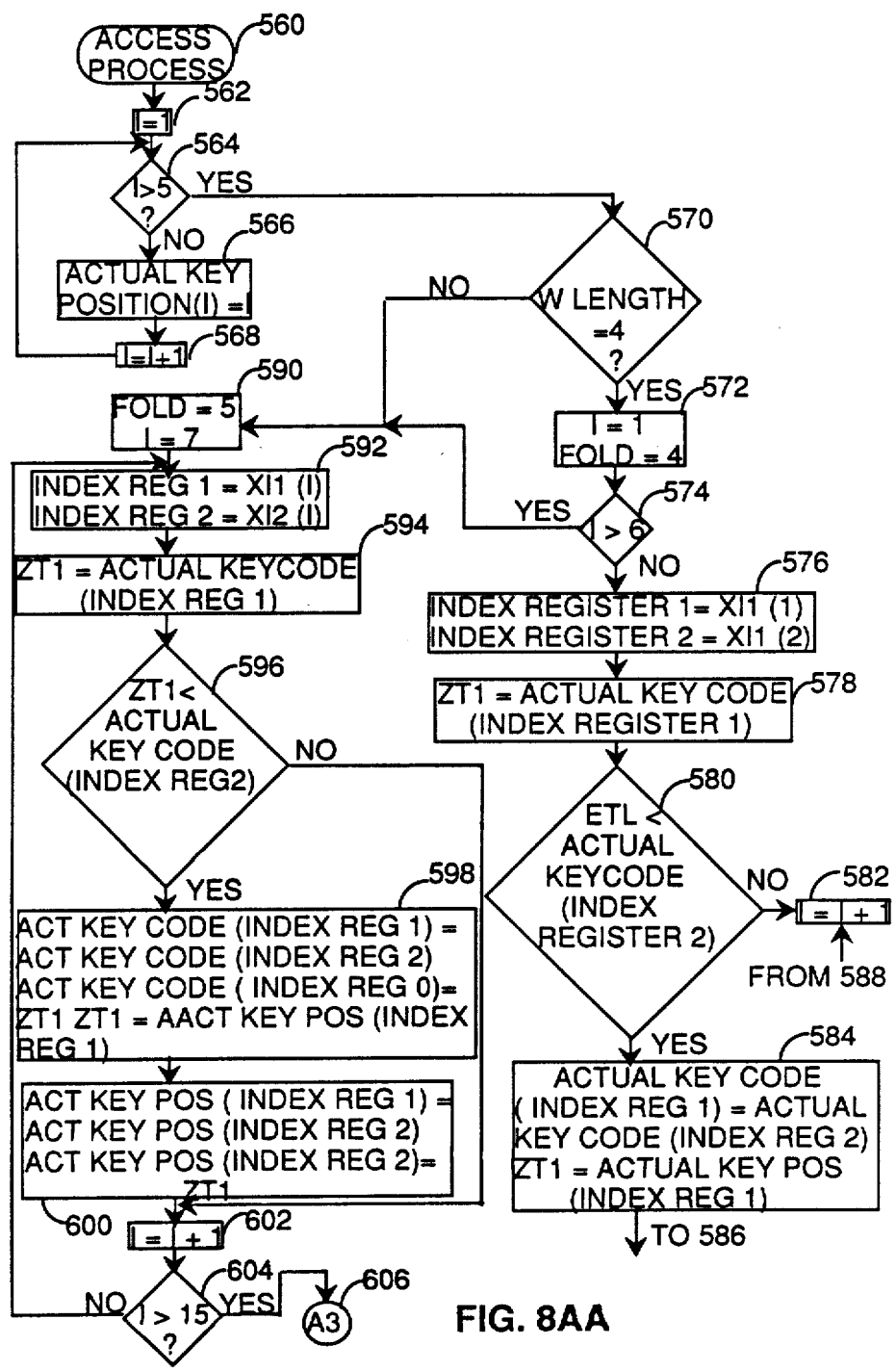
FIG. 8A (8AA and 8AB)
Figure 8A:
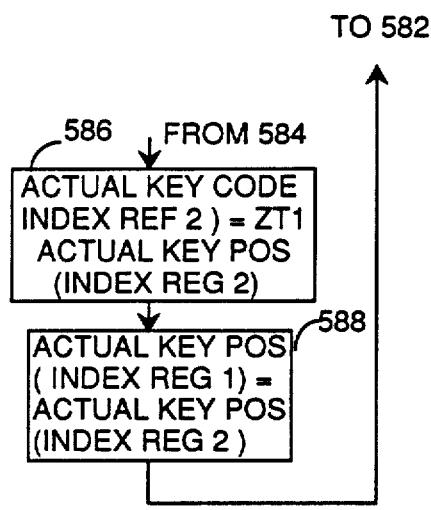
Figure 8B:
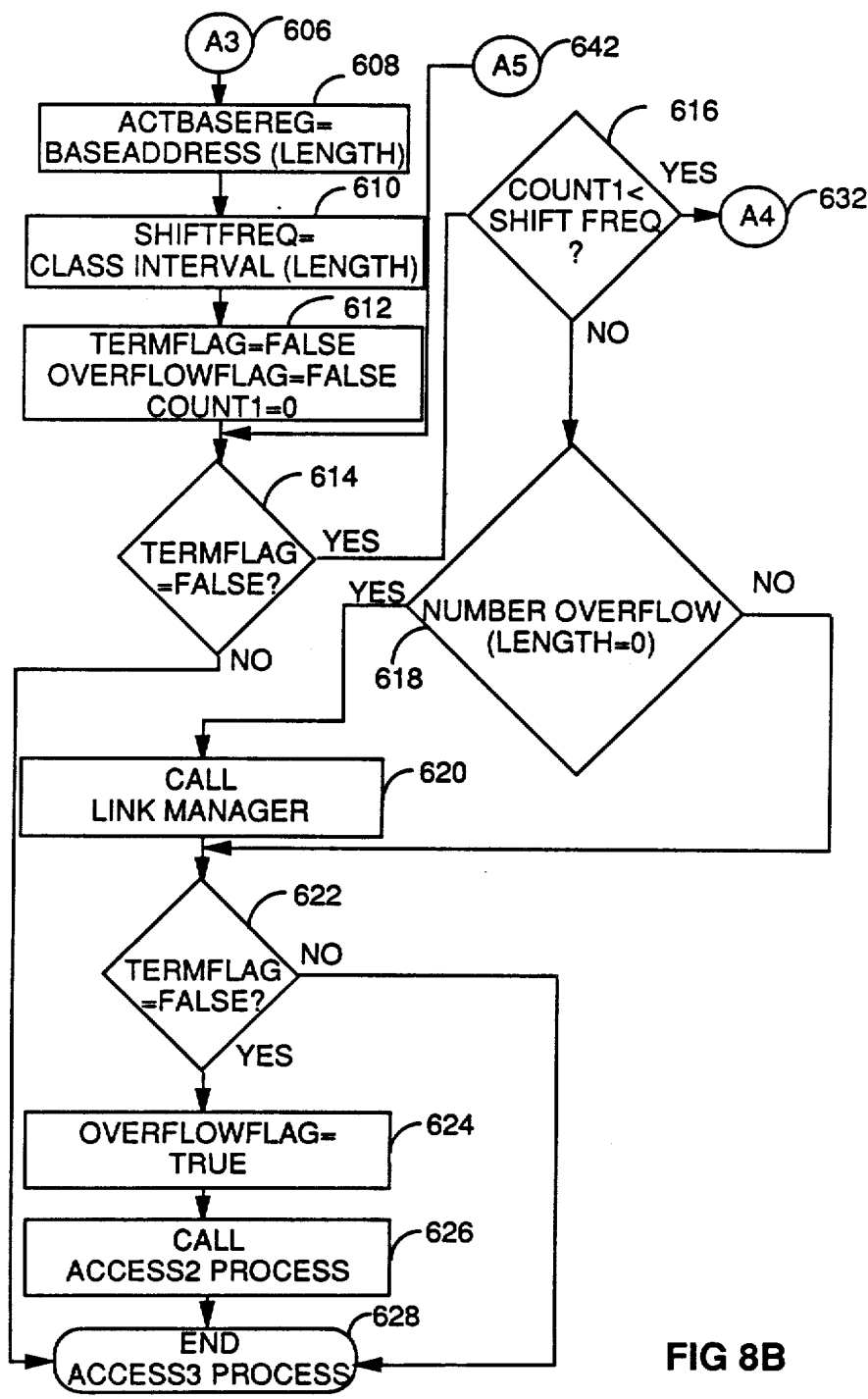
FIG. 8B, and FIG. 8C are flow diagrams illustrating the methodology and structural flow of a specific embodiment of an Access 3 function for the specific embodiment of the natural language operating system interface program illustrated in FIG. 2.
Figure 8C:
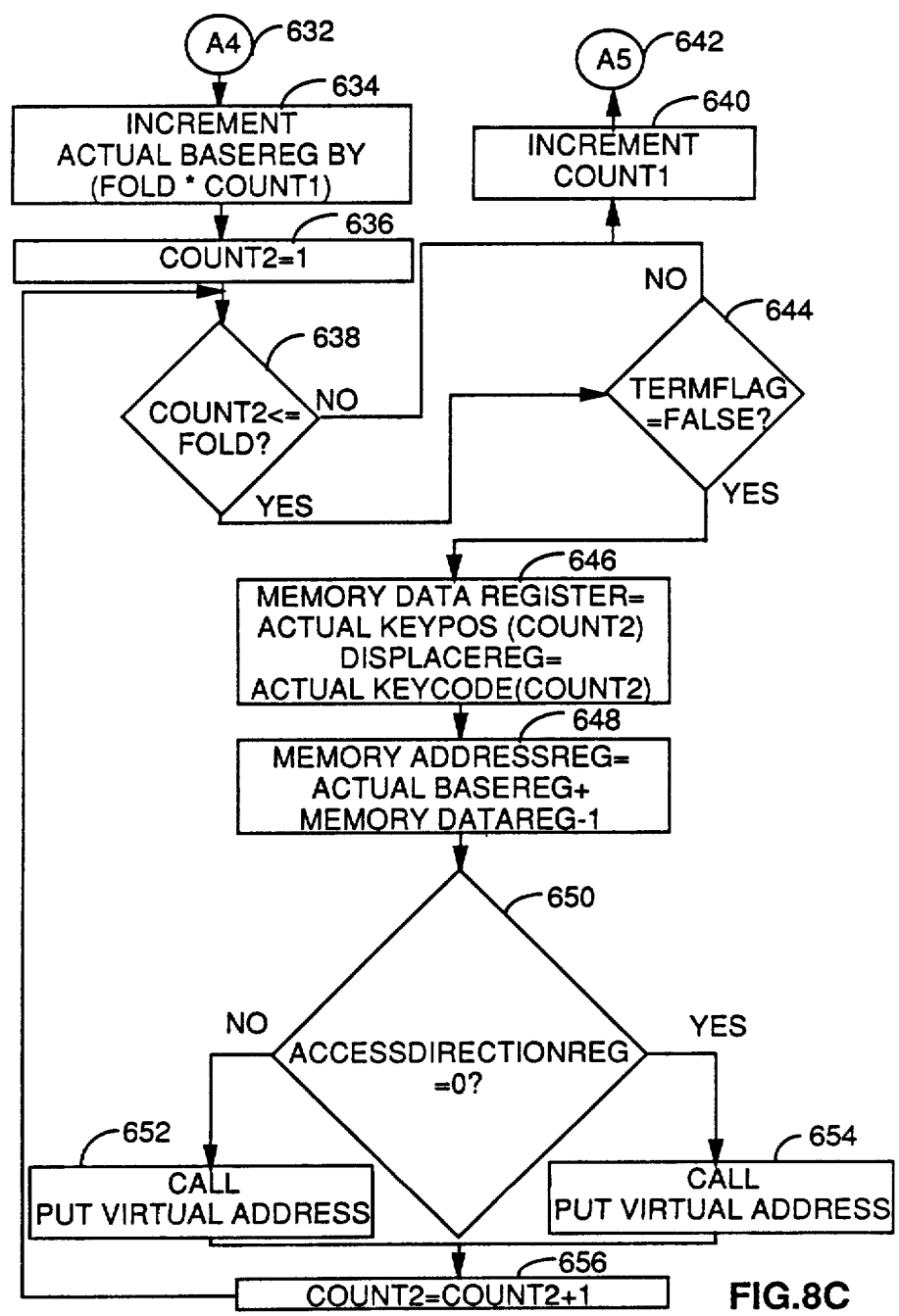

A detailed flow diagram illustrating the process methodology and structural flow for a specific embodiment of the Access 3 process is shown in FIGS. 8A, 8B and 8C. Referring to FIG. 8A, the Access 3 process begins at block 560, and proceeds to increment the counting variable i, as shown at block 562, The values for the actual key position array are set up for i equal 1 to 5, as shown at blocks 564, 566, and 568. If at block 564, i is greater than 5, then processing flow branches to block 570 where a test is performed to determine whether the word length is equal to 4. If the result at 570 is negative, processing flow branches to block 590, and if the result is affirmative, the value of i is again initialized, and the value of a variable fold is set equal to 4, as shown at block 572. A test is then performed to determined whether the value of i is greater than 6, and if the result is negative, processing flow proceeds to block 576, and block 578 where values are calculated for the index register 1, index register 2, and a value of ZT1, as shown. Processing flow then continues to block 580 where a test is performed to determine whether ZT1 is less than the value of the actual key code array value (which is passed from the filter) at the position given by the value of index register 2. If the result is affirmative, processing flow proceeds to blocks 584, 586 and 588 where actual key code array and actual key position array values are calculated, as illustrated, and after which processing flow continues to block 582. If the result at block 580 is negative processing flow branches to block 582 where the counting variable i is incremented, and then processing flow branches back to block 574, as shown.

If the result at block 574 is affirmative then processing flow branches to block 590 where the value of variable i is set equal to 7 and of the variable fold is set equal to 5, as shown. Processing flow then continues to blocks 592 & 594 where the values of the index register 1, index register 2, and ZT1 variables are calculated, as illustrated. The calculated value of ZT1 is then tested to determine whether it is less than the actual key code array value at the position given by index register 2, as illustrated 596. If the result is affirmative, processing flow proceeds to blocks 598 and 600 to calculate actual key code array and actual key position array values, as illustrated, and then proceeds to block 602, as shown. If the result at block 596 is negative, processing flow branches directly to block 602 where the value of i is incremented. The value of i is then tested to determine if it is greater than 15, as illustrated at block 604, and if the result is negative, processing flow branches back to block 592, as shown. If the result at block 604 is affirmative, processing flow branches to node 606 which illustrates a continuation of the flow diagram to FIG. 8B.

Referring to FIG. 8B, processing flow is seen to continue at block 60 where the actual base address value is calculated, and to block 610 and 612 for the calculation of Shift Frequency value as well as the setting of the Termflag and Overflowflag and the variable Count. Processing flow then proceeds to block 614 where Termflag is tested to determine whether it is false, and if the result is negative, processing flow branches to block 628 where the Access 3 process is terminated, as shown. However, if the result at block 614 is affirmative, processing flow proceeds to block 616 where the value of the variable Count is tested to determine if it is less than the value of the variable Shift Frequency, and if the result is negative, processing flow branches to block 618. In block 618, a value for Number Overflow array is tested to determine if it is equal to 0, and if the result is affirmative, the Link Manager routine is called, as illustrated at block 620. If the result at block 618 is negative, processing flow branches to block 622 where Termflag is tested to determine if it is false. If the result at block 622 is negative, processing flow branches to block 628 where the Access 3 process is terminated, and if the result is affirmative, processing flow continues to block 624. At block 624, the Overflowflag value is set equal to true, and then the Access 2 process routine is called, as illustrated at block 626. The processing flow then continues to block 628 where the Access 3 process is terminated.

Referring back to block 616 of FIG. 8B, if the result at block 616 is affirmative, processing flow branches to node 632 which illustrates a continuation of the flow chart to FIG. 8C. As shown at block 634 of FIG. 8C, the Actual Base Register value is incremented, and then the Count2 value is set equal to 1, as shown at block 636. The value of Count2 is then tested to determine if it is less than the value of Fold, as shown at block 638, and if the result is affirmative, processing flow proceeds to block 634 where the Termflag value is tested to determine whether it is false. If the result at blocks 638 or 644 are negative, processing flow branches to block 640 where value of Count is incremented after which process control continues to the node 642 which illustrates a branch back to block 614 of FIG. 8B. If the result at block 644 is affirmative, processing flow continues on to blocks 646 and 648 where Memory Address Data Register, Displacement Register, and Memory Address Register values are calculated, as illustrated, and then the access direction register is tested to determine if it is equal to 0, as shown at block 650. If the result at block 650 is negative, processing flow branches to block 652 where the Get Virtual Address routine is called after which processing control proceeds to block 656, as shown. If the result at block 650 is affirmative, processing flow branches to block 654 where the Put Virtual Address routine is called after which processing flow proceeds to block 656 where the variable Count2 is incremented. Processing flow then branches back to block 638, as shown.

Figure 8D:
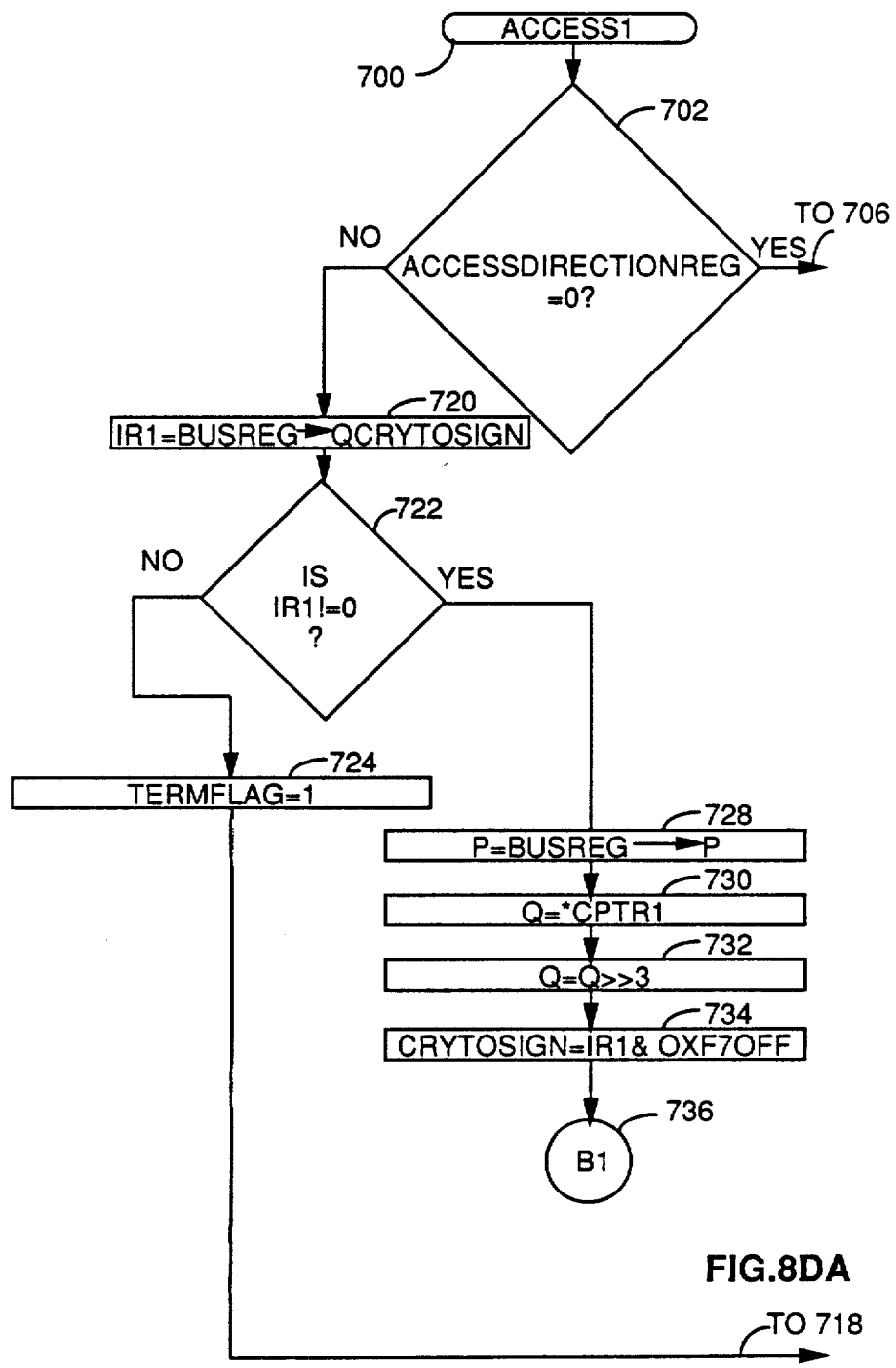
FIG. 8D (8DA and 8DB) and FIG. 8E are flow diagrams illustrating the. methodology and structural flow of a specific embodiment of an Access 1 function for the specific embodiment of the natural language operating system interface program illustrated in FIG. 2.
Figure 8D:
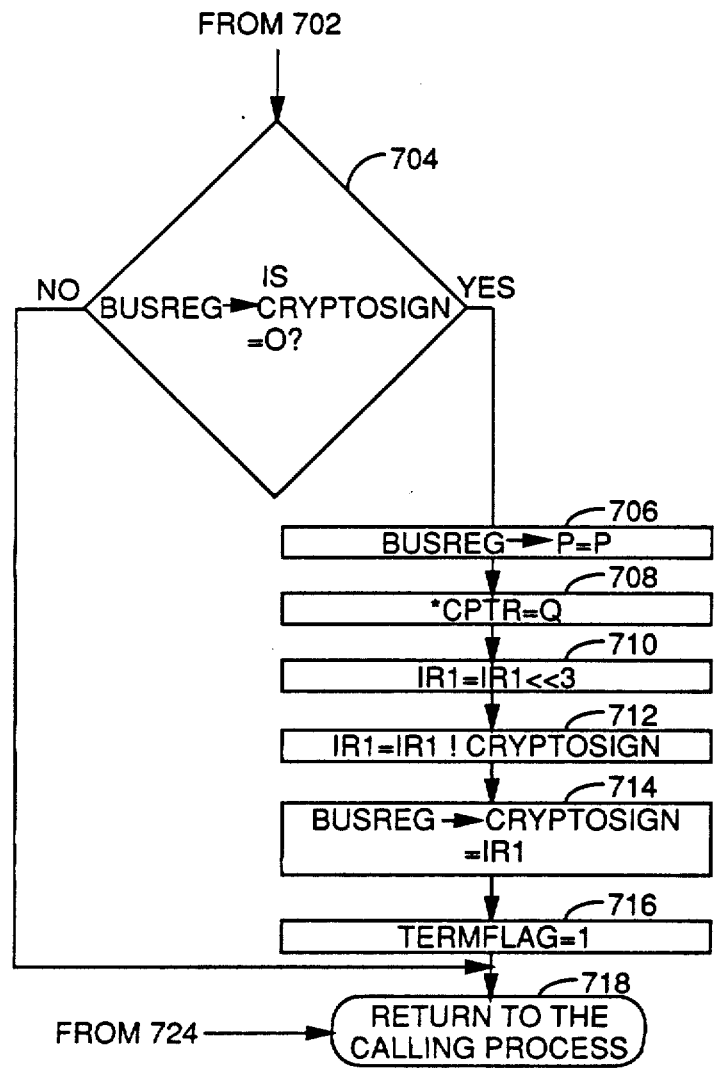
Figure 8E:
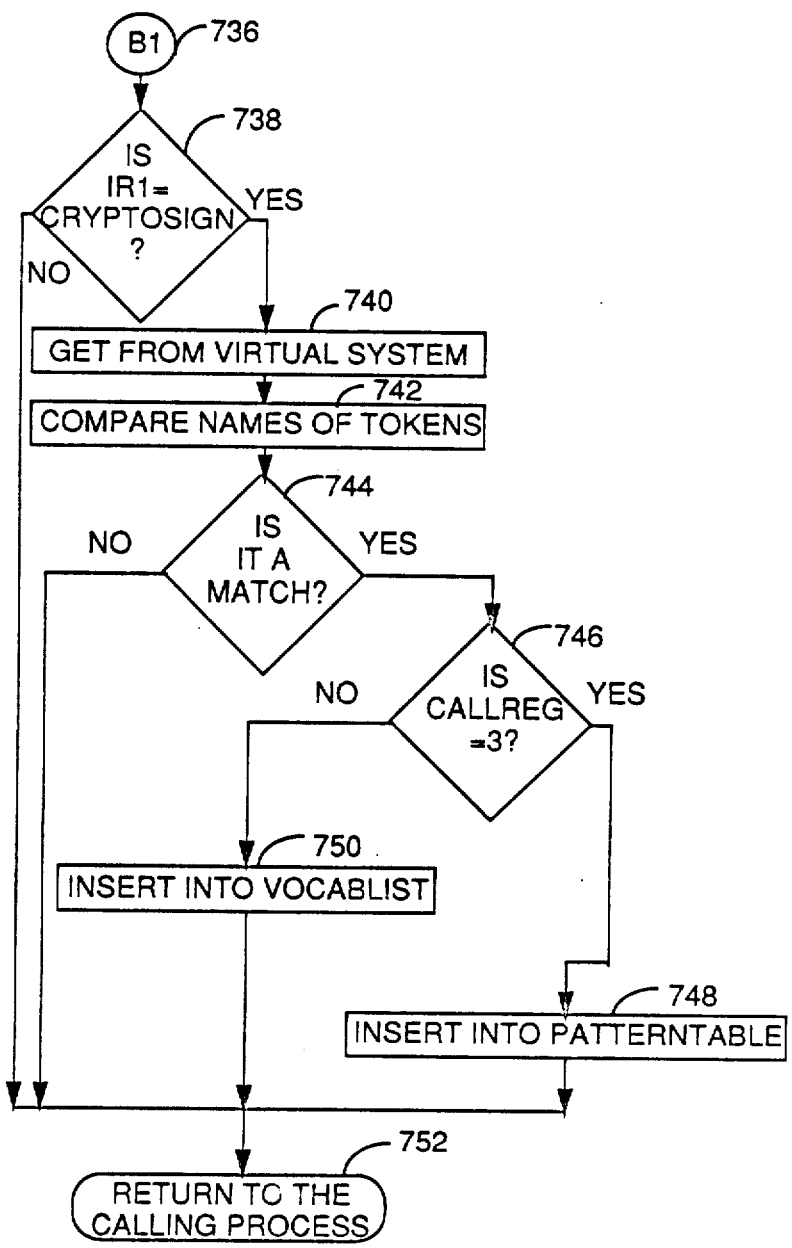

A detailed flow diagram illustrating the process methodology and structural flow for a specific embodiment of the Access 1 process is illustrated in FIGS. 8D & 8E. Referring to FIG. 8D, the Access 1 process begins at block 700, and proceeds to test to determine if the access direction register is equal to zero (0) at block 702. If the result of the set at block 702 is affirmative, then the processing flow continues to block 704 where another test is made to determine if the QCRYPTOSIGN variable pointed to by BUSREG is equal to zero. If the result of the test at block 704 is affirmative, the processing flow then continues to block 706 where the P variable pointed to by BUSREG is set to the P (page number) retrieved from the virtual system. The processing flow then continues to block 708 where the contents of the location pointed to by CPTR variable is set to the 9 (off set) returned from the virtual system. In block 710, variable IR1 is shifted to the left by 3 places and the processing flow continues to block 712 and 714 where the value of the QCRYPTOSIGN is superimposed on variable IR1 by a bit or operation. Processing flow then proceeds to block 716 and the TERMFLAG variable is set to one, and in block 718 processing flow returns back to the calling process (either access 2 or access 3). If the result of the test at block 704 is negative then the processing flow branches to block 718 directly.

If the result of the test at block 702 is negative, processing flow branches to block 720 where variable IR1 is set to QCRYPTOSIGN pointed to by the BUSREG. The processing flow then continues to block 722, and a test is made to determine if the variable IR1 is not equal to zero, and if the result is negative, processing flow then proceeds to block 724 where the TERMFLAG is set equal to one. Processing flow then continues to block 718, and the processing flow returns to the calling process (either Access 2 or Access 3) as illustrated by block 718. If the result of the test at block 722 is affirmative, the processing flow proceeds to blocks 728, 730, 732, and 734 where variables P,Q and cryptosign are extracted (unpacked).

The processing flow proceeds from block 734 in FIG. 8D to block 738 of FIG. 8E as illustrated by node 736, and a test is made to determine if the IR1 value is equal to the CRYPTOSIGN value, and if the result is negative processing flow directly branches to block 752. If the result of the test at block 738 is affirmative, then block 740 proceeds to get the information from the virtual system as indicated by P and Q. At block 742 the names of the tokens and the information fetched by the virtual system are compared. If the result of the comparison, as indicated in block 744 is negative then processing flow directly branches to block 752. If the result of the comparison at block 744 is affirmative, then processing flow continues to block 746 where a test is made to determine if the value of the CALLREG variable is equal to 3, and if the result is affirmative then at block 748 the token and the information retrieved are inserted into the pattern table, and the process flows to block 752. If the result of the test in block 746 is negative, the processing flow proceeds to block 750 where the token and the information retrieved are inserted into the list of vocabularies. The processing flow then continues to block 752 which indicates a return to the calling process (either Access 1 or Access 2).

Figure 8F:
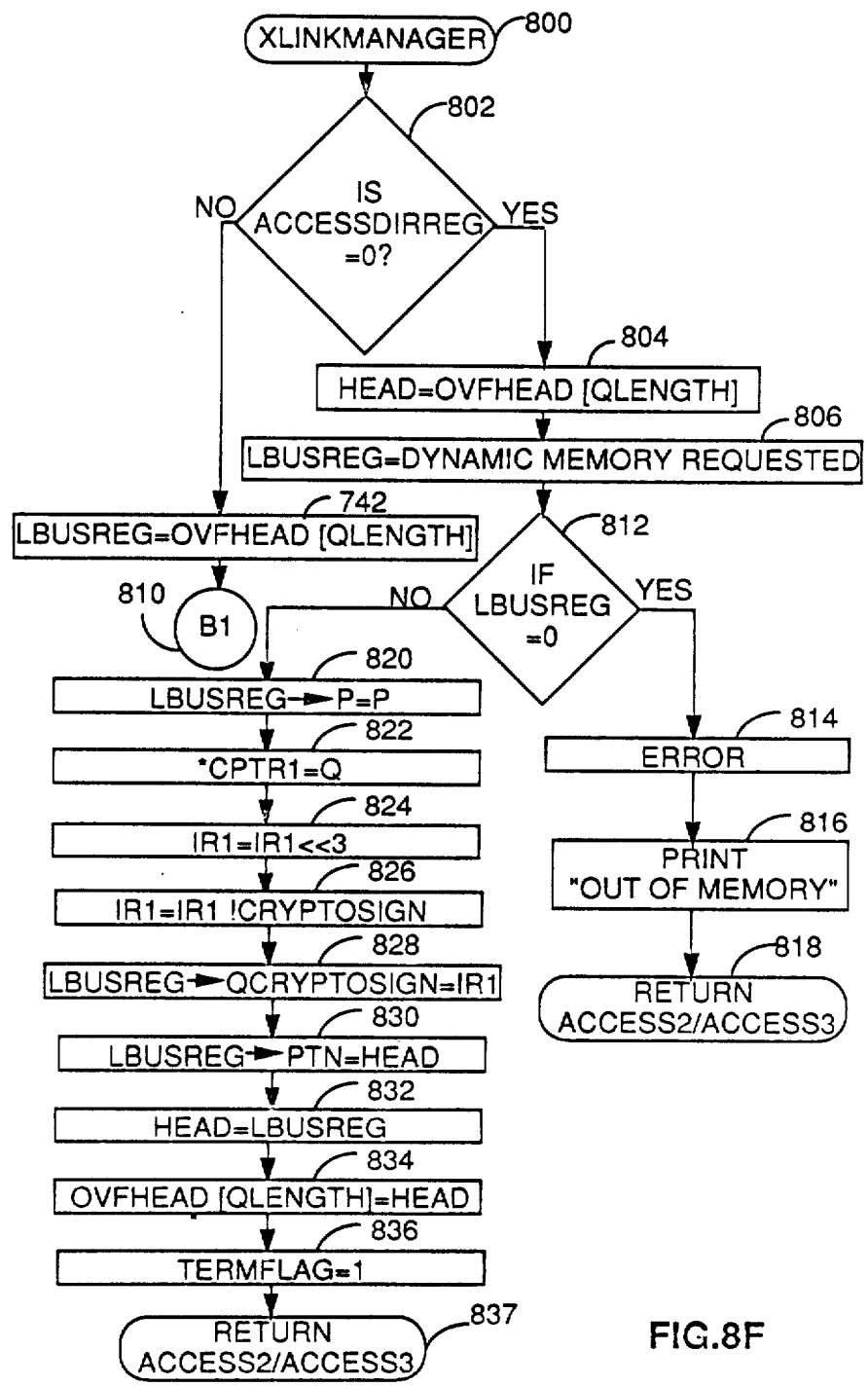
FIG. 8F and FIG. 8G are flow diagrams illustrating the methodology and structural flow of a specific embodiment of a Linkmanager function for the specific embodiment of the natural language operating system interface program illustrated in FIG. 2.
Figure 8G:
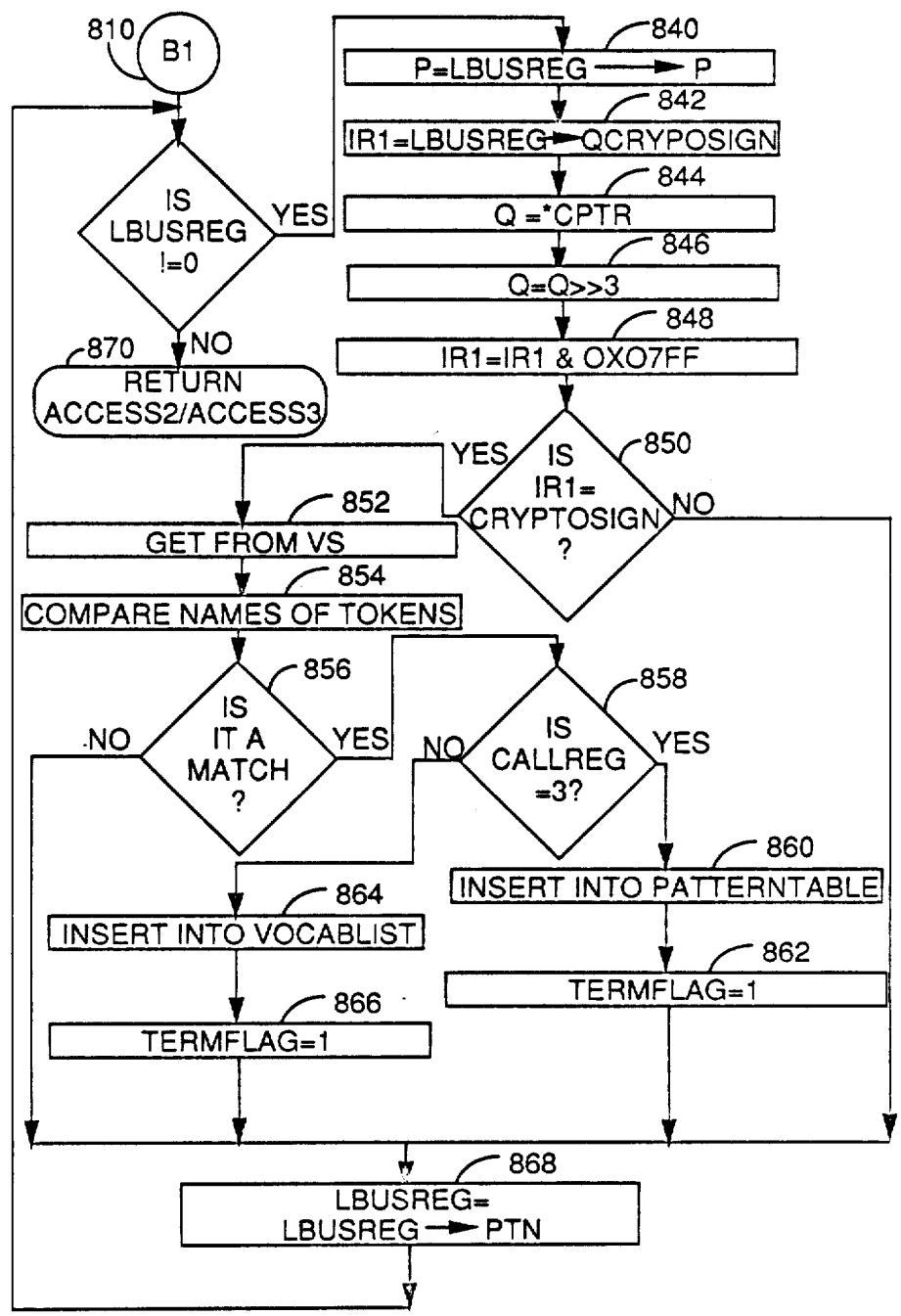

A detailed flow diagram illustrating the process methodology and structural flow for a specific embodiment of a XLINKMANAGER subprocess (used by Access 2 and Access 3 process) is shown in FIGS. 8F and 8G. Referring to FIG. 8F, the XLINKMANAGER process begins at block 800, and proceeds to test at block 802 to determine if the value of the access direction register is equal to zero (0), and if the result is affirmative, processing flow proceeds to block 804 where the pointer HEAD is set to the beginning link list (i.e., the OVFHEAD array). Processing flow then continues to block 806 and then pointer LBUSREG is set to the beginning of this block. At block 812 another test is made to determine if the value of link Bus Register is equal to zero, and if the result is affirmative the processing flow proceeds to blocks 814 and 816 for error handling. Processing flow then continues to block 818, and the processing flow returns to the calling process (either Access 1 or Access 2). If the result of the test in block 812 is negative, then processing flow proceeds to blocks 820, 822, 824, 826 and 828 where variables Q (offset)and CRYPTOSIGN are packed and set to location QCRYPTOSIGN which is pointed to by LBUSREG. Processing flow then continues to blocks 830, 832 and 834 to update the link list pointer array OVFHEAD, and then proceeds to set a TERMFLAG to one. The processing flow proceeds to block 837, where a return is made to the calling process (either Access 1 or Access 2).

If the result of the test in block 802 is negative, processing flow proceeds to block 808 where the OVFHEAD array is set to the variable LBUSREG, and then proceeds to block 838 of FIG. 8F as illustrated by node 810 of FIG. 8G. Referring to FIG. 8G, processing flow continues in block 838 to determine if the value of LBUSREG is not equal to zero, and if the result is affirmative, it proceeds to blocks 840, 842, 844, 846 and 848 to unpack Q and CRYPTOSIGN from variables QCRYPTOSIGN pointed to by variable LBUSREG. Processing flow then continues to block 850, where a test is made to determine if the variable IR1 is equal to the variable CRYPTOSIGN, and if the result is negative, processing control flows to block 868 to advance the pointer variable LBUSREG to the next number in the link list, the OVFHEAD array. Processing flow then branches back to block 838, as shown. If the result of the test in block 850 is affirmative, then processing flow proceeds to blocks 852 and 854 to determine if the token name matches the name maintained in the knowledge base (virtual system). Processing flow continues in block 856 to test to determine if a match is made, and if the result is negative, then processing proceeds to block 868 and then branches back to block 838. If the result of the test in block 856 is affirmative, a test is made at block 858 to determine if the value of CALLREG is equal to 3, and if the result is affirmative, processing control proceeds to block 860 where the information is inserted into a Pattern Table. Processing flow then proceeds to block 862, a flag called TERMFLAG is set to one, and then processing flow proceeds to blocks 868 and 838. If the result of the test at block 858 is negative, the token is inserted into the vocabulary at block 864 and proceeds to set the TERMFLAG to one at block 866. Processing flow proceeds to block 868 and then branches back to block 838.

Referring now to FIGS. 10A, 10B, 10C, 10D, 10E, 10F and 10G there is shown flow diagrams illustrating the process methodology and structural flow for a specific embodiment of the intermediate code generator function shown as block 96 of FIG. 2. The intermediate code generator starts at block 1000 in FIG. 10A, and proceeds directly to blocks 1002 and 1004 where initialization of the variables is performed. A sorting process is applied to PATTERNTABLE using the position as the key as shown is blocks 1006, 1008, 1010, 1012, 1014, 1016, 1020 and 1022. Processing flow then continues to block 1026 of FIG. 10B as illustrated by node 1024 to reinitialize variable i to 1. Processing flow proceeds to block 1028 to perform a test to determine if every member of the PATTERNTABLE is traversed, and if the result is negative the opcode contained in the PATTERNTABLE for each row is retrieved as shown in block 1030. Another test is performed in block 1032 to compare Ⓡthe retrieved opcode with the numerical value of 18, and if the result is affirmative, it proceeds to block 1034 to mark the token and the information to be disregarded from further considerations. If the result of the test in block 1032 is negative, then processing flow directly branches to block 1036 for assigning a pointer variable PT to the first member of the list. In block 1038 a test is performed to determine if a null pointer is detected, and if negative it proceeds to block 1042 to retrieve the opcode. If the result of the test in block 1038 is affirmative, processing flow continues to block 1040 to increment variable i by one, after which it branches back to block 1028. Processing flow continues in block 1044 to test the retrieved opcode to determine if it is equal to the numerical value of 18, and if the result is affirmative the link is erased and the unused segment of the memory is returned, as shown in blocks 1046 and 1048. If the test result in block 1044 is negative, then processing flow branches to block 1050 to increment the PT pointer by one, after which processing control branches back to block 1038.

Figure 10A:
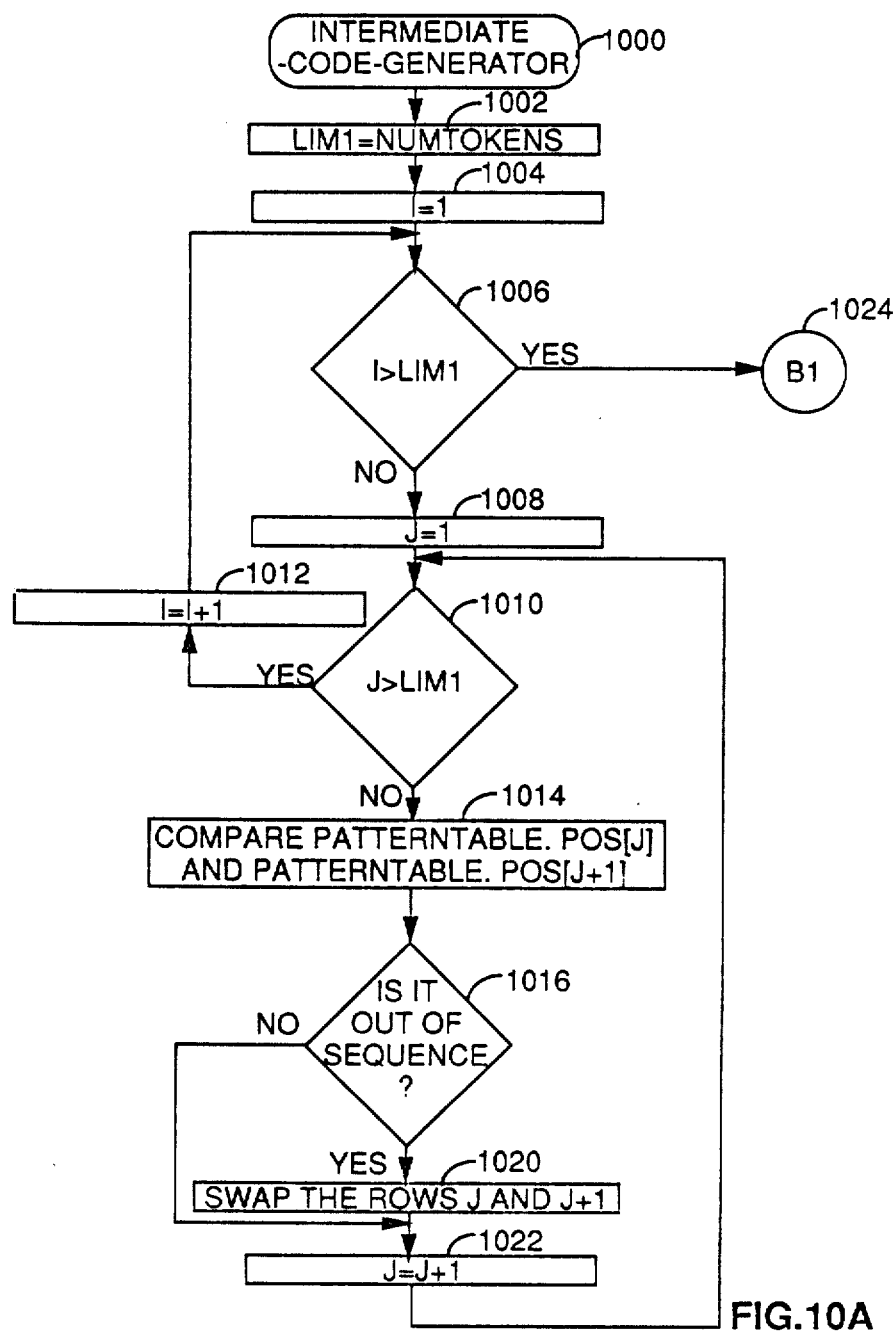
FIG. 10A (10DA and 10DB), 10B.
Figure 10B:
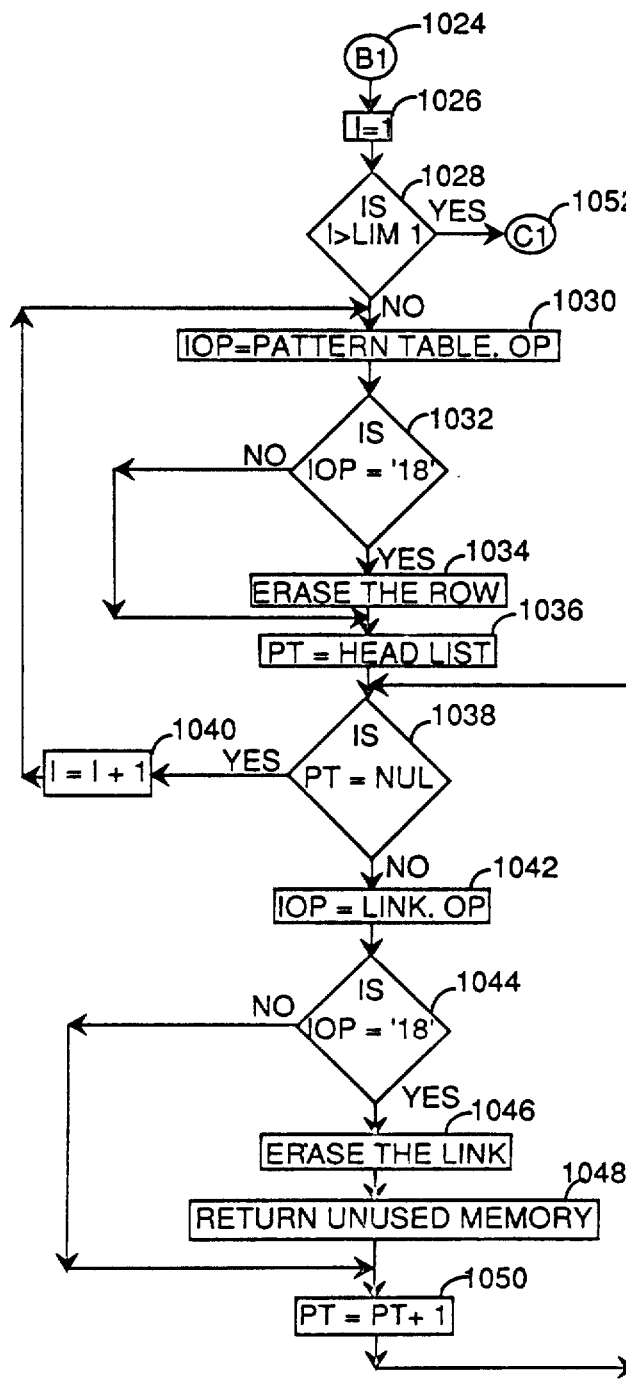
FIG. 10C, FIG. 10D, FIG. 10E, FIG. 10F and FIG. 10G are flow diagrams illustrating the methodology and structural flow of a specific embodiment of an intermediate code generator function for the specific embodiment of the natural language operating system interface program illustrated in FIG. 2.
Figure 10C:
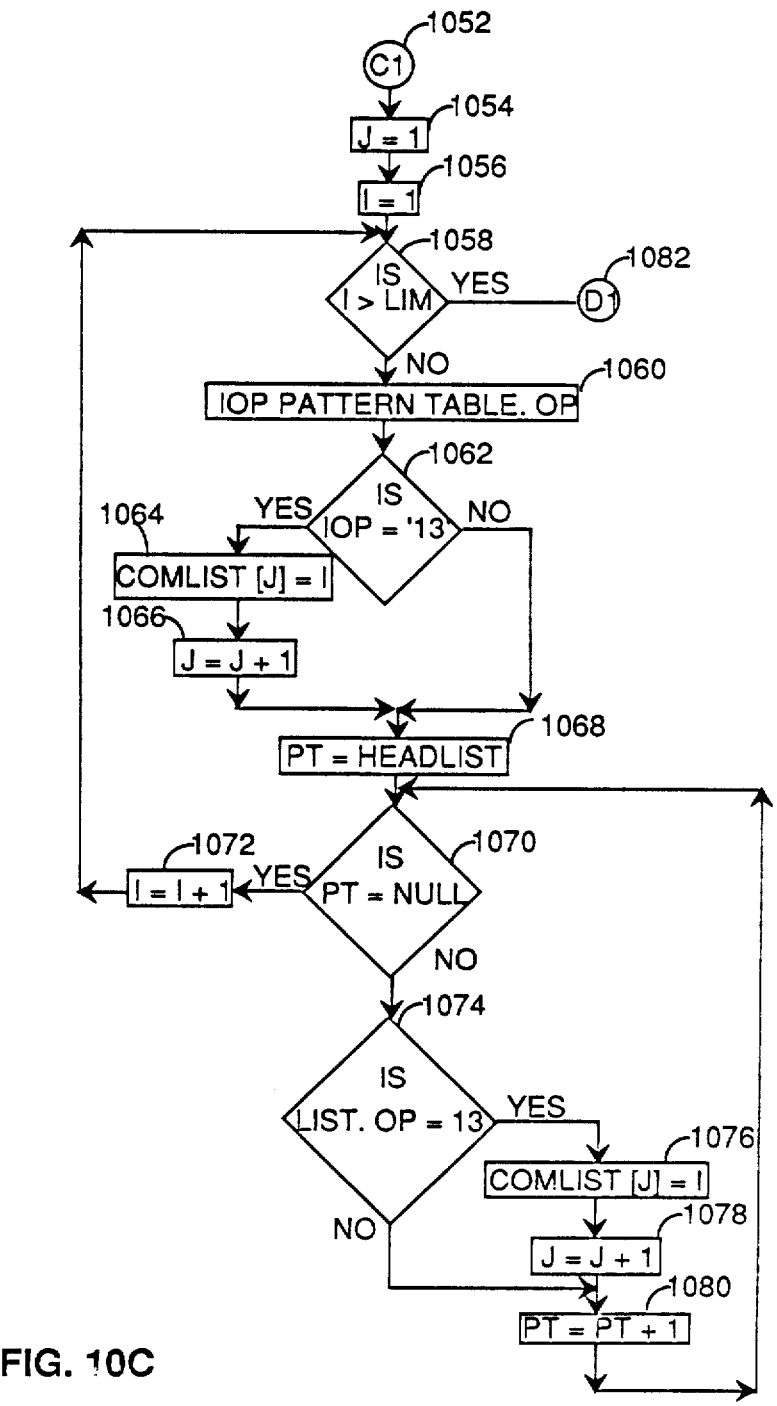

Referring again to block 1028, if the result of the test is affirmative, processing flow proceeds to blocks 1054 and 1056 of FIG. 10C, as illustrated by node 1052, to initialize variable i and j to one. In block 1058 a test is done to determine whether every member of the PATTERNTABLE is traversed, and if the result is negative, it proceeds to block 1060 to retrieve the opcode. Processing flow then continues to block 1062 where another test is made to compare the retrieved opcode with the numerical value of 13, and if affirmative, it proceeds to blocks 1064 and 1066 where the row number is inserted in COMLIST array. If the result of the test in block 1062 is negative, processing flow directly proceeds to block 1068 to assign the pointer variable PT to the first member of the list. Processing then continues to block 1070 to test whether the pointer is of NULL value and if affirmative it then continues to block 1072 to increment variable i by one, after which branches back to block 1058. If the result of the test in block 1070 is negative, processing flow continues to block 1074 to perform another test to compare the retrieved opcode with the numerical value of 13. If the result is affirmative, it proceeds to blocks 1076 and 1078 insert the row number in COMLIST array, and if negative it directly branches to block 1080 to advance the pointer by one, after which it branches back to block 1070.

Figure 10D:
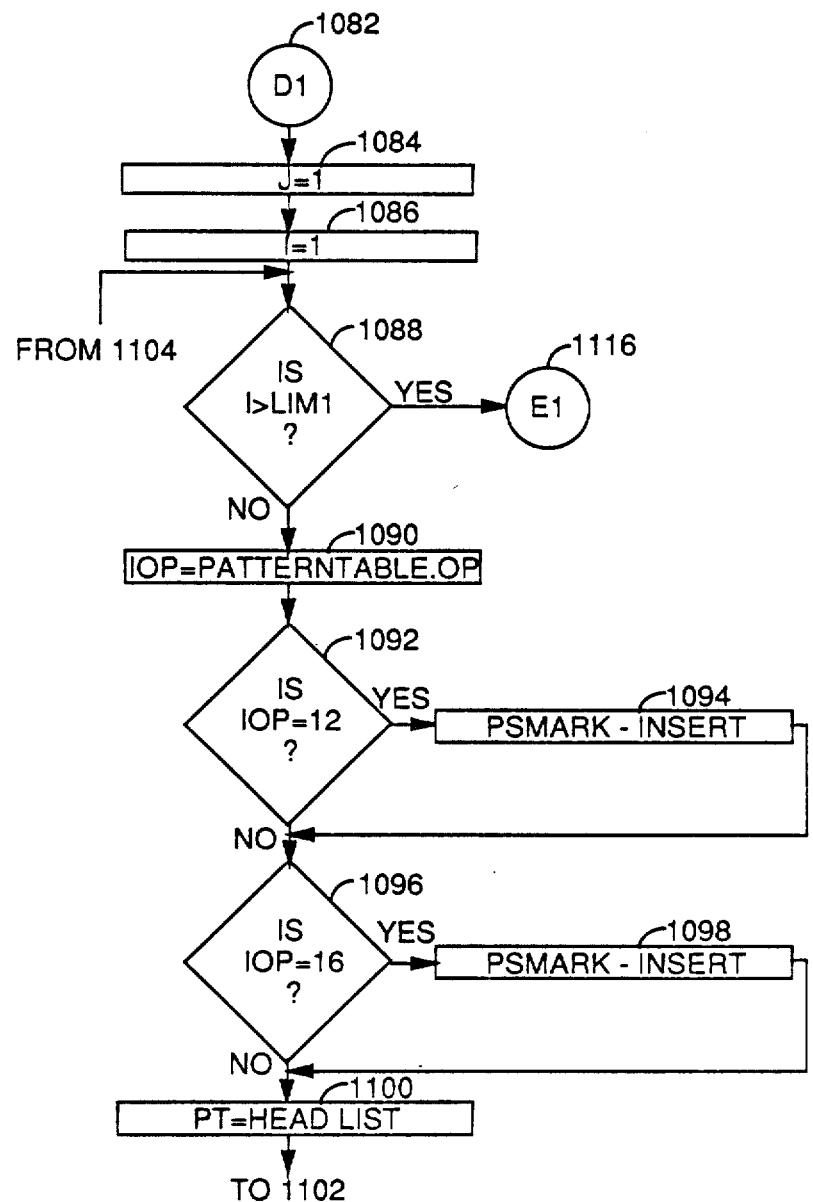
Figure 10D:
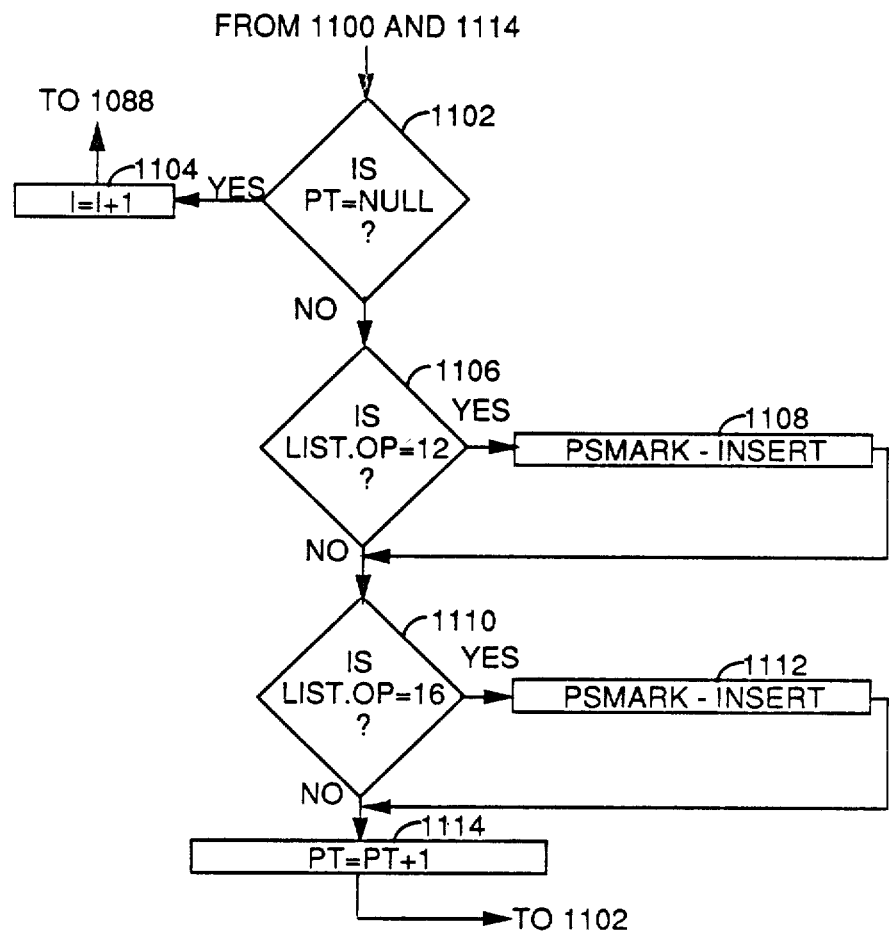
Figure 10E:
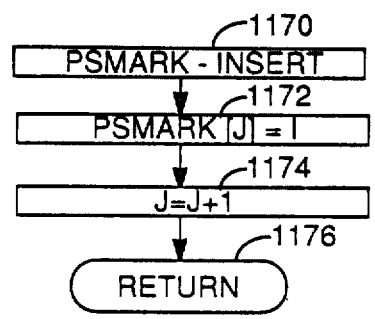

Returning back to block 1058, if the result of the test is affirmative, processing flow proceeds to blocks 1084 and 1086 of FIG. 10D, as illustrated by node 1082 to initialize variables i and j to one. A test is done in block 1088 to determine if every member of the PATTERNTABLE is traversed, and if negative the opcode is retrieved, as shown in block 1090. Processing flow continues to block 1092 to perform another test to check whether the opcode is equal to the integer 12, and if affirmative it proceeds to block 1094 by calling the procedure PSMARK-INSERT at blocks 1170, 1172, 1174 and 1176 of FIG. 10E to insert the row position in array PSMARK and finally return back to the calling process (block 1094). If the result of the test in block 1092 is negative, processing flow continues to block 1096 where the retrieved opcode is compared with integer 16, and if they are equal it proceeds to block 1098 where the PSMARK-INSERT procedure is called. If the result of the test in block 1096 is negative, the pointer PT is set to the first member of the link list, as shown in block 1100. Processing then proceeds to block 110 to test whether the pointer is null, and if affirmative then variable i is incremented by one at block 1104, and then branches back to block 1088. If the result at 1102 is negative, another test is made in block 1106 to compare the opcode with integer 12. If the result is affirmative the PSMARK-INSERT procedure is called, as shown in block 1108. If the result is negative processing flow proceeds to block 1110 to determine whether the retrieved opcode is equal to 16, and if affirmative, then PSMARK-INSERT procedure is again called, as shown in block 1112. If the result of the test in block 1110 is negative, it proceeds to block 1114 to advance the pointer PT by one, after which processing control branches back to block 1102.

Figure 10F:
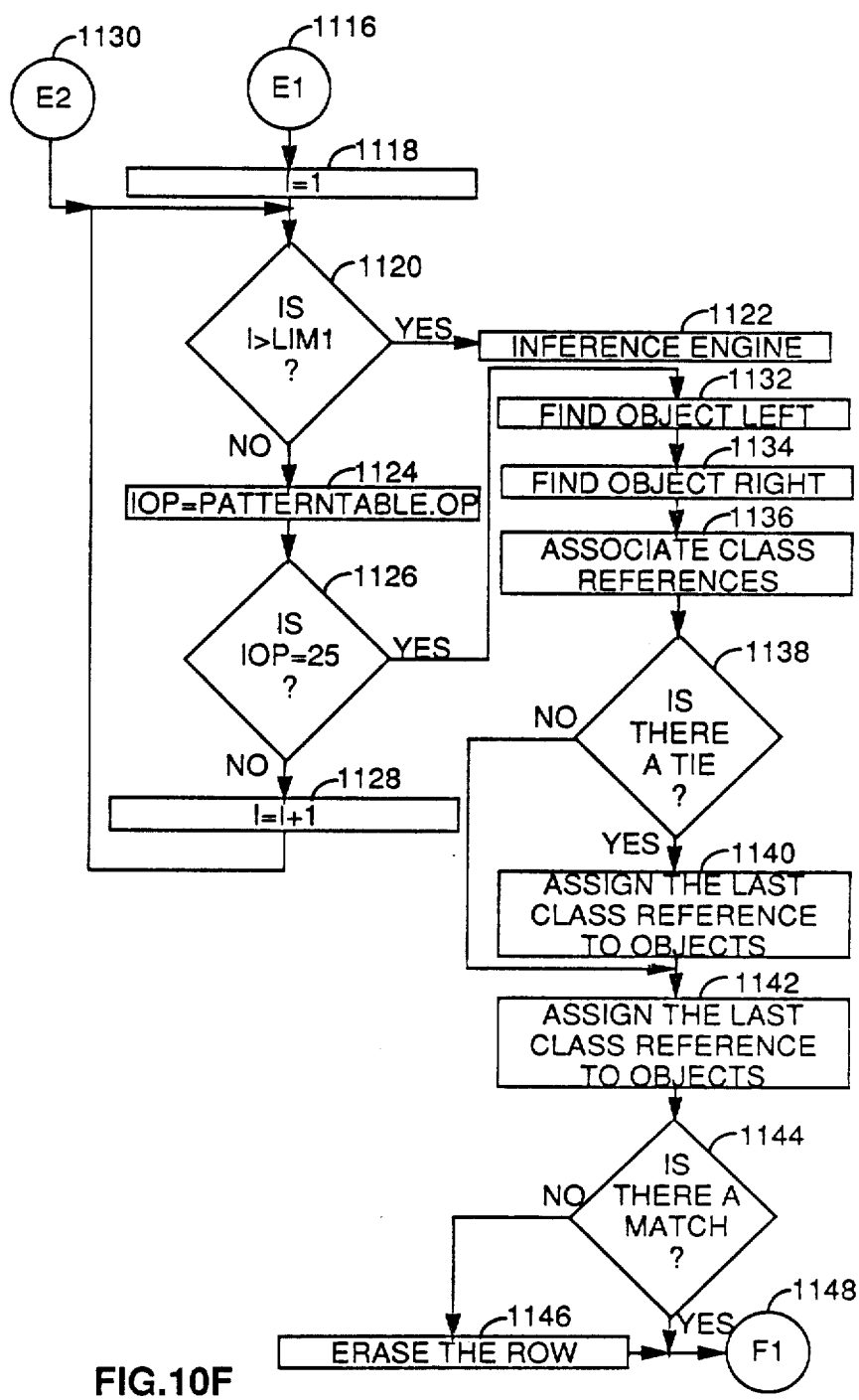

Returning to block 1088, if the result of the test is affirmative, processing flow proceeds to block 1118 of FIG. 10F, as illustrated by node 1116 to reinitialize variable i to one. Processing flow then continues to block 1120 to perform a test to determine whether every member of the PATTERNTABLE is traversed, and if affirmative the inference engine process 98 is entered. If the result is negative processing control proceeds to block 1124 where the opcode of a row in the PATTERNTABLE is retrieved, and it continues to block 1126 to test the opcode against integer 25, and if negative, it increments the variable i by one and then branches back to block 1120. If the result of the test is affirmative, processing flow continues to blocks 1132, 1134 and 1136 where class references are matched with objects in their neighborhood. It then proceeds to block 1138 to test if a tie or deadlock is present, and if affirmative it proceeds to block 1140 to assign the last class reference to the remaining objects to help resolve the deadlock, after which processing continues to block 1142. If the result of the test in block 1138 is negative, processing flow branches to block 1142 to compare the variable SUBOP of the object with variable SUBOP of the class reference. Processing then proceeds to block 1144 where a test is made to determine if there is a match, and if negative the row of PATTERNTABLE is returned, as shown in 1146.

Figure 10G:
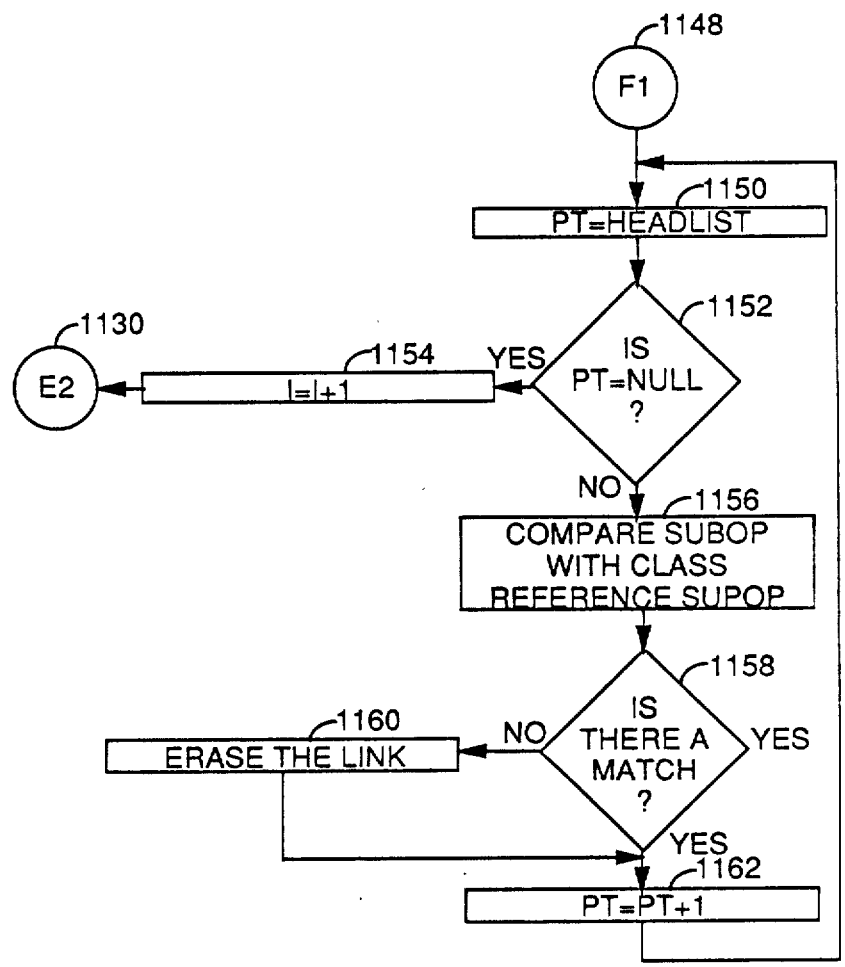

If the result of the test at block 1144 is affirmative, processing control directly branches to block 1150 of FIG. 10G, as illustrated by node 1148, to assign the pointer PT to the head of the list. Processing flow then continues to block 1152 where a test is made to determine if the pointer is null, and if affirmative, processing proceeds to block 1154 to increase variable i by one, after which control branches back to block 1120, as illustrated by node 1130. If the result of the test at block 1152 is negative, processing flow proceeds to compare the variable SUBOP of the PATTERNTABLE with variable SUBOP of the class reference, as shown in block 1156. A test is performed in block 1158 to determine whether there is a match, and if negative, processing control proceeds to block 1160 to erase the current member of the linked list, after which processing control continues to block 1162. If the result is affirmative, processing flow directly proceeds to block 1162 where pointer variable PT is incremented by one, and then branches back to block 1150.

The process methodology and structural flow for the inference engine, shown as block 98 of FIG. 2, is illustrated for a specific embodiment of the inference engine in FIGS. 11A, 11B, 11C, 11D and 11E. The inference engine begins at block 1200 and proceeds immediately to blocks 1202 and 1204 to initialize variable LIMIT1 and i. Processing flow then proceeds to block 1206 where a test is made to determine whether every member of the PATTERNTABLE is traversed, and if negative, processing flow proceeds to block 1208 where the SUBOP code is compared with numerical value of zero (0), and if affirmative, the row number is inserted in ANDPS1 array, as shown in blocks 1210 and 1212. If the result at block 1208 is negative, processing flow continues to block 1214 to see if the SUBOP code is equal to one, and if affirmative, the row number is inserted in ORPS1 array as shown in blocks 1216 and 1218. If the result at block 1214 is negative, processing flow continues to block 1220 to check whether the SUBOP code is equal to zero, and if affirmative, the row number is inserted into TOPS1 array as shown in blocks 1222 and 1224. If the result at block 1220 is negative, processing flow continues to block 1226 to check whether the SUBOP code is equal to one, and if affirmative, the row number is inserted into OWPS1 array, as shown at block 1228 and the variable K4 is incremented, as shown at block 1230. If the result at block 1226 is negative, processing proceeds to block 1232 to increment variable i by one, after which processing control branches back to block 1206.

Figure 11A:
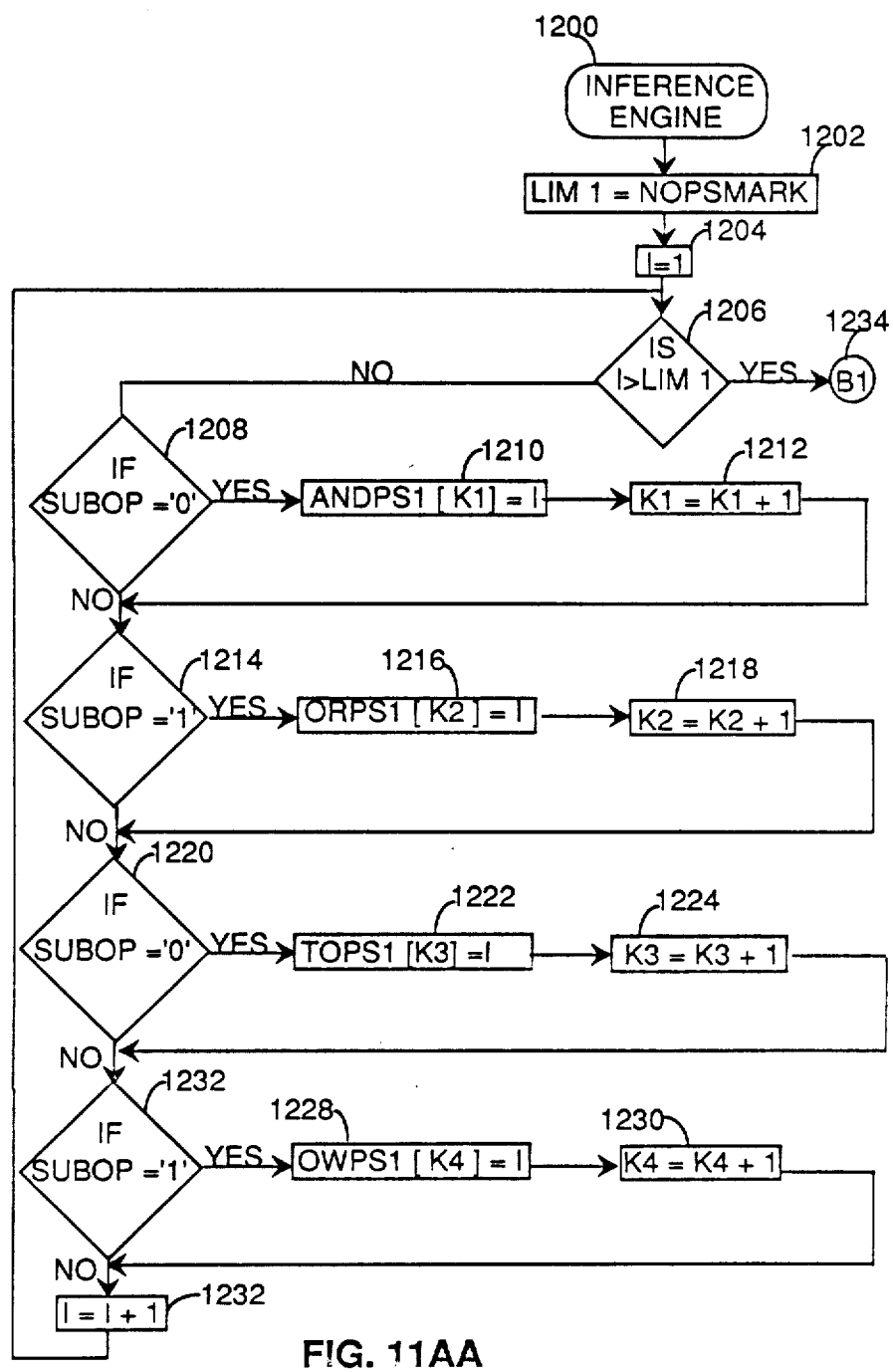
FIG. 11A (11AA and 11BA), FIG. 11B, FIG. 11C (11CA and 11CB), FIG. 11D (11DA and 11DB) and FIG. 11E are flow diagrams illustrating the methodology and structural flow of a specific embodiment of a inference function for the specific embodiment of the natural language operating system interface program illustrated in FIG. 2.
Figure 11A:
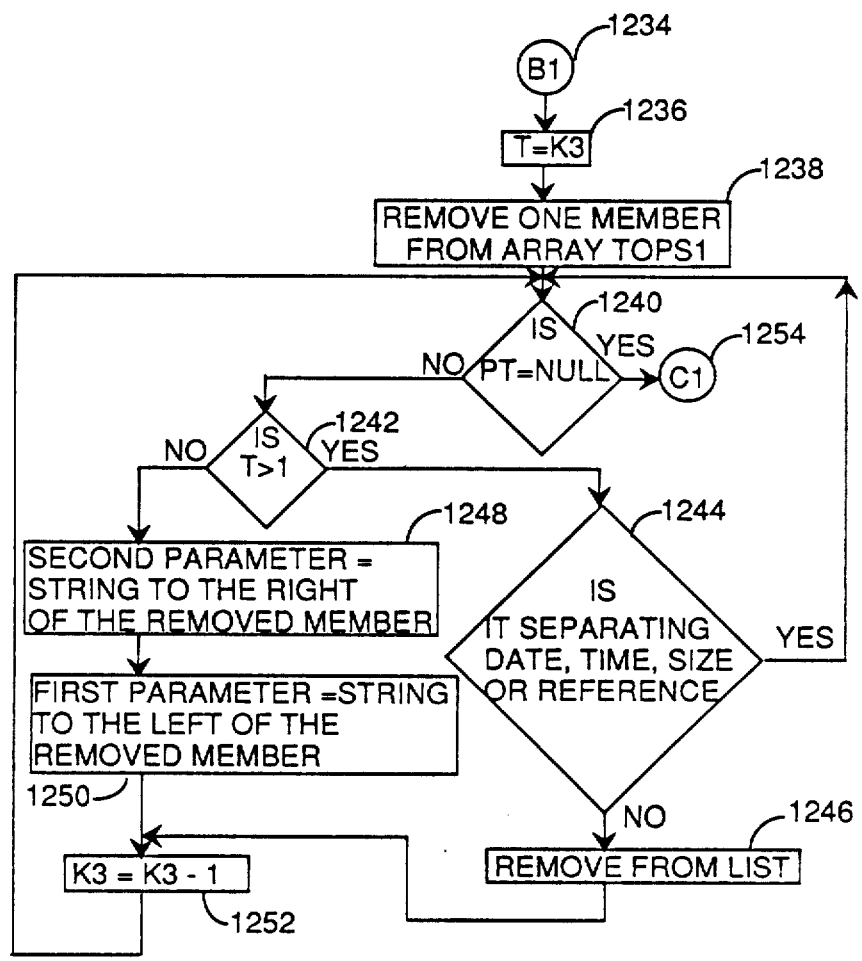

Returning to block 1206, if the result at block 1206 is affirmative, processing flow proceeds to blocks 1236 and 1238 of FIG. 11A, as illustrated by node 1234, where variable T is initialized and one member is removed from the array TOPS1. Processing then proceeds to block 1240 to test whether the pointer PT is null, and if negative, processing control branches to block 1242 for another test to determine if T is greater than one. If the result of block 1242 is negative the processing flow continues to blocks 1248 and 1250 to distinguish between the original parameters and the destination parameters. Processing flow then proceeds to block 1252 to decrement variable K3 by one, after which processing control branches back to block 1240. If the result at block 1242 is affirmative, processing flow continues to block 1244 to check whether the member is located between date, time or size references, and if negative, processing control proceeds to block 1246 to remove the member from the list, after which processing control branches to block 1252. If the result at block 1244 is affirmative, processing flow branches back to block 1240.

Figure 11B:
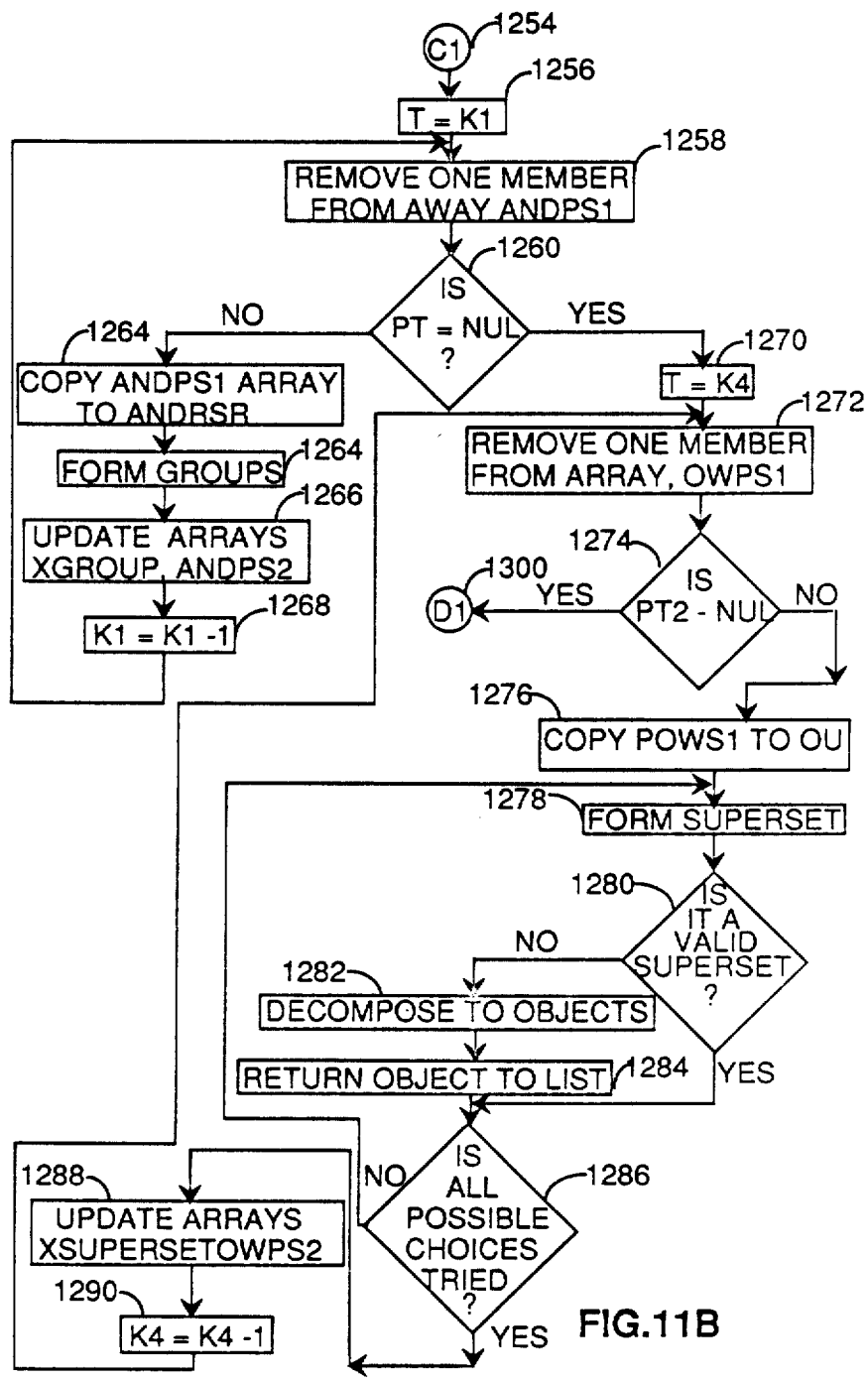

If the result at block 1240 is affirmative, processing flow branches to blocks 1256 and 1258 of FIG. 11B, as illustrated by node 1254, to initialize variable T and remove one member from array ANDPS1. In block 1260 a test is performed to determine whether pointer PT is null, and if negative, it proceeds to blocks 1262, 1264, and 1266 where beginning and ending boundaries of groups are formed and arrays XGROUP, and ANDPS2 are updated. The variable K1 is then incremented as indicated at block 1268 after which processing control branches back to block 1258. If the result at block 1260 is positive, processing proceeds to blocks 1270 and 1272 where variable T is initialized and one member is removed from the array OWPS1. At block 1274 pointer PT is checked to see whether it is equal to null, and if negative, processing continues to blocks 1276 and 1278 to set OWPS2 array and form the boundaries of a superset. Processing then continues to block 1280 to test the validity of the superset, and if negative processing flow proceeds to blocks 1282 and 1284 to break the superset into more elementary objects and inserts them into the list. If the result at block 1280 is affirmative, processing control branches directly to block 1286 to check whether all possible choices have been tried, and if negative control branches back to block 1278 If the result at block 1286 is positive, processing proceeds to blocks 1288 and 1290 to update arrays XSUPSET and OWPS2, after which control branches back to block 1272, as shown.

Figure 11C:
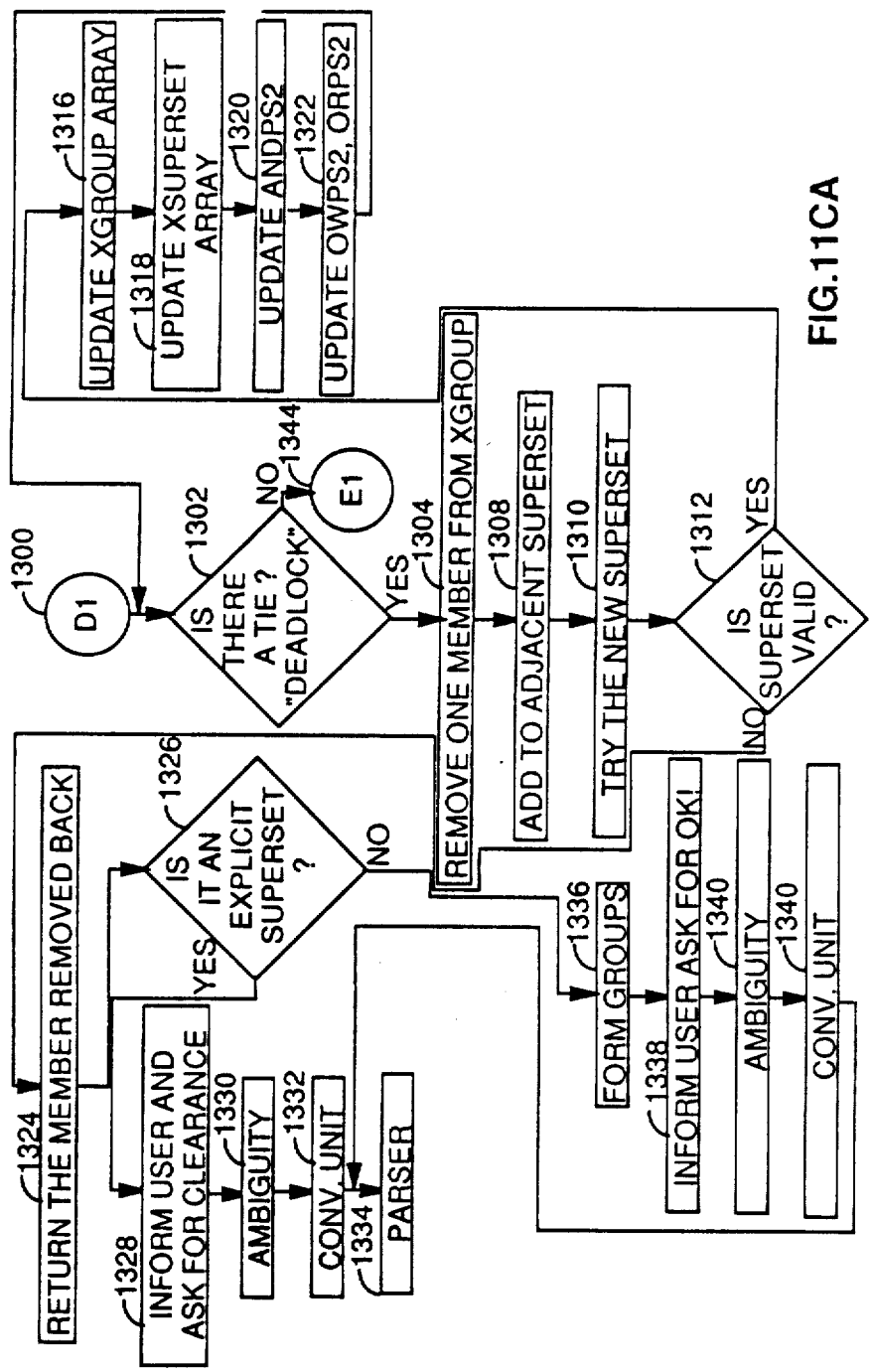

If the result at block 1274 is affirmative, processing flow branches to block 1302 of FIG. 11C, as illustrated by node 1300 to immediately check whether a deadlock situation exists, and if positive, control proceeds to block 1304, 1308 and 1310 to transfer a member of a group to an adjacent superset in order to remove the deadlock. If the test result at block 1312 is affirmative, processing control branches to blocks 1316, 1318, 1320 and 1322 to update arrays XGROUP, XSUPSET, ANDPS2, OWPS2 and ORPS2 to reflect any changes while grouping the objects together, after which control branches back to block 1302. If the result at block 1312 is negative, it proceeds to block 1324 to transfer back the member borrowed earlier from a group after which processing continues to block 1326. In block 1326 a test is performed to determine whether superset is explicitly requested by a marking in an array called OWPS2, and if affirmative it proceeds to block 1328, 1330 and 1332 to prompt the user about the ambiguity as a result of his request. If the result at block 1326 is negative, processing flow continues to blocks 1336, 1338, 1340 and 1342 to ignore the superset, and to inform the user for confirmation, after which control branches to block 1334 where the parser function is called.

If the result at block 1302 is negative, processing control branches to block 1345 of FIG. 11C, as illustrated by node 1344 to immediately test whether every group has been considered, and if negative it performs another test at block 1346 to see if every member in each individual group has been considered, and if affirmative, processing branches back to block 1345. If the result at block 1346 is negative, then another test is performed at block 1348 to see whether it belongs to a different class and if affirmative, a new list is formed as shown at block 1350, after which control branches back to block 1354 to update arrays XGROUPS and XSUPSET. If the result at block 1348 is negative, processing proceeds to block 1352 to form a new group, after which control branches to block 1354 to update the arrays. Processing then branches back to block 1346.

Figure 11D:
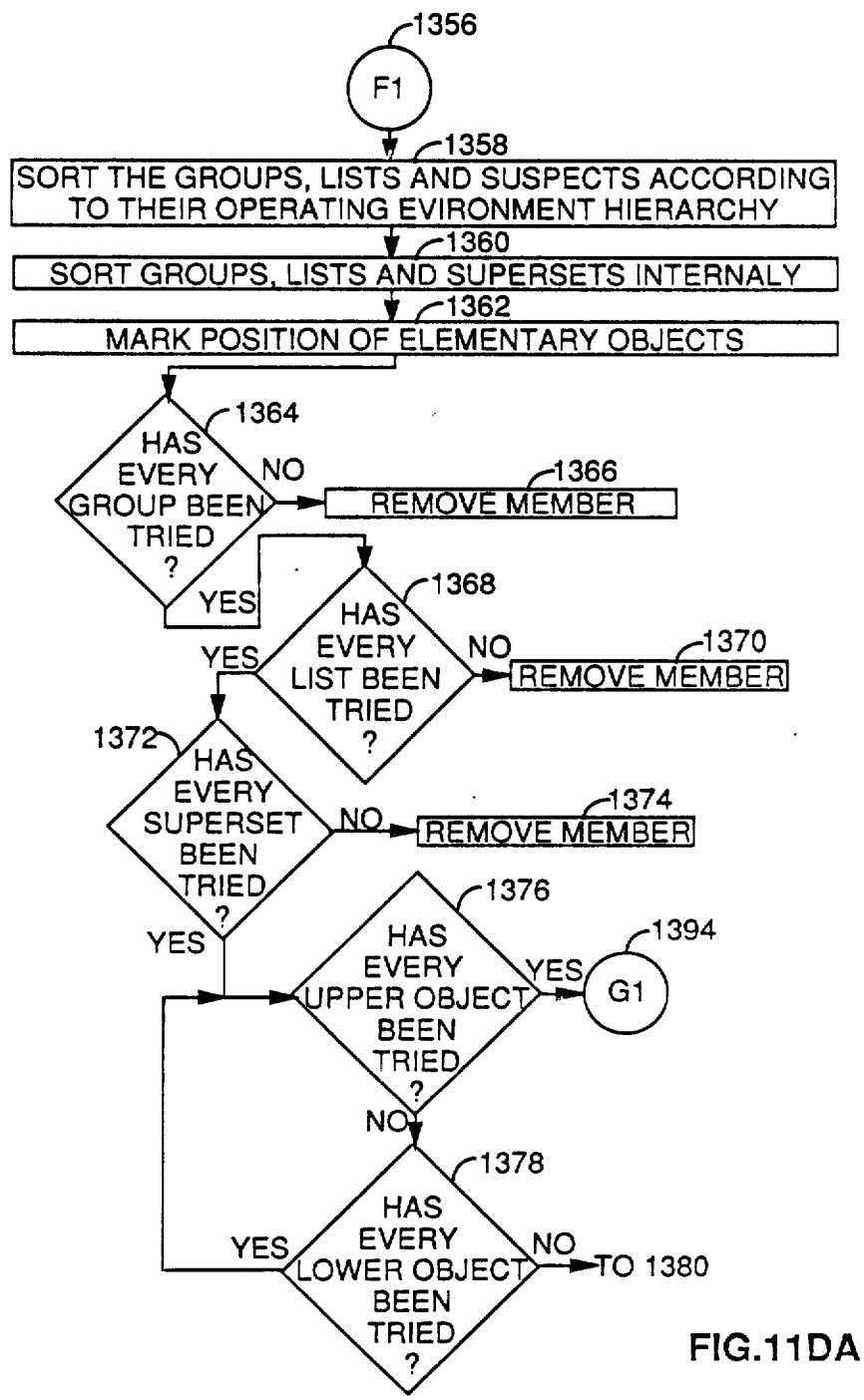
Figure 11D:
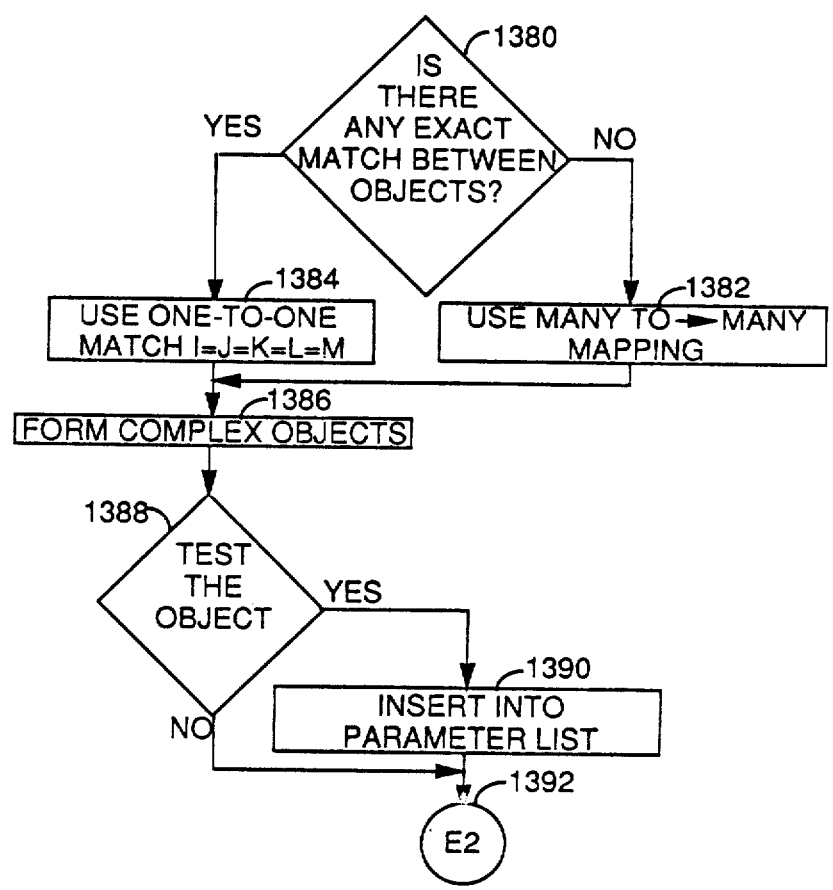

If the result at block 1345 is affirmative, processing flow branches to blocks 1358, 1360 and 1362 of FIG. 11D, as illustrated by the node 1356, to sort the groups according to their hierarchy and mark the position of the elementary objects. Processing then continues to block 1364 to check whether every group is tried, and if negative processing proceeds to block 1366 to remove the member, and if affirmative processing continues to block 1368 to test whether every list has been tried. If the result at block 1368 is negative processing proceeds to block 1370 to remove the member from the list. If the result at block 1368 is affirmative, a test is done at block 1372 to determine whether every superset has been tried, and if negative processing proceeds to block 1374 to remove the member. If the result at block 1372 is affirmative, processing continues to block 1376 to check if every upper object has been tried, and if negative check whether every lower object has been tried, as shown at block 1378. If the result at block 1378 is affirmative, processing control branches back to block 1376, and if negative, processing proceeds to perform another test at block 1380 to determine whether an exact match exists between objects. If the result at block 1380 is negative processing branches to block 1382 to use a many-to-many mapping technique. If the result at block 1380 is affirmative, processing flow continues to blocks 1384 and 1386 to use one-to-one mapping and to form complex objects, after which control proceeds to block 1388 to test the objects. If the result at block 1388 is affirmative, control proceeds to block 1390 to insert the object into the parameters list, and if negative processing control branches to block 1346 of FIG. 11C, as illustrated by node 1392.

Figure 11E:
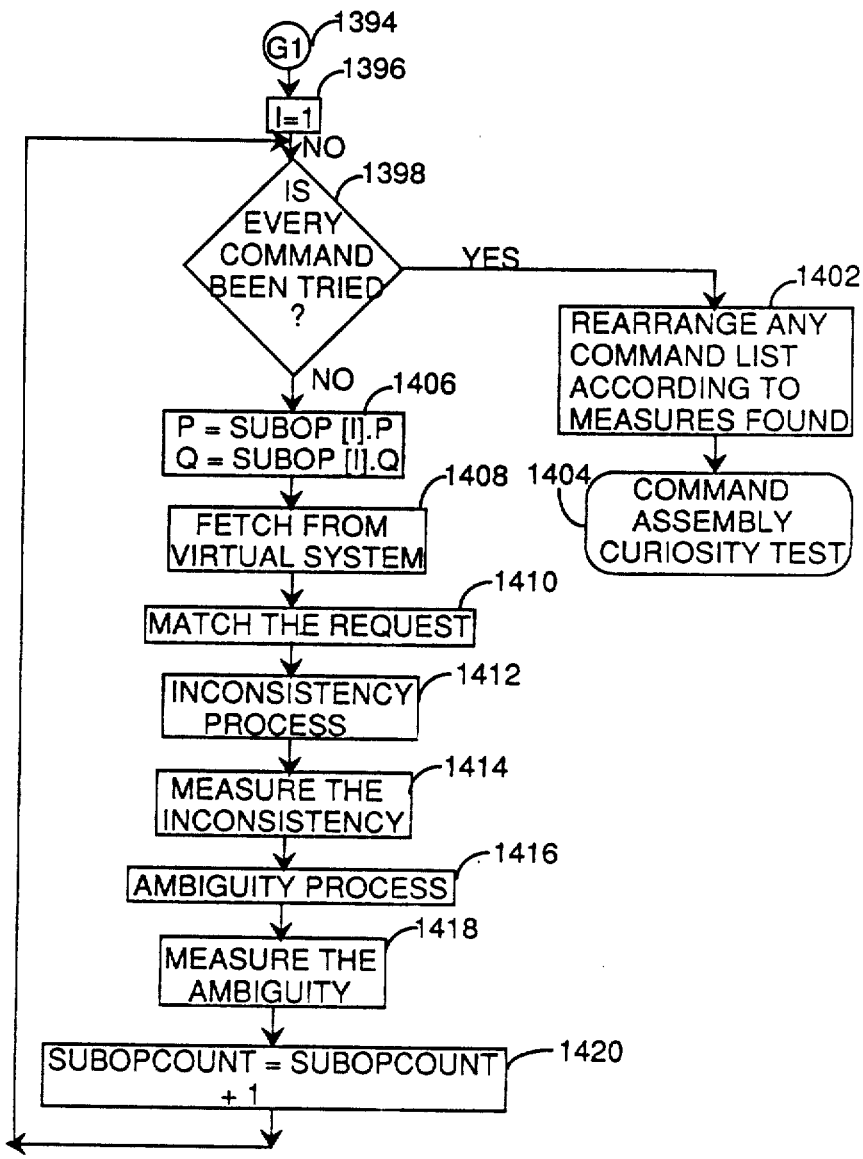

If the result at block 1376 is affirmative, processing flow continues to block 1396 of FIG. 11E, as illustrated by node 1394 to initialize variable i to one, after which processing proceeds to block 1398 to test whether all of the commands in the system have been traversed. If the result at block 1398 is affirmative processing control branches to blocks 1402 and 1404 to rearrange the array COMLIST aCCording to measurements obtained during the matching process after which the command assembly and curiosity test process is entered as illustrated by block 1404. If the result at block 1398 is negative, any inconsistency or ambiguity which might exist in the request is removed or the user is informed, as shown in blocks 1406, 1408, 1410, 1412, 1414, 1416, 1418 and 1420, after Which processing control branches back to block 1398.

Figure 13:
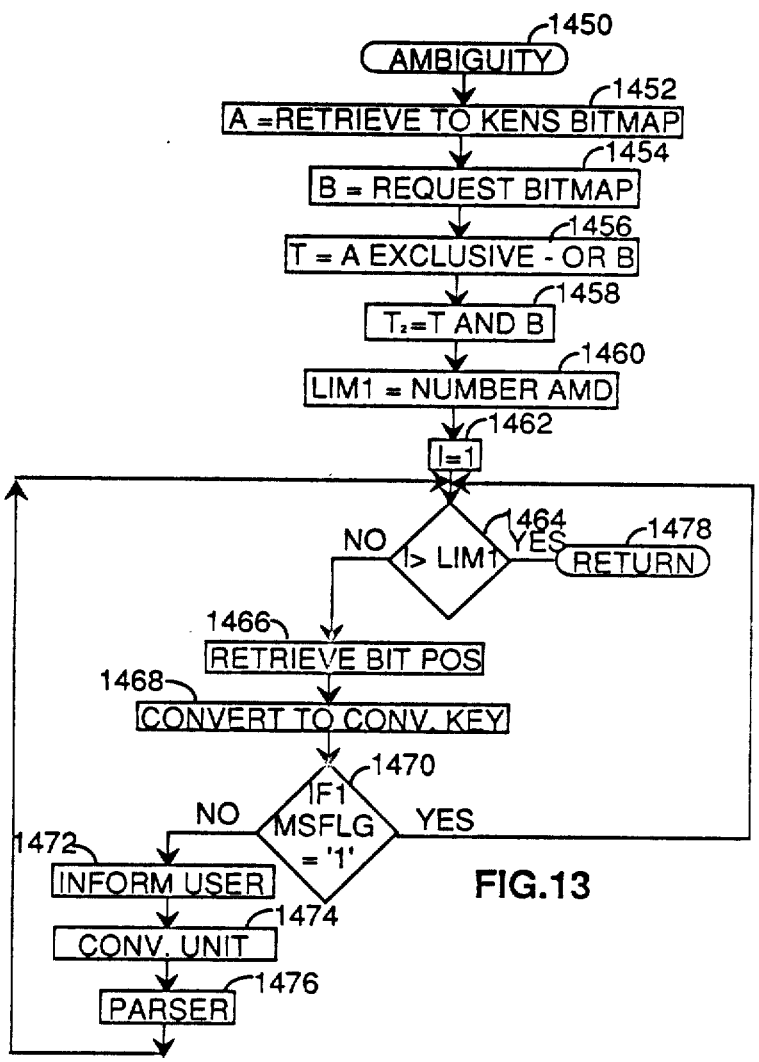
FIG. 13 is a flow diagram illustrating the methodology and structural flow of a specific embodiment of the ambiguity function for the specific embodiment of the natural language operating system interface program illustrated in FIG. 2.

Referring now to FIG. 13, there is shown a flow diagram illustrating the process methodology and structural flow for a specific embodiment of the ambiguity process. The ambiguity process begins at block 1450, and immediately processing proceeds to blocks 1452, 1454, 1456 and 1458 to detect the missing information and parameters and to blocks 1460 and 1462 at the variable LIM1 and I. Processing then continues to block 1464 to test whether every ambiguity is resolved and information entropy is returned to one, and if affirmative, processing flow returns to the calling process, as shown in block 1478. If the result at block 1464 is negative, processing flow continues to blocks 1466 and 1468 to prompt the user for the missing piece of information which results in maximum disclosure. At block 1470 a test is performed to check if a match-and-resolve or match-and-measure process is to be performed, after which control branches back to block 1464 if the result is affirmative. If the result at block 1470 is negative, processing flow branches to blocks 1472, 1474 and 1476, where the user is informed and questioned, and processing control returns to block 1464, as shown.

Figure 14:
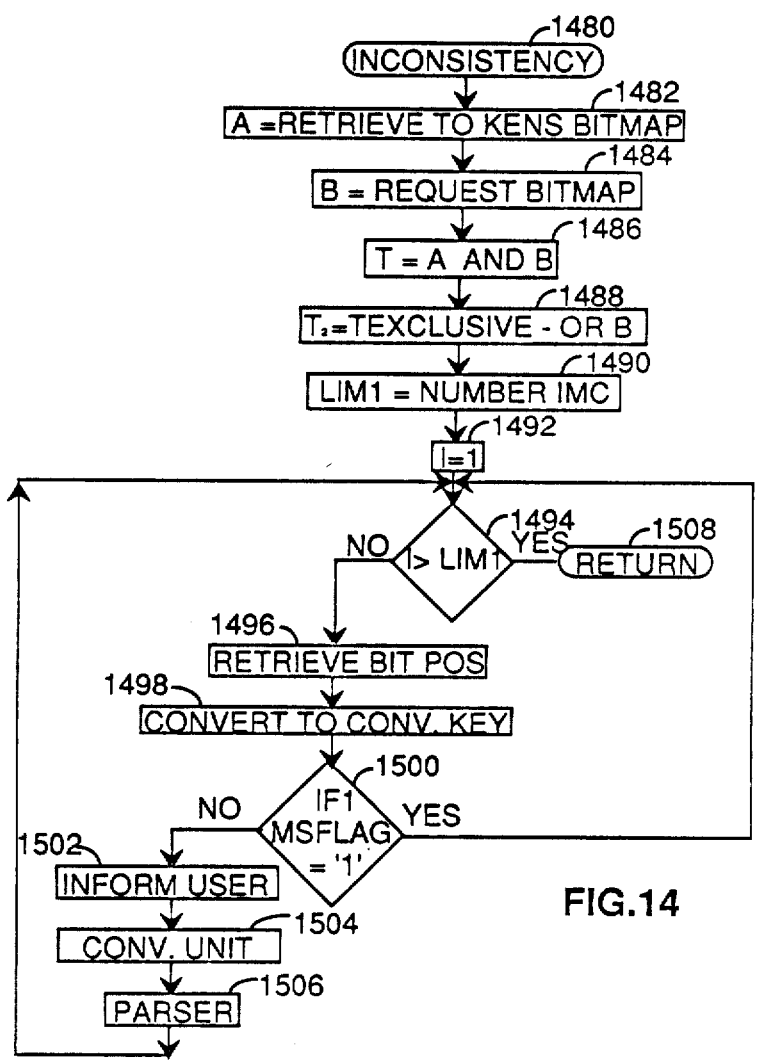
FIG. 14 is a flow diagram illustrating the methodology and structural flow of a specific embodiment of the inconsistency function for the specific embodiment of the natural language operating system interface program illustrated in FIG. 2.

There is shown in FIG. 14 a flow diagram illustrating the process methodology and structural flow for a specific embodiment of the inconsistency routine which begins at block 1480. Processing flow proceeds to detect the inconsistent information in the request, as shown by blocks 1482, 1484, 1486, 1488, 1490 and 1492. Processing then continues to blocks 1494 to test whether every piece of information which causes inconsistency is considered, and if affirmative, processing flow returns back to the calling process, as shown at block 1508. If the result at block 1494 is negative, processing flow proceeds to blocks 1496 and 1498 where the user is prompted to clear the inconsistency. A test is performed at block 1500 to determine whether a match-and-resolve or match-and-measure is to be done, and if affirmative, processing branches to block 1494. If the result at block 1500 is negative, processing flow proceeds to blocks 1502, 1504 and 1506 where the user is questioned via the conversation engine process and then processing control returns to block 1494.

Referring now to FIGS. 17A, 17B, 17C and 17D, there is shown flow diagrams illustrating the process methodology and structural flow for a specific embodiment of the knowledge acquisition process. The knowledge acquisition process begins at block 1700, and immediately displays the menu 1702, and prompts the user to make a selection. Processing flow then proceeds to blocks 1704 through 1758 (of FIGS. 17A, 17B and 17C) to make a selection of a corresponding procedure based on numerical value of the XCODE variable. Once the proper procedure is selected, processing flow continues to block 1762 of FIG. 17D, as illustrated by node 1760, to load and exclude the proper procedure. A test is performed at block 1764 to determine whether information is gathered so that an entry can be added to the knowledge base of the system, and if negative, the user is prompted with more questions to complete the knowledge acquisition process, as shown in block 1766, after which processing control branches back to block 1762. If the result at block 1764 is affirmative, processing flow continues to mark the new token in the filter and create an index in the access method, and then the virtual system is called to add the token to the present knowledge base, as shown in blocks 1768, 1770, 1772 and 1774. Processing flow then proceeds to block 1776 where the control is returned to the calling process.

Figure 16A:
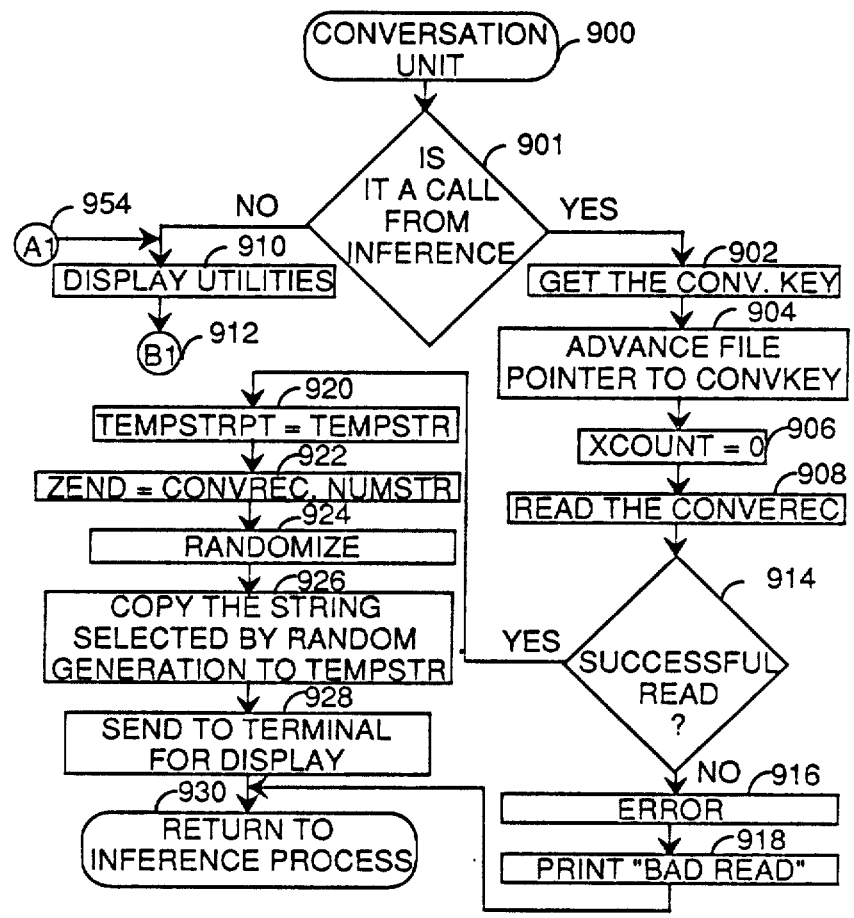
FIG. 16A and FIG. 16B (16BA and 16BB) are flow diagrams illustrating the methodology and structural flow of a specific embodiment of a Conversation Unit function for the specific embodiment of the natural language operating system interface program illustrated in FIG. 2.
Figure 16B:
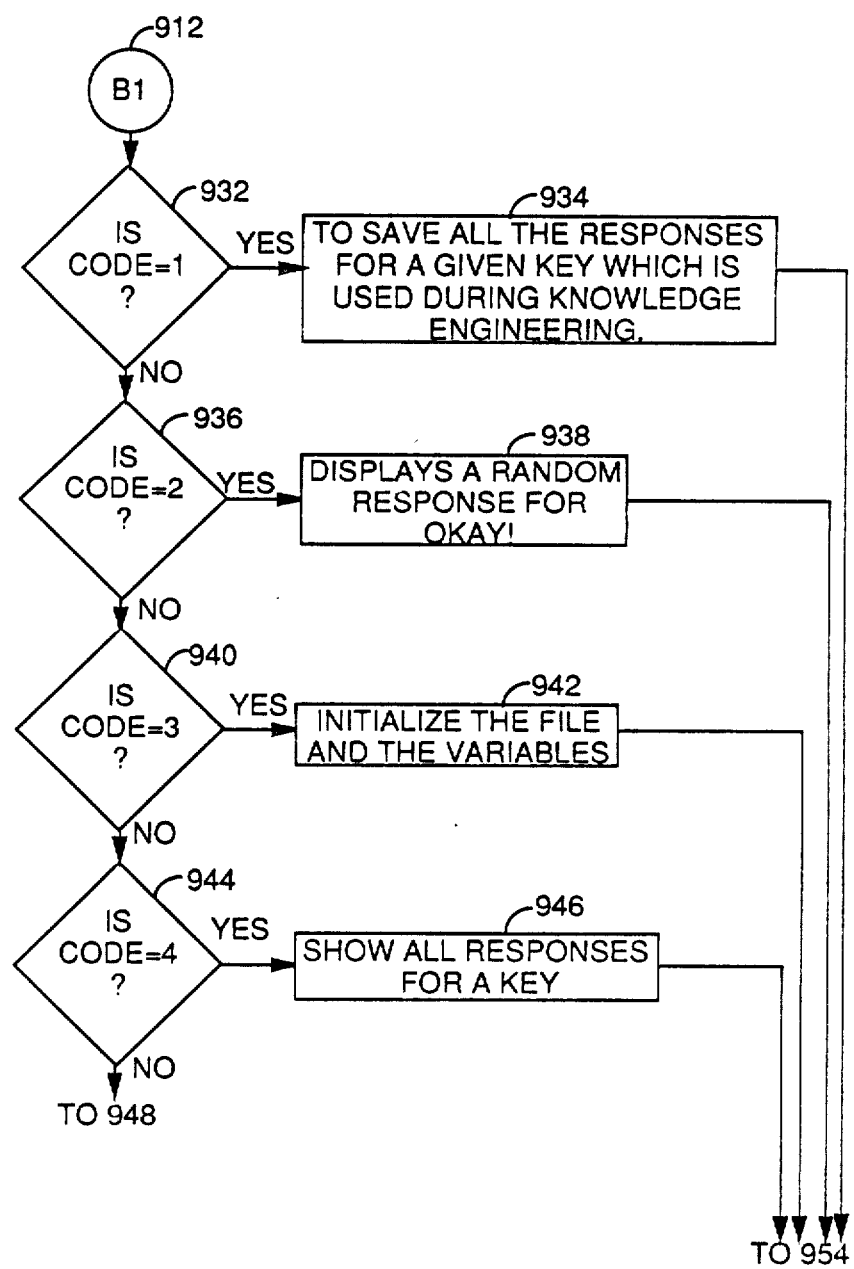
Figure 16B:
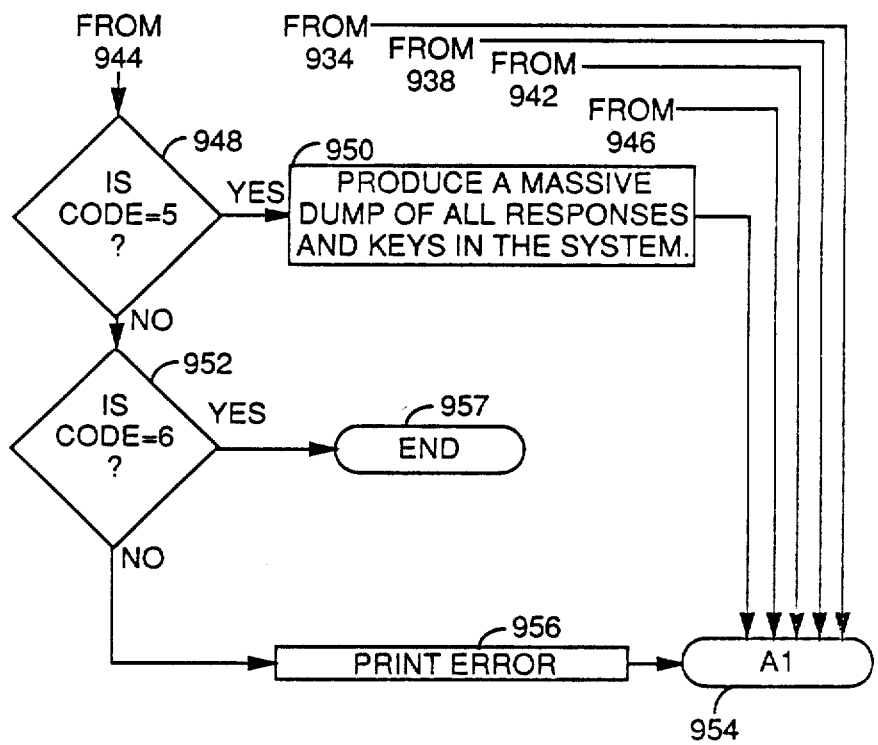
Figure 17A:
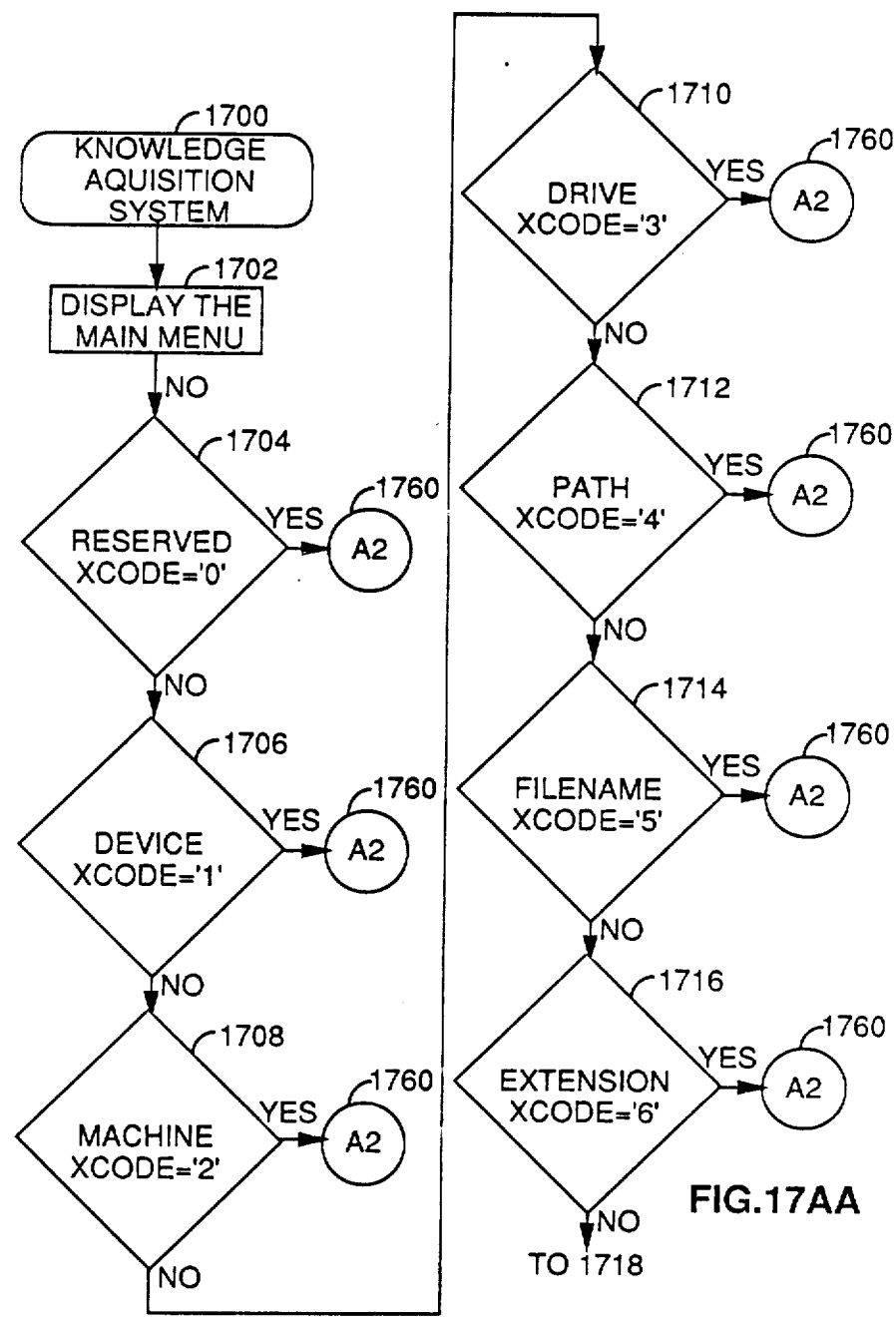
FIG. 17A (17AA and 17 AB), FIG. 17B, FIG. 17C (17CA and 17CB) and FIG. 17D are flow diagrams illustrating the methodology and structural flow of a specific embodiment of a Knowledge Acquisition function for the specific embodiment of the natural language operating system interface program illustrated in FIG. 2.
Figure 17A:
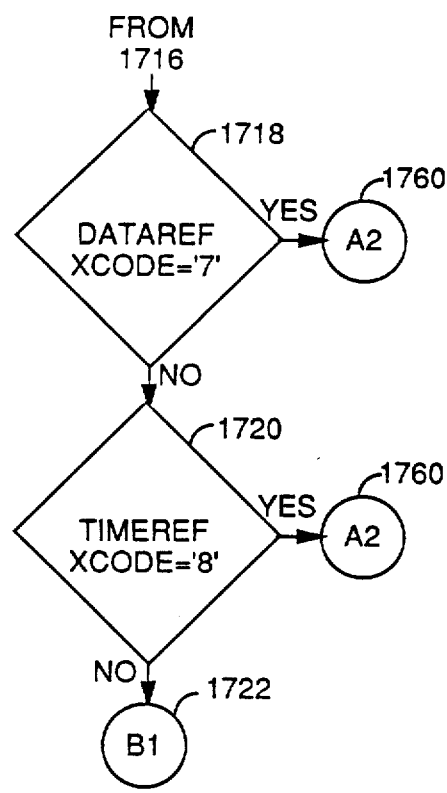
Figure 17B:
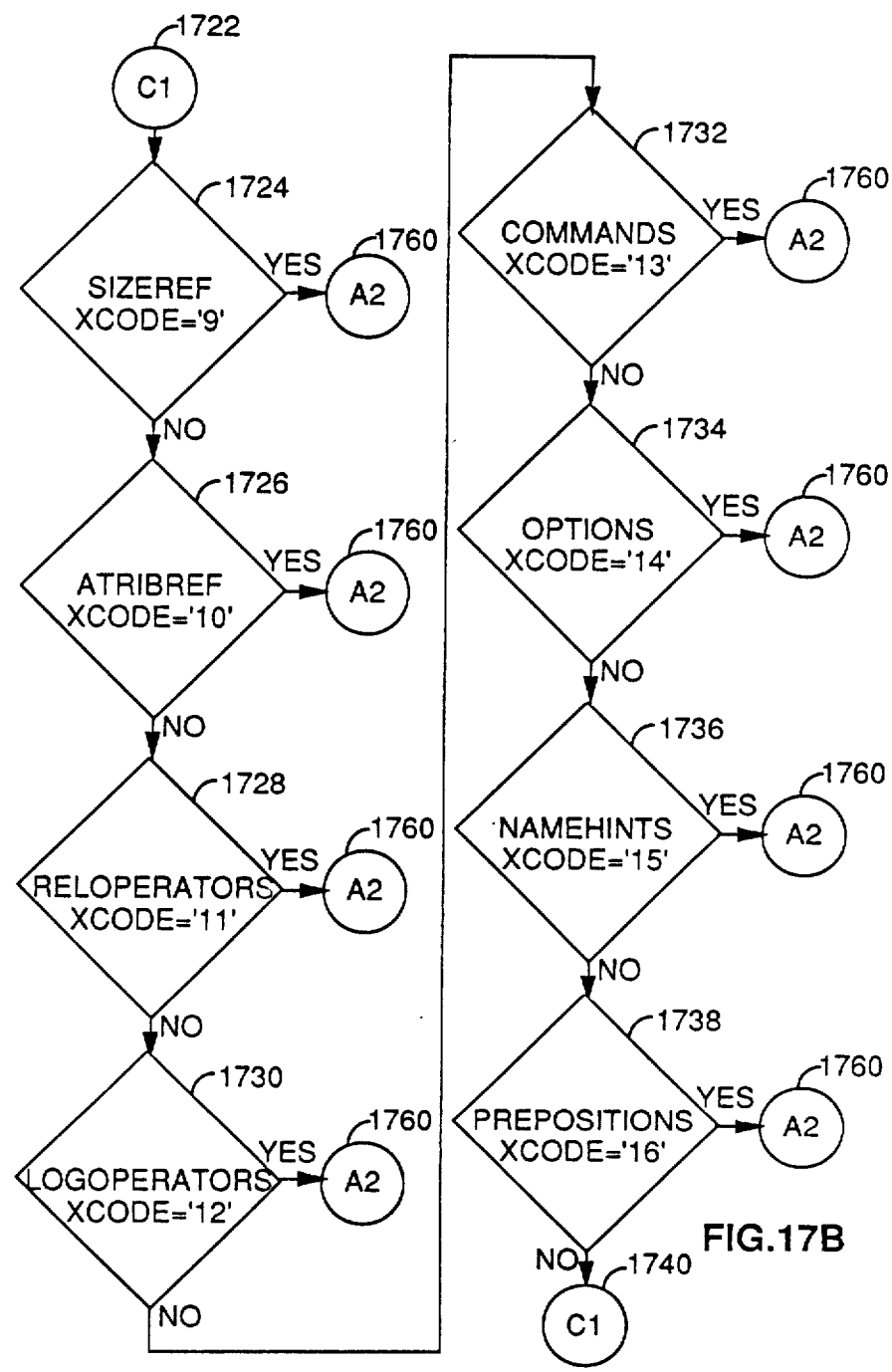
Figure 17C:
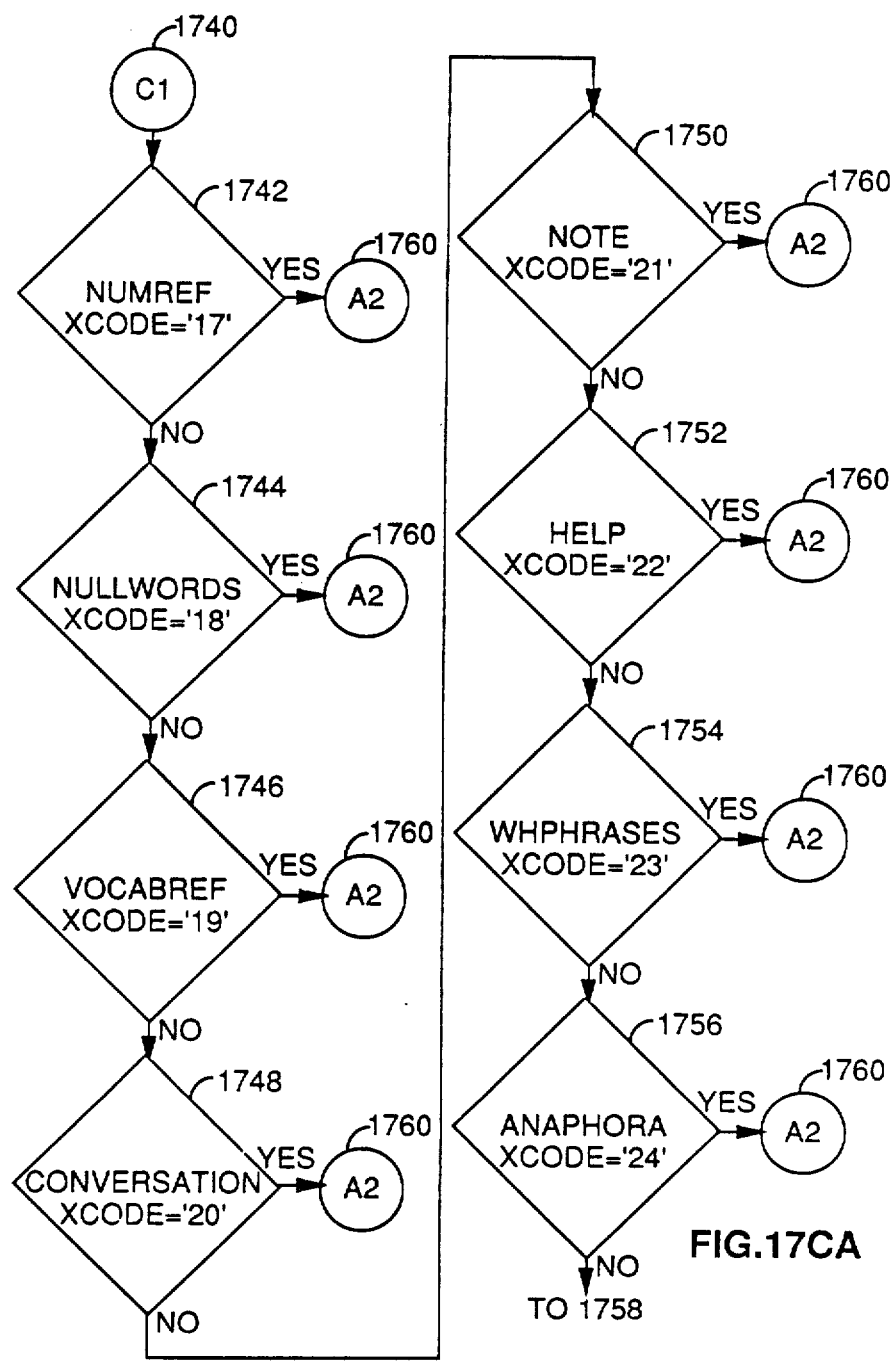
Figure 17C:
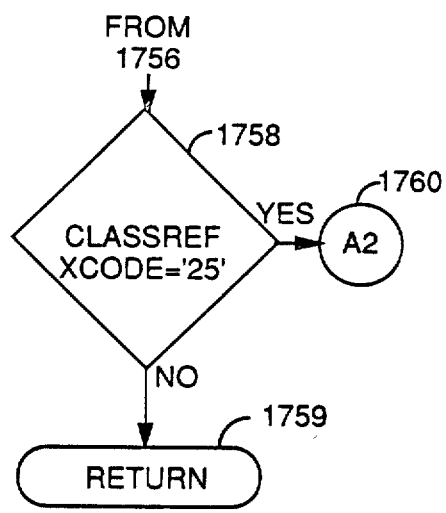
Figure 17D:
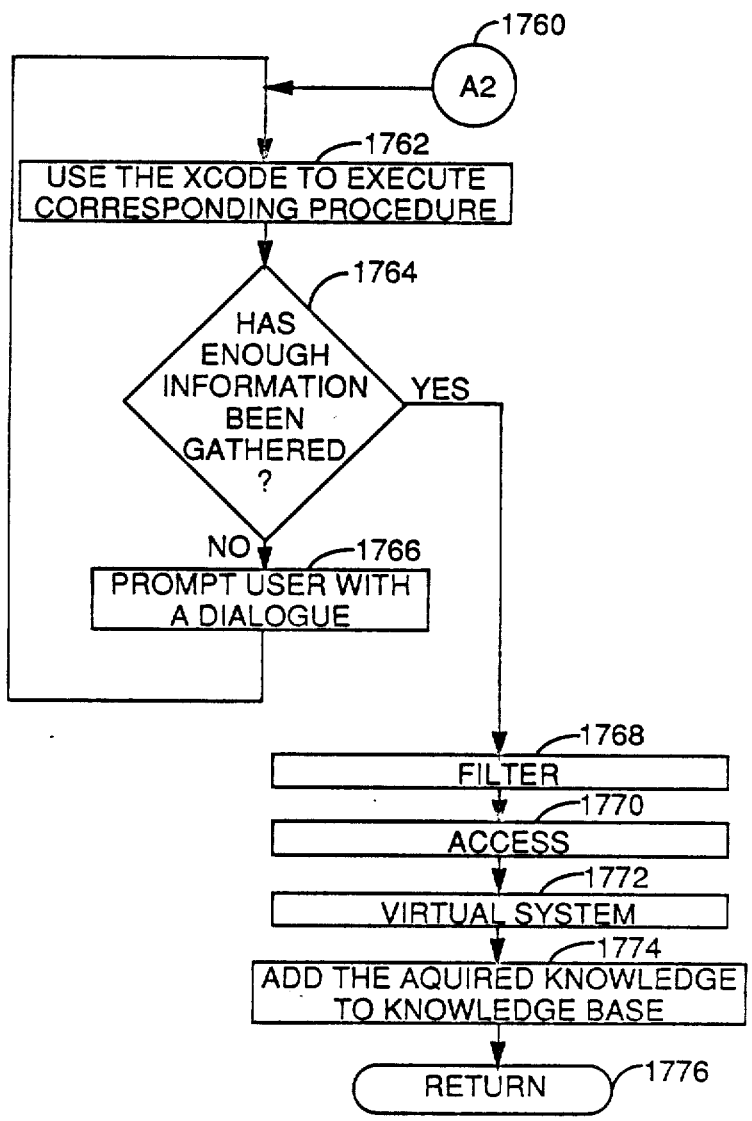

Referring now to FIGS. 16A and 16B, there is shown a flow diagram illustrating the process methodology and structural flow for a specific embodiment of the conversation unit shown as block 100 of FIG. 2. The conversation unit starts at block 900 and proceeds to test to determine if it has been called upon by the inference mechanism shown as block 98 of FIG. 2. If the result of the test is affirmative processing flow proceeds to blocks 902, 904, 906 and 908 to read the conversation record as indicated by the value found in the CONV-KEY variable. Processing flow then continues to block 914 where a test is made to determine if the reading of the conversation record has been successful, and if the result of the test is negative, then processing proceeds to blocks 916 and 918 to perform error handling. Processing flow then continues to block 930 where the program returns to the inference process 98 as shown in FIG. 2. If the result of the test at 914 is affirmative the processing flow branches to blocks 920, 922, 924 and 926 to generate a random response of a requested key. The randomly selected response of is then displayed to the user as shown in block 928. Processing flow then continues to 930 where the processing control is returned to the inference engine 98 as shown in FIG. 2.

Returning to block 901, if the result of the test is negative processing flow proceeds to block 910 where the display utility options are entered as illustrated by node 912 of FIG. 16B. At block 932, a test is made to determine if the CODE (user's selected option) value is equal to one, and if the result is affirmative, processing proceeds to block 934 to save all the responses for a given key which is used during the knowledge engineering process 101. Processing flow then continues to node 954 and branches back to block 910 as shown in FIG. 16A. If the result of the test at block 932 is negative then another test is made at block 936 to determine if the value of the variable CODE is equal to 2, and if the result is affirmative processing branches to block 938 where a random response is displayed for a given key and processing continues to node 954. Referring back to block 936, if the result of the test is negative then another test is made at block 940 to determine if the third option has been selected. If the result of the test is affirmative then the variables and the files are all initialized, as shown at block 942 and then processing flow proceeds to node 954. If the result of the test at block 940 is negative, processing continues to determine if the forth option in the menu is selected at block 944, and if affirmative all responses for a given key are shown on the screen, as illustrated by block 956. Processing control then continues to node 954. If the result of the test at block 944 is negative, processing flow continues to block 948 where a test is made to determine if the fifth option is selected and if affirmative, a massive dump of all the responses and the keys in the system is produced for the user, as shown at block 950, and then control continues to node 954. If the result of the test at block 948 is negative, the value of the variable code is tested to determine if the sixth option of the menu choices is selected, as illustrated by block 952, and if the result is affirmative then the conversation utility menus is exited, as shown at block 957. If the test result of block 952 is negative, processing flow proceeds to block 956 where the user is warned that an invalid selection is made. Processing control continues to block 954 as shown and then the display utilities at block 910 of FIG. 16A are entered, and processing proceeds to node 912 of FIG. 16B to display the menu for the user.

There is shown in FIGS. 12A, 12B, 12C and 12D a flow diagram illustrating the process methodology and structural flow for a specific embodiment of the command assembly and curiosity test process illustrated as block 102 in FIG. 2. The command assembly and curiosity test process begins at block 1500 of FIG. 12A and proceeds to blocks 1502 and 1504 to initialize variables i and LIM. Processing flow then immediately proceeds to block 1506 to determine whether every member of the table has been traversed, and if negative it proceeds to insert the members of PATTERNTABLE into a stack structure (2-dimensional array), as shown in blocks 1508, 1510, 1512, 1514, 1516 and 1518, after which processing control branches back to block 1506. If the result at block 1506 is affirmative, processing flow branches to block 1522, as illustrated, to test whether the command stack is empty. If the result at block 1522 is affirmative processing flow proceeds to blocks 1524, 1526 and 1528 to use the parameters to obtain the most likely candidate command. Processing flow continues to block 1530 to test to determine whether every command has been traversed, and if affirmative, the candidate commands are sorted and then the choice is inserted into the command stack, as illustrated in blocks 1532 and 1534, after which processing control branches back to block 1522. If the result at block 1530 is negative, the amount of ambiguity and inconsistency found in a candidate command is measured, as illustrated in blocks 1536, 1538, 1540, 1542 and 1544, after which processing control returns to block 1530.

Figure 12A:
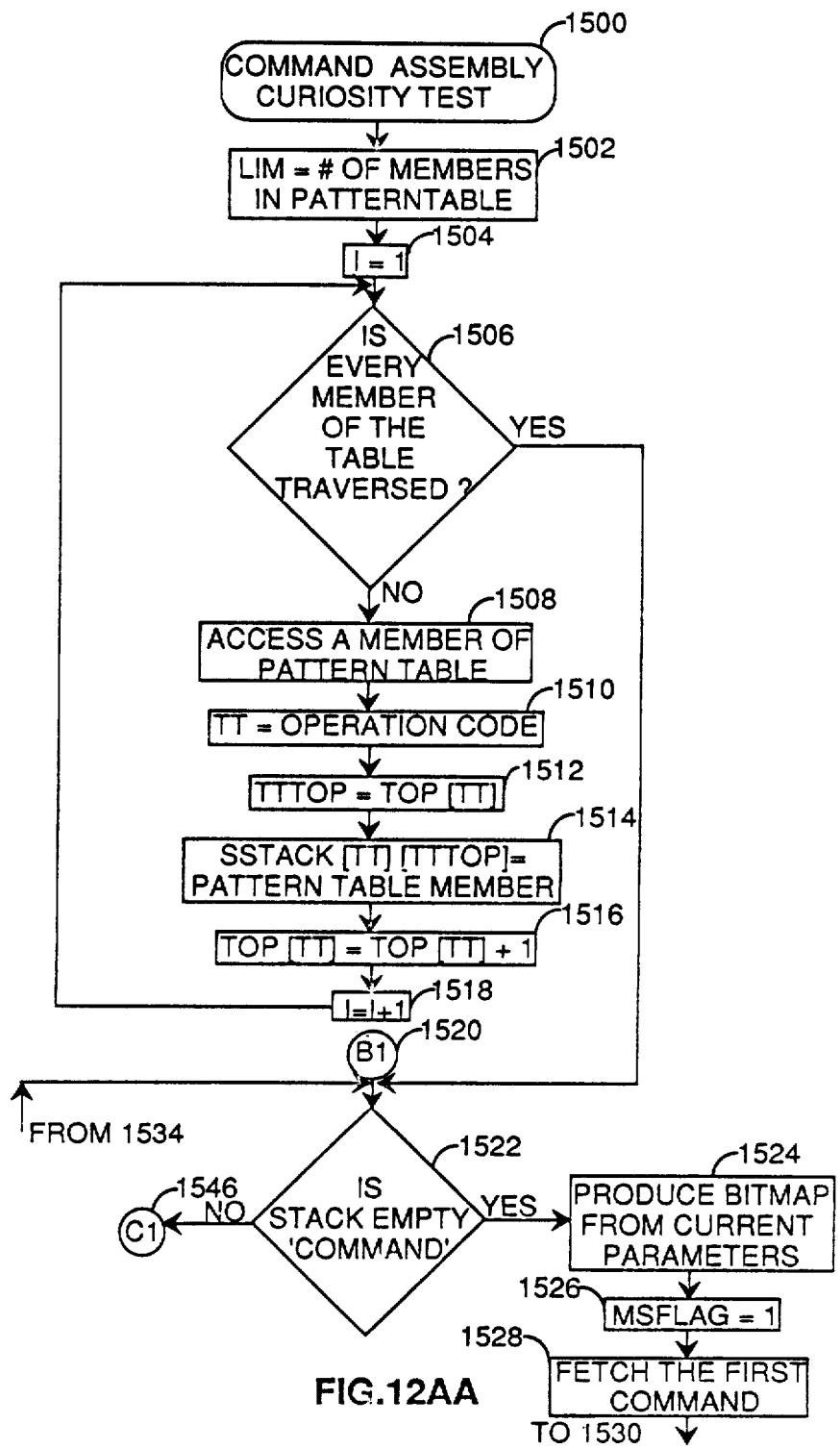
FIG. 12A (12AA and 12AB), FIG. 12B (12BA and 12BB), FIG. 12C (12CA and 12CB) and FIG. 12D (12DA and 12DB) are flow diagrams illustrating the methodology and structural flow of a specific embodiment of a command assembly and curiosity function for the specific embodiment of the natural language operating system interface program illustrated in FIG. 2.
Figure 12A:
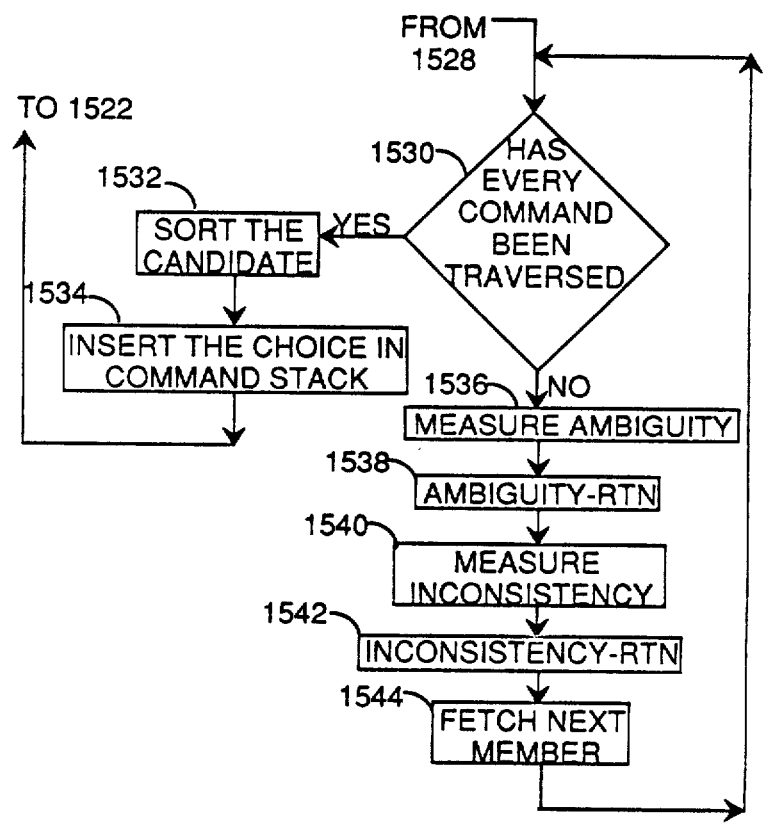
Figure 12B:
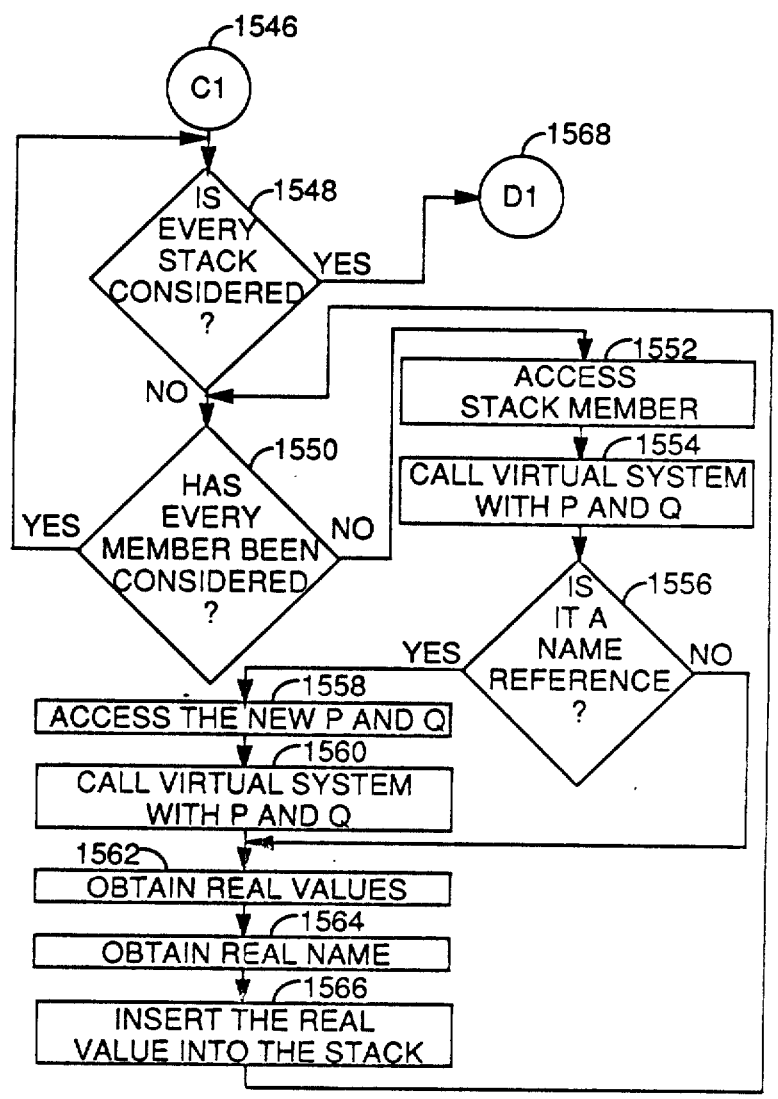
Figure 12B:
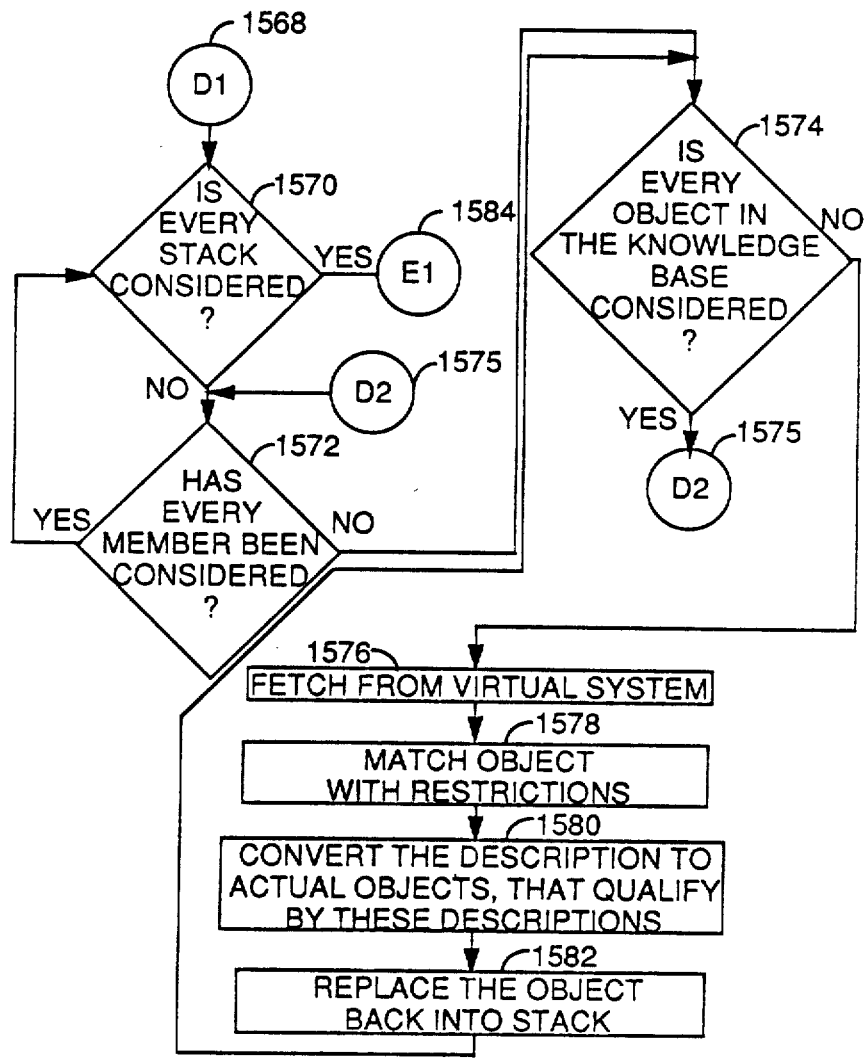

If the result at block 1522 is negative, processing flow branches to block 1548 of FIG. 12B, as illustrated by node 1546. A test is done to determine whether every stack has been considered, and if negative, processing flow continues to block 1550 to perform another test to determine whether every member is considered, and if affirmative control returns to block 1548. If the result at block 1550 is negative, processing flow proceeds to blocks 1552 and 1554 to access a member in the stack and use the P(page number) and Q (offset) to fetch the member and other information associated with the member from the virtual system. A test is done at block 1556 to see whether the stack member is a name reference, and access the new P and Q and to call the virtual storage with the P and Q obtained. If the result at block 1556 is negative, processing control branches to blocks 1562, 1564 and 1566 to replace the real values with their equivalent vocabulary reference, after which control returns to block 1550.

If the result at block 1548 is affirmative, processing control branches to block 1570 of FIG. 12B, as illustrated by node 1568, to check whether every stack has been considered, and if negative processing flow proceeds to test whether every member is considered, and if affirmative control returns to block 1570. If the result at block 1572 is negative, processing flow continues to block 1574 to check whether every object in the knowledge base is considered and if affirmative control returns to block 1572, as illustrated by node 1575. If the result at block 1574 is negative, processing flow continues to find and replace those objects that qualify by their descriptions found in the stack, as illustrated by blocks 1576, 1578, 1580 and 1582, after which processing control branches back to block 1574.

Figure 12C:
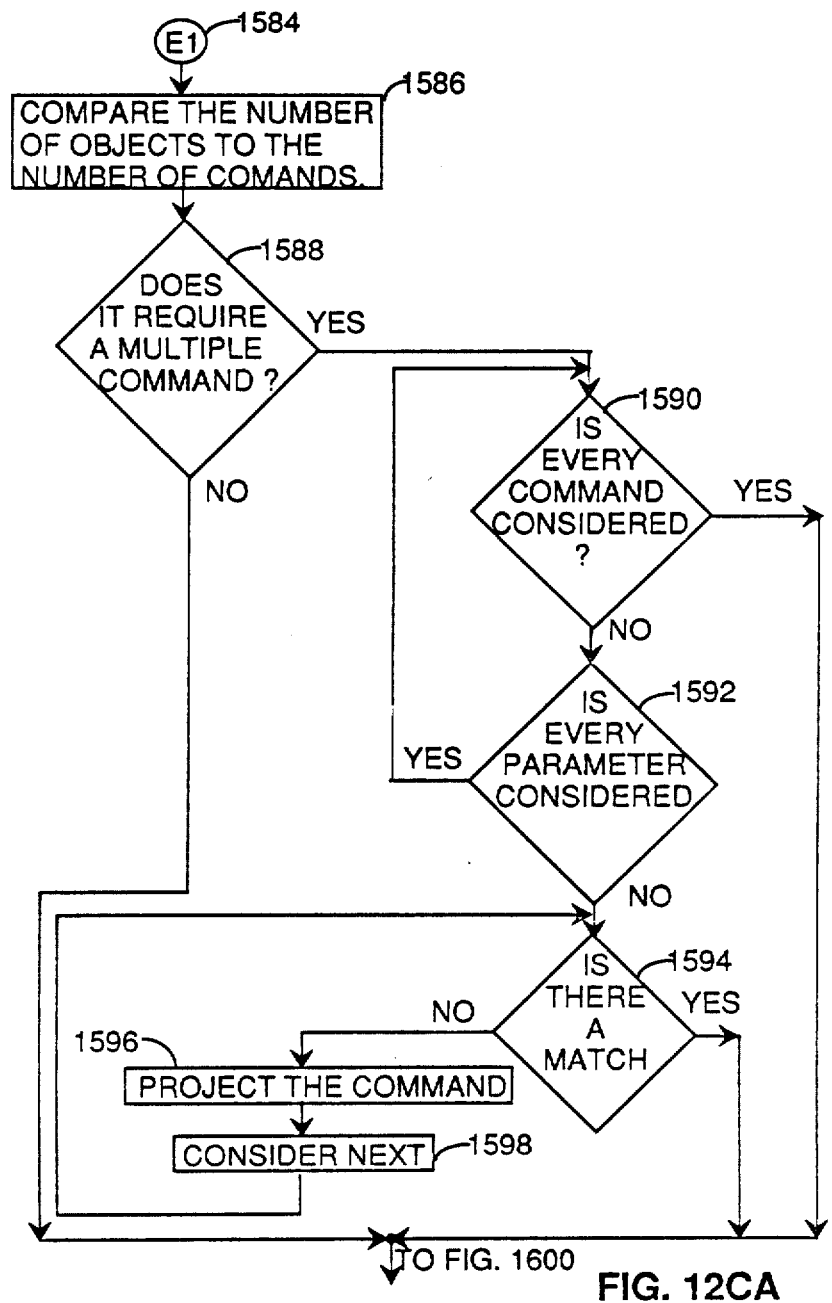
Figure 12C:
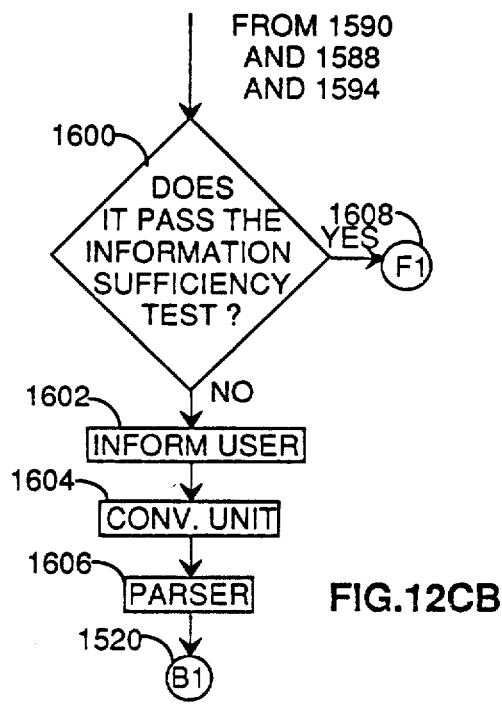

If the result at block 1570 is affirmative, processing flow branches to block 1586 of FIG. 12C, as illustrated by node 1584, to compare the number of objects to the number of commands. A test is performed at block 1588 to determine if the execution of this command causes a number of commands to be executed, and if negative processing flow branches to block 1600. If the result at block 1588 is affirmative, another test is done in block 1590 to determine whether every command is considered. If the result at block 1590 is negative, another test is done at block 1592 to determine if every parameter is considered, and if affirmative, processing control returns to block 1590. If the result at block 1592 is negative, processing flow continues to block 1594 to check whether a match is found, and if affirmative, processing flow proceeds to block 1600. If the result at block 1594 is negative, processing flow proceeds to blocks 1596 and 1598 to project the command to every parameter. At block 1600 a test is performed to determine whether the information sufficiency test is passed, and if negative it proceeds to block 1602 to inform the user, after which the conversation unit and parser is called, as shown at blocks 1604 and 1606. Processing flow then returns to block 1522 of FIG. 12A, as illustrated by node 1520.

Figure 12D:
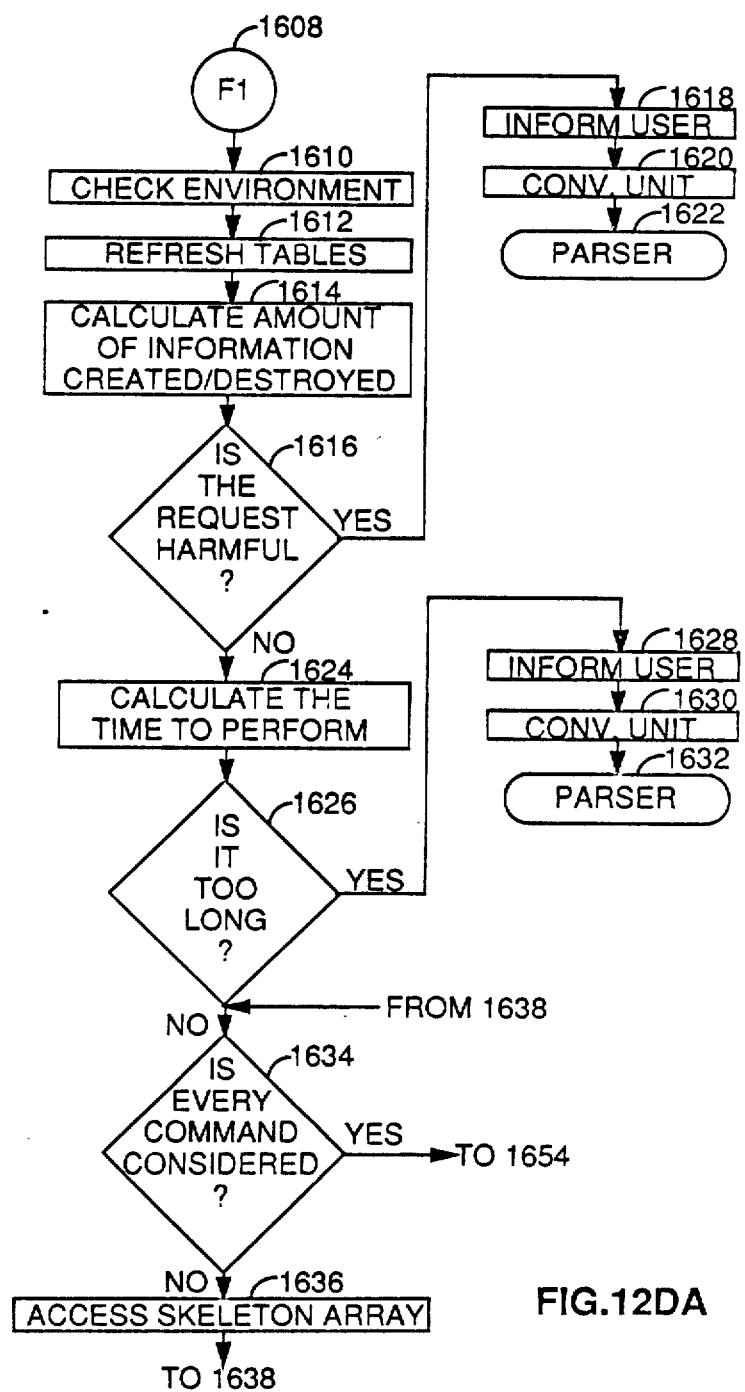
Figure 12D:
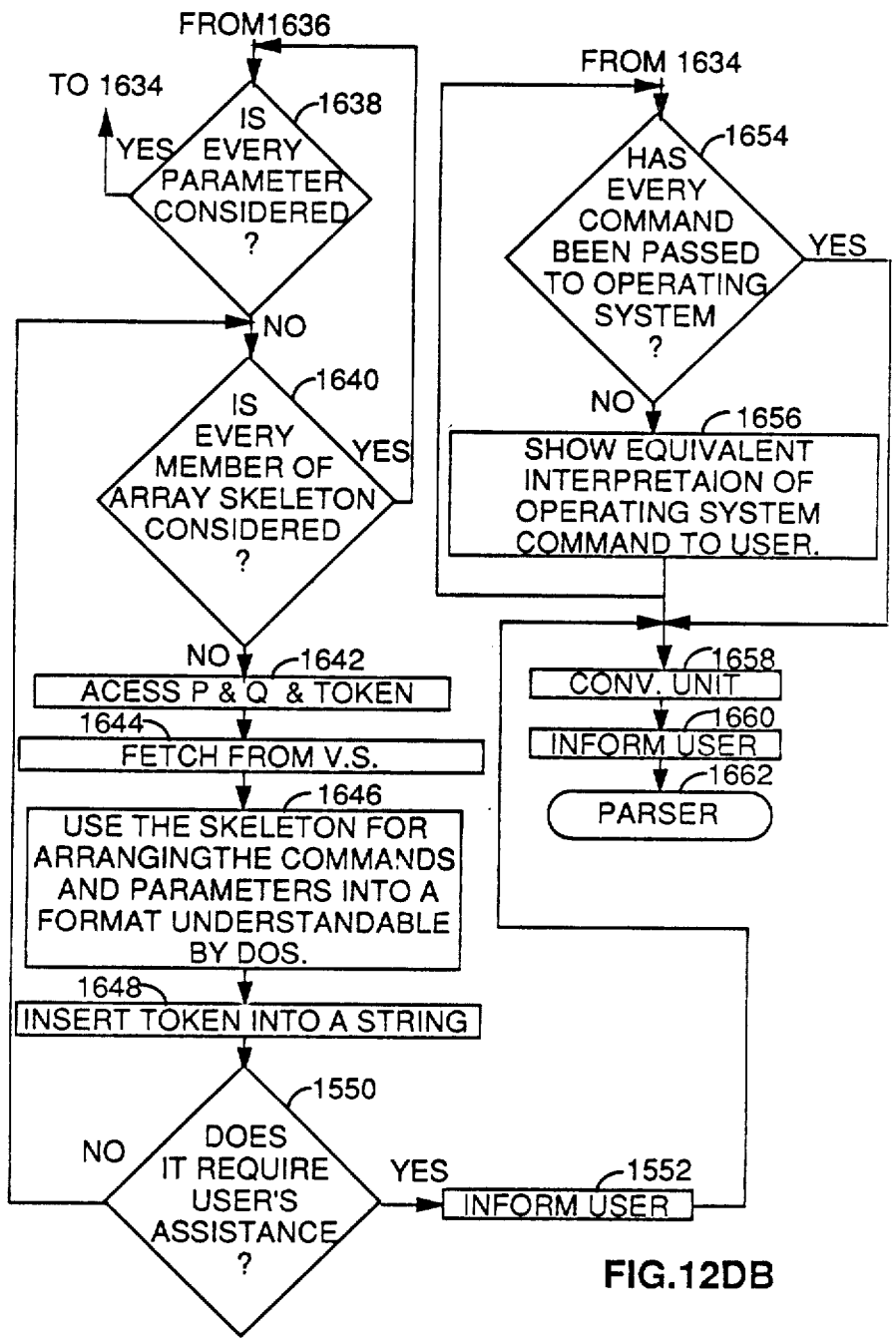

If the result at block 1600 is affirmative, processing then continues to blocks 1610, 1612 and 1614 of FIG. 12D, as illustrated by node 1608 to check the environment and calculate the amount of change which takes place as a result of executing a user's request. Processing flow continues to block 1616 to check whether the user request creates a harmful result for the system, and if affirmative, the user is informed and the conversation unit and the parser are called, as shown at blocks 1618, 1620 and 1622. If the result at block 1616 is negative, the time needed to perform a request is calculated, as shown in block 1624. A test is performed at block 1626 to test whether the execution of the command requires considerable amount of time, and if affirmative, the user is informed about the situation, and then the conversation unit and the parser is called, as illustrated by blocks 1628, 1630 and 1632. If the result at block 1626 is negative, processing flow proceeds to block 1634 to check whether every command is considered. If the result at block 1634 is affirmative, another test is done at block 1654 to determine Whether every command is passed to the operating system, and if affirmative processing flow proceeds to block 1568. If the result at block 1654 is negative, the equivalent interpretation of the operating system command is shown to the user, as illustrated by block 1656, and the conversation unit is called to inform the user as shown by blocks 1658 and 1660, and then the parser process is called as illustrated at block 1662. If the result at block 1634 is negative, processing flow proceeds to block 1636 to access the array called SKELETON. A test is done at block 1638 to determine if every parameter is considered, and if positive processing control returns to block 1634. If the result at block 1638 is negative, processing flow proceeds to block 1640 to check whether every member of the SKELETON array is considered, and if affirmative, processing flow returns to block 1638. If the result at block 1640 is negative, processing flow continues to blocks 1642, 1644 and 1648 to produce the equivalent operating system command by using the SKELETON array as a guide line. In block 1650, a test is performed to determine whether the user's assistance is required, and if negative, processing flow branches back to block 1640. If the result at block 1650 is affirmative, the user is prompted, as shown in block 1652, after which processing control branches to block 1658, as shown.

A specific embodiment of the natural language translation apparatus has been described for purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention, any and all modifications, variations, or equivalents that fall within the true spirit and scope of the basic underlying principles disclosed and claimed herein.

What is claimed is:

1. A processing system for providing a natural language interface between a user and a computer program that must be provided with user instructions and/or data couched in a formal computer language, comprising:

input means for input of user messages couched in natural language;

processing means connecting to the input means for mapping the user message into corresponding formal computer language expressions based upon stored information including classes of words, and based upon the frequency of use characteristics of the classes;

means connecting to the processing means for presenting the formal computer language to the computer program; and adaptive means connecting to the input means and to the processing means for modifying stored information in response to user supplied information.

2. The apparatus of claim 1 wherein the adaptive means further comprises means for permitting the user, through a natural language dialogue, to extend the natural language vocabulary which can be mapped into formal computer language expressions and which can be presented to the computer program.

3. The apparatus of claim 1 wherein the adaptive means further comprises means for modifying stored information based upon past states to permit learning based upon past usage.

4. The apparatus of claim 1 wherein the processing means further comprises means for virtual memory allocation and virtual memory addressing of stored information.

5. The apparatus of claim 1 wherein said processing means comprises:

parsing means for parsing the user message into tokens of at least a first order, and wherein the processing means identifies formal computer language words and/or phrases corresponding to the tokens, filter means for providing high speed determination of the existence of stored information corresponding to each token, and access means for identifying words of the formal computer language corresponding to the tokens based upon word length categories and frequency of use characteristics wherein the adaptive means further comprises self-modifying means for modifying the filter means and access means based upon statistical information learned during previous usage.

6. A processing system for providing a natural language interface between a user and a computer program that must be provided with user instructions and/or data couched in a formal computer language, comprising:
input means for input of user messages couched in natural language;
processing means connecting to the input means for mapping the user message into corresponding formal computer language expressions based upon stored information including classes of words, and based upon the frequency of use characteristics of the classes;
means connecting to the processing means for presenting the formal computer language to the computer program; and
wherein the processing means further comprises cryptographic filter means for high speed determination of a crypto-signature of tokens derived from the user message utilizing cryptographic characteristics of the tokens.

7. A processing apparatus for performing translations between a predetermined natural language containing tokens comprising words and/or phrases and a second language comprising:
input means for input of user messages in said predetermined natural language comprising tokens of said natural language;
processing means connecting to said input means for identifying words and/or phrases of said second language stored in the memory corresponding to respective tokens in said predetermined natural language user message based on cryptological characteristics corresponding to the length of said tokens of said predetermined natural language, said processing means comprising
parsing means for parsing the user message into tokens of at least a first order, and wherein the processing means indentifies formal computer language words and/or phrases corresponding to the tokens, and
filter means for providing high speed determination of the existence of stored information corresponding to each token;
means connecting to said processing means for generating a message in said second language utilizing the identifiee second language words and/or phrases;
wherein the processing means comprises access means for identifying words of the formal computer language corresponding to the tokens based upon word length categories and frequency of use characteristics; and
wherein the processing means further comprises self-modifying means for modifying the filter means and access means based upon statistical information gathered during usage of the apparatus.

8. A processing apparatus for performing tranlations between a predetermined natural language and a second formal computer language in which messages destined for a particular computer program must be expressed, comprising:
input means for input of user messages in said predetermined natural language comprising words and/or phrases of said natural language;
processing means connecting to the input means for identifying words and/or phrases of said second formal computer language stored in the memory corresponding to respective words and/or phrases in said predetermined natural language user message based on cryptological characteristics corresponding to the length of said words and/or phrases of said predetermined natural language;
means connecting to the processing means for generating a message in said second formal computer language utilizing the identified second language words and/or phrases and for presenting the second formal computer language message to the computer program;
wherein the computer program has associated with it a data storage system including files of data the structure and organization of which data storage system has associated with it certain names and structures which must be understood by one wishing to query, manipulate, or otherwise access said data storage system, and which data storage system is queried, manipulated, or otherwise accessed by said computer program; and
wherein the apparatus further comprises means connecting to said processing means for scanning said data storage system to obtain information about said data storage system's names and structure and for thereafter enabling said processing means to recognize and to accept said data storage system's names as part of the predetermined natural language and to translate them into the second formal computer language in a manner that reflects the information gathered concerning said file system's structure.

9. A processing apparatus for performing translations between a predetermined natural language containing tokens comprising words and/or phrases and a second language comprising:
input means for input of user messages in said predetermined natural language comprising tokens of said natural language;
processing means connecting to said input means for identifying words and/or phrases of said second language stored in the memory corresponding to respective tokens in said predetermined natural language user message based on cryptological characteristics corresponding to the length of said tokens of said predetermined natural language, said processing means comprising
parsing means for parsing the user message into tokens of at least a first order, and wherein the processing means identifies second language words and/or phrases corresponding to the tokens, and
filter means for providing high speed determination of the existence of stored knowledge corresponding to each token;
means connecting to said processing means for generating a message in said second language utilizing the identified second language words and/or phrases;
wherein the processing means comprises access means for identifying words of the second language corresponding to the tokens based upon word length categories and frequency of use characteristics; and
wherein the processing means further comprises code generating means for generating classifications of words, and patterns of words of the user messages according to function within the user message and for generating a code representative of the classifications.

10. The apparatus of claim 9 wherein the processing means further comprises inference means for detecting whether insufficient information is provided by the user message to permit performance of a requested task.

11. The apparatus of claim 10 wherein the inference means further comprises means for detecting whether there is redundant information provided by the user message.

12. The apparatus of claim 11 wherein the inference means further comprises conversation means for interacting with a user to obtain additional information from the user in response to detection of insufficient information and to detection of redundant information.

13. The apparatus of claim 10 wherein the inference means further comprises means for inferring the meaning of a user message having multiple possible meanings based upon information supplied by the user message and stored information.

14. The apparatus of claim 13 wherein the processing means further comprises means for determining the amount of system disturbance that will result from execution of a task requested by a user message.

15. A processing apparatus including a memory for providing a natural language interface between a user and a computer program that must be provided with user instructions and/or data couched in a formal computer language, said natural language including tokens formed from words and/or phrases, comprising:

input means for input of user computer program requests couched in natural language;

processing means connecting to the input means for identifying at least first order tokens from the user request and for identifying formal computer language terms corresponding to the tokens based upon classes of words determined by word length, and based upon the frequency of use characteristics of the classes;

means connected to said processing means for assembling a formal computer language command responsive to the identified formal computer language terms;

wherein the processing means further comprises filter means for high speed elimination of tokens not stored in the memory utilizing word length and frequency of use characteristics of selected characters of the tokens; and wherein the processing means further comprises access means for allocating to storage prestored tokens and for accessing the prestored tokens contained in a user request based upon word length categories and frequency of use characteristics.

16. The apparatus of claim 15 wherein the processing means further comprises means for virtual memory allocation and virtual memory addressing of tokens.

17. The apparatus of claim 16 wherein the processing means further comprises self-modifying means for modifying the filter means and access means based upon statistical information learned during previous usage of the apparatus.

18. The apparatus of claim 16 wherein the processing means further comprises inference means for detecting whether insufficient information is provided by the user request to permit performance of a requested formal computer language command.

* * * * *